(12) United States Patent
Smith et al.

(10) Patent No.: US 7,027,809 B1
(45) Date of Patent: Apr. 11, 2006

(54) SYSTEMS AND METHODS FOR PROVIDING VISIBILITY TO SS7 INTEGRATED ON-LINE NETWORKS

(75) Inventors: Thomas C. Smith, Roswell, GA (US);
John W. Morton, Cumming, GA (US);
Jefferey T. Seymour, Douglasville, GA (US); Gregory S. Visser, Dunwoody, GA (US); David L. Henseler, Norcross, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 414 days.

(21) Appl. No.: 10/140,455

(22) Filed: May 7, 2002

Related U.S. Application Data

(63) Continuation of application No. 09/135,519, filed on Aug. 17, 1998, now Pat. No. 6,501,950, which is a continuation-in-part of application No. 08/615,962, filed on Mar. 14, 1996, now Pat. No. 6,014,557.

(51) Int. Cl.
*H04Q 7/20* (2006.01)
(52) U.S. Cl. .............. 455/423; 455/432.1; 455/435.1; 455/411
(58) Field of Classification Search .............. 455/410, 455/461, 411, 432.1, 432.2, 432.3, 412.1, 455/552.1, 435.1, 560, 422.1, 445, 423, 433; 379/144.03, 145, 156, 154, 230, 229; 380/247, 380/270
See application file for complete search history.

(56) References Cited

U.S. PATENT DOCUMENTS 5,148,472 A * 9/1992 Freese et al. ............... 455/408

(Continued)

OTHER PUBLICATIONS

"Frontier Advanced Service Technologies Selects Inet's GeoProbe System for Network Monitoring," Inet News Press Release, Release Date: Nov. 25, 1997.

(Continued)

*Primary Examiner*—Tilahun Gesesse
(74) *Attorney, Agent, or Firm*—Thomas, Kayden, Horstemeyer & Risley LLP

(57) ABSTRACT

A system and method capture data from an SS7 network and pair each invoke message with its corresponding response message. Each message is stored in a daily file as well as in a table dedicated for that particular message type. A separate file is also maintained on each MIN and holds the most current registration information for each MIN. The system and method support four different types of queries: a MIN/ESN query, an active roamer query, a switch-to-switch query, and a transaction statistics query. The MIN/ESN query provides roaming activity on a specific MIN or ESN while the active roamer query provides information on all roamers in a serving market. The switch-to-switch query reveals messaging at one switch or between two switches. The statistics query provides data to a provider on all of its subscribers roaming in foreign networks or on all phones within its own network. The system has a Graphical User Interface (GUI) for displaying information on each message in an easy and convenient manner. The details of a record are displayed in a tabular format with each tab holding data for a group of parameters.

33 Claims, 63 Drawing Sheets

U.S. PATENT DOCUMENTS

| | | | |
|---|---|---|---|
| 5,201,067 A | 4/1993 | Grube et al. | 455/90 |
| 5,237,612 A | 8/1993 | Raith | 380/23 |
| 5,285,494 A * | 2/1994 | Sprecher et al. | 455/423 |
| 5,309,501 A * | 5/1994 | Kozik et al. | 455/410 |
| 5,335,265 A * | 8/1994 | Cooper et al. | 455/410 |
| 5,335,278 A * | 8/1994 | Matchett et al. | 380/248 |
| 5,351,243 A | 9/1994 | Kalkunte et al. | 370/92 |
| 5,420,910 A | 5/1995 | Rudokas et al. | 455/410 |
| 5,448,632 A | 9/1995 | Iyob et al. | 379/201 |
| 5,448,760 A | 9/1995 | Frederick | 455/410 |
| 5,467,382 A | 11/1995 | Schorman | 455/410 |
| 5,546,444 A | 8/1996 | Roach, Jr. et al. | 379/59 |
| 5,555,551 A | 9/1996 | Rudokas et al. | 455/410 |
| 5,592,530 A | 1/1997 | Brockman et al. | 379/230 |
| 5,592,533 A | 1/1997 | McHenry et al. | 455/433 |
| 5,608,725 A | 3/1997 | Grube et al. | 370/249 |
| 5,608,781 A | 3/1997 | Seiderman | 455/411 |
| 5,615,408 A * | 3/1997 | Johnson et al. | 455/405 |
| 5,644,623 A * | 7/1997 | Gulledge | 455/423 |
| 5,655,004 A | 8/1997 | Holbrook | 455/411 |
| 5,712,908 A | 1/1998 | Brinkman et al. | 379/119 |
| 5,715,293 A | 2/1998 | Mahoney | 379/23 |
| 5,715,294 A | 2/1998 | Pester, III | 379/34 |
| 5,719,930 A | 2/1998 | MacDonald et al. | 379/229 |
| 5,758,355 A | 5/1998 | Buchanan | 707/201 |
| 5,774,530 A | 6/1998 | Montgomery et al. | 379/112 |
| 5,799,249 A * | 8/1998 | Kennedy et al. | 455/411 |
| 5,826,195 A * | 10/1998 | Westerlage et al. | 455/456.3 |
| 5,839,063 A * | 11/1998 | Lee | 455/410 |
| 5,901,362 A | 5/1999 | Cheung et al. | 455/525 |
| 5,987,633 A | 11/1999 | Newman et al. | 379/112 |
| 6,047,045 A | 4/2000 | Bauer et al. | 379/207 |
| 6,014,557 A | 11/2000 | Morton et al. | 455/410 |
| 6,215,997 B1 | 4/2001 | Han | 455/423 |

OTHER PUBLICATIONS

"BellSouth Cellular Corp. (BSCC) to Utilize Inet's GeoProbe in Combating Wireless Fraud and Solving Interconnection Billing Challenges," Inet News Press Release, Release Date Mar. 27, 1997.

"LA Cellular to Deploy Inet GeoProbe System," Inet News Press Release, Release Date Jan. 7, 1997.

"INET, Inc. Provides the Foundation for Cellular Roaming Throughout China," Inet News Press Release, Release Date: Jan. 8, 1996.

"AT&T to Manage International Gateway Sites with Inert's GeoProbe System," Inet News Press Release, Release Date Jan. 23, 1998.

"Cincinnati Bell Telephone to Support New Services with Inert's GeoProbe System," Inet News, Release Date: Jun. 3, 1997.

Espinosa, Rolando, "Cellular Signaling Network Management: The Industry's Most Important Challenge," *Telephony*, 227:27-30 (Aug. 22, 1994).

"Inet's SS& Focus Wins Vanguard Network Management Contract," Inet News Press Release, Release Date: Jun. 9, 1998.

"AirTouch Selects Inet's GeoProbe Network Optimization Platform," Inet News Press Release, Release Date: May 16, 1995.

* cited by examiner

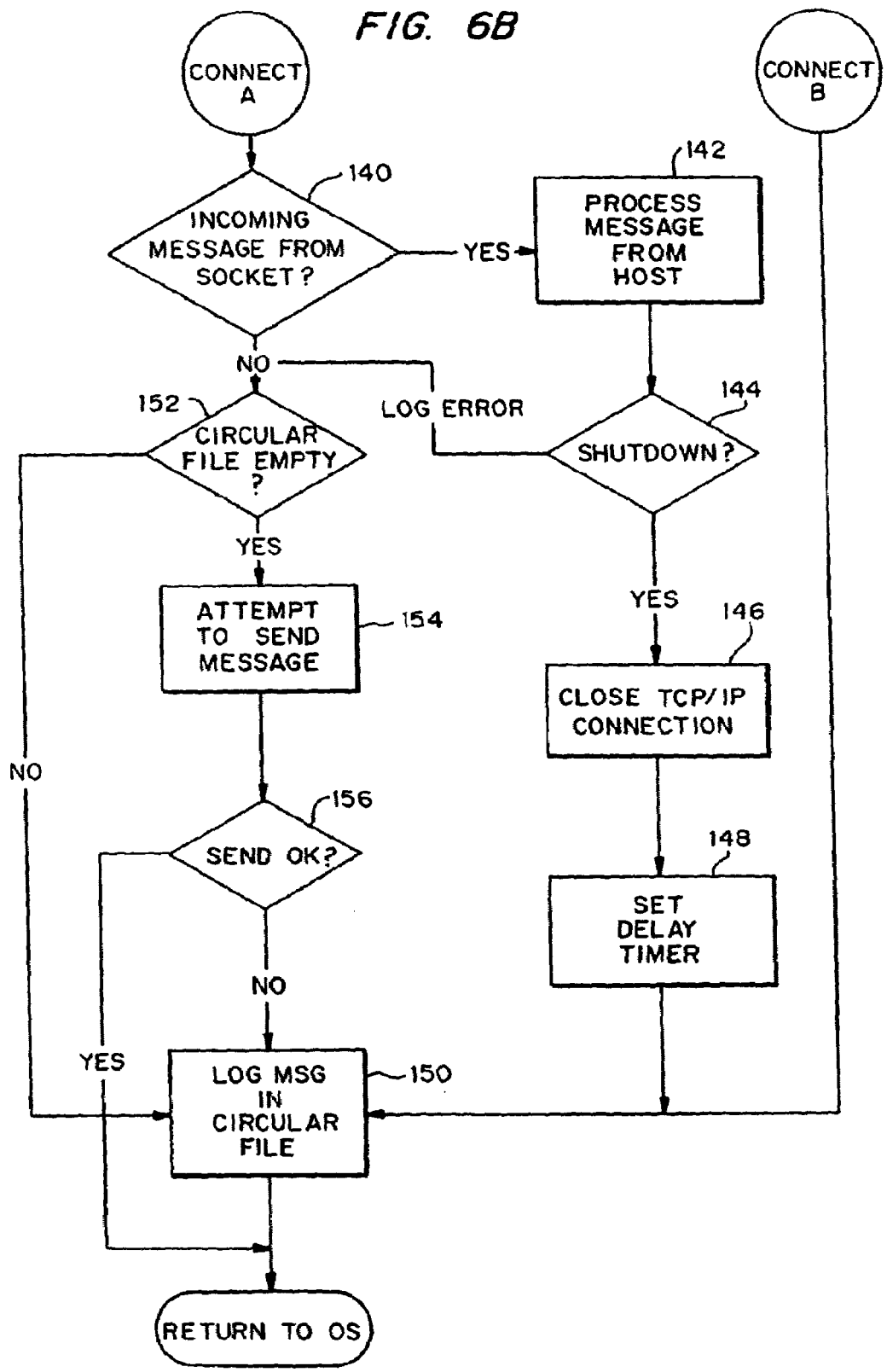

FIG. 7A

Packet:

| HEADER | DATA |
|---|---|
| 19 BYTES | VARIABLE LENGTH |

FIG. 7B

Header: STS ID

| STS ID | LINK NUMBER | OPCODE | MESSAGE TYPE (FLAG) | SEQ NBR | TOTAL MSG LENGTH |
|---|---|---|---|---|---|
| 3 BYTES | 3 BYTES | 1 BYTE | 1 BYTE | 6 BYTES | 5 BYTES |

FIG. 7C

Data:

| TIMESTAMP | TCAP TID | DPC/OPC | IS-41 MESSAGE |
|---|---|---|---|
| 4 BYTES | 4 BYTES | 6 BYTES | VARIABLE LENGTH |

| VISION SS7 Online - [DIPRIMAK] | | | | | | | |
|---|---|---|---|---|---|---|---|
| File View Search Options Help | | | | | | | |

Switch-to-Switch Transactions

OPC: 001-151-101  Date: 1997-12-02 EST   [Run Query]
DPC: 001-151-126  ☐ Exact Date          [Cancel Query]

| S | Date | Time | MsgType | MIN | ESN | SrvMscid | SrvMscidLc | DestPtCode | OrigPtCode |
|---|---|---|---|---|---|---|---|---|---|
| | 1997-12-02 | 00:00:06 | HandMReq | | | | | 001-151-126 | 001-151-112 |
| | 1997-12-02 | 00:00:11 | HandMReq | | | | | 001-151-126 | 001-151-112 |
| | 1997-12-02 | 00:00:16 | HandMReq | | | | | 001-151-126 | 001-151-112 |
| | 1997-12-02 | 00:00:26 | HandMReq | | | | | 001-151-126 | 001-151-112 |
| | 1997-12-02 | 00:00:56 | HandMReq | | | | | 001-151-126 | 001-151-112 |
| | 1997-12-02 | 00:01:13 | HandMReq | | | | | 001-151-126 | 001-151-112 |
| | 1997-12-02 | 00:01:23 | HandMReq | | | | | 001-151-126 | 001-151-112 |
| | 1997-12-02 | 00:01:28 | HandMReq | | | | | 001-151-126 | 001-151-112 |
| | 1997-12-02 | 00:01:37 | HandMReq | | | | | 001-151-126 | 001-151-112 |
| | 1997-12-02 | 00:01:40 | HandMReq | | | | | 001-151-126 | 001-151-112 |
| | 1997-12-02 | 00:01:51 | HandMReq | | | | | 001-151-126 | 001-151-112 |
| | 1997-12-02 | 00:01:58 | HandMReq | | | | | 001-151-126 | 001-151-112 |
| | 1997-12-02 | 00:02:08 | HandMReq | | | | | 001-151-126 | 001-151-112 |
| | 1997-12-02 | 00:02:31 | HandMReq | | | | | 001-151-126 | 001-151-112 |
| | 1997-12-02 | 00:02:41 | HandMReq | | | | | 001-151-126 | 001-151-112 |
| | 1997-12-02 | 00:02:48 | HandMReq | | | | | 001-151-126 | 001-151-112 |
| | 1997-12-02 | 00:02:53 | HandMReq | | | | | 001-151-126 | 001-151-112 |
| | 1997-12-02 | 00:02:58 | HandMReq | | | | | 001-151-126 | 001-151-112 |
| | 1997-12-02 | 00:03:01 | HandMReq | | | | | 001-151-126 | 001-151-112 |
| | 1997-12-02 | 00:03:03 | HandMReq | | | | | 001-151-126 | 001-151-112 |

Query cancelled by user (1338 records returned)  0 messages filtered.     Tuesday, December 02, 1997  09:27 AM

FIGURE 33B

Transaction Statistics

BSCC

Context: ● Roaming ○ Serving

Region: ALL

SID: [ ] Switch: [ ]

NPA-NXX: [ ]

MIN: [ ]

Roaming Partner

Co: ALL

SID: [ ] Switch: [ ]

NPA-NXX: [ ]

MIN: [ ]

Date: 1997-12-02 EST

☐ Destination Point Code: GTE Clearinghouse only

[Run Query] [<<] [>>] [Cancel Query]

[Run Query] [Print] [Help]

| Home Company | Serving Company | RegNots | Valid | Invalid | Unpaired | Reject |
|---|---|---|---|---|---|---|
| BMI Reg 3 | ONEONTA TELEPHONE CO | 12676 | 12456 | 220 | 0 | |
| BMI Reg 1 | ALLTEL | 3212 | 3129 | 83 | 0 | |
| BMI Reg 3 | BMI Reg 3 | 142 | 141 | 1 | 0 | |
| BMI Reg 5 | BMI Reg 3 | 1385 | 1350 | 35 | 0 | |
| BMI Reg 3 | BMI Reg 5 | 1464 | 1034 | 17 | 413 | |
| BMI Reg 1 | BMI Reg 5 | 159 | 157 | 0 | 2 | |
| BMI Reg 3 | BMI Reg 3 | 295 | 290 | 5 | 0 | |
| BMI Reg 1 | BMI Reg 4 | 122 | 104 | 18 | 0 | |
| BMI Reg 3 | BMI Reg 2 | 780 | 701 | 65 | 14 | |
| BMI Reg 1 | BELL ATLANTIC NYNEX MOBILE | 3365 | 3146 | 162 | 57 | |
| BMI Reg 4 | BMI Reg 2 | 2864 | 2699 | 147 | 18 | |
| ACC Reg 2 | UNITED STATES CELLULAR | 902 | 855 | 44 | 3 | |
| ACC Reg 1 | VANGUARD CELLULAR SYSTEMS | 1453 | 1295 | 158 | 0 | |
| ACC Reg 1 | GTE WIRELESS | 434 | 420 | 14 | 0 | |
| BMI Reg 1 | ONEONTA TELEPHONE CO | 13 | 12 | 1 | 0 | |
| BMI Reg 1 | CAROLINA WEST WIRELESS | 34 | 33 | 1 | 0 | |
| BMI Reg 2 | SOUTHWESTERN BELL MOBILE SYSTEMS | 31 | 17 | 13 | 1 | |

Select search criteria prior to running query

Record Details - RegistrationNotification

Tabs: Short Message Service | Call Info | Messages Waiting | System
Authentication | Switch Information | Other Parameters
General | Calling Features | Point Code and Subsystem | Account Info

MIN: 954-240-6379   ESN: 15608624553

SID

| | | Desc: | System Type: |
|---|---|---|---|
| MSCID: | | | |
| Home: | 24 | Miami | AT&T |
| Serving: | 40/2 | Sanfranciscoca | AT&T |

Dest Pt Cd: 001-151-104   Orig Pt Cd: 235-015-006
Dialed Digits: No Data   Auth Period: 1 Hour(s)
Origination Ind: World Zone 1   PIC Code: No Data
Access Denied: No Data   Deny Access: No Data
Qualification Info: Validation And Profile

Errors

Return Error: No Data   Auth Denied: No Data
Faulty Param: No Data
Msg Reject: No Data ☑ Same Type   [Prev] [Next] [Print] [Close]

FIGURE 41B

SYSTEMS AND METHODS FOR PROVIDING VISIBILITY TO SS7 INTEGRATED ON-LINE NETWORKS

This application is a continuation of U.S. application Ser. No. 09/135,519, filed Aug. 17, 1998 now U.S. Pat. No. 6,501,950, entitled "Systems and Methods for Providing Visibilitiy to SS7 Integrated On-Line Networks" which is a continuation-in-part of U.S. application Ser. No. 08/615,962, filed Mar. 14, 1996, entitled "Apparatus and Methods for Providing Wireless System Fraud and Visibility Data" (now U.S. Pat. No. 6,014,557).

FIELD OF THE INVENTION

The present invention relates in general to the field of telecommunications and in particular to the field of wireless telecommunications systems administration, fraud detection, customer service, engineering support, and technical support.

BACKGROUND OF THE INVENTION

The market for telecommunications services has grown at an extraordinary pace, and perhaps the greatest growth has occurred in the market for wireless communications, including cellular networks and personal communication systems.

Conventional wireless telecommunication systems employ numerous independent cellsites ("cells"). Each cell covers a designated geographic area and is connected via a dedicated network (usually leased lines or microwave) to a Mobile Switching Center ("MSC") that is in turn connected to the Public Switched Telephone Network ("PSTN"). The MSC handles all call processing intelligence, switching functionality, fault detection and diagnostics. MSCs are also integral to the operation of recently developed Personal Communication Systems ("PCSs"), another type of wireless system. A PCS utilizes numerous "microcells" that blanket a high use area, or an area where terrain features limit transmission capabilities (e.g., a downtown office district with tall buildings.) Because of the greater number of cells, the PCS can handle a significantly greater volume of traffic. Located within each PCS microcell is a low power transmitter. After receiving the subscriber's signal, the low power transmitter communicates (normally via microwave, PSTN, or data lines) with a controller. The controller, in turn, communicates with the MSC. Each PCS or cellular network covers only a specified "home" geographic area. Consequently, as the mobile user moves out of the home area and into a "foreign" area, telecommunications service is provided by a "foreign" wireless service provider typically not associated with the user's home wireless service provider. Operation in a foreign area is known as "roaming."

The deployment of Signaling System Number 7 ("SS7") networks for wireless systems like PCS or cellular networks has permitted carriers to supply a number of new applications to wireless systems' customers. SS7 is a highly flexible common channel signaling standard specifically designed for providing circuit and database related message flow control in networks. The feature enhancements to services made possible SS7 have accelerated its deployment. But most cellular systems continue to use services furnished by outside network providers. The high price of those services has tended to lead wireless services providers to deploy their own SS7 networks.

The fees associated with the use of network services provided by third parties, which may be charged on a per transaction basis, lead to higher consumer prices for wireless communications services. The cost of paying network providers to operate a SS7 or other network, and the consumer prices they result in, may represent a serious constraint on wireless growth. An additional impediment to growth in the market for wireless services is the absence of a seamless roaming environment. In a seamless roaming environment, enhanced communications services are provided to mobile subscribers as they move about the nation (or, more optimistically, through various parts of the world), without diminution in service as one crosses boundaries between service providers.

Fraudulent uses of wireless systems pose an even greater threat to growth of wireless communications. For example, industry fraud losses exceeded an estimated four hundred million dollars in 1994.

Geographic expansion of services permitted by the creation of a nationwide network has accelerated the already significant cellular fraud. The incidence of fraud has significantly worsened as carriers allow users to make calls from anywhere in the country. Losses for 1995 are estimated at over one and a half million dollars per day. Growth in fraud losses for the first time exceeds industry growth.

Indeed, some wireless service providers have been forced by the overwhelming costs of fraud to suspend roaming service in foreign areas where its incidence is high. Preventing or minimizing the fraudulent use of wireless systems is therefore a necessary precondition to putting the industry back on a solid growth track and developing a nationwide network providing seamless roaming.

Two types of fraud are prevalent. One is "cloning fraud," in which a valid customer's mobile identification number ("MIN") and/or electronic serial number ("ESN") are "cloned" or copied into another cellular set. Most typically, cloning fraud is perpetrated in a foreign service provider's network. Even when the fraud occurs outside of the home service provider's network, the home service provider remains liable for the fraud, the costs of which directly diminish the service provider's revenue.

A second typical fraud problem involves subscribers who are not entitled to service (e.g., because they have failed to pay their bills or obtained service under false identities, etc.), but who nevertheless attempt to obtain roaming service in a foreign service provider's wireless system. Roaming involves a validation process to determine if the roamer is legitimate in its home system. The switches of systems located geographically close to one another are often coupled because those systems' customers will frequently roam into the adjacent area. These systems can directly communicate with one another to exchange validation requests and fraud control data. In any event, even if some switches of different systems were coupled, those switches may nevertheless be unable to communicate with one another to exchange validation requests and fraud control data for the simple reason that the switches may be incompatible with one another. As a result, a national clearinghouse system for handling fraud and roamer management has arisen.

A national clearinghouse typically has a database containing so called "negative files" including lists of stolen phones and cloned MINs. The typical clearinghouse also couples to the MSCs of subscribing systems in order to access subscriber data, usually called the HLR or Home Location Register, to validate subscribers for whom services are being requested in a foreign market whose service provider is also a member of the clearinghouse network. A national clearinghouse is capable of providing on-line support as well as a data feed. The clearinghouse validates customers prior to allowing a request for telecommunications service to proceed. But by the time the clearinghouse checks its own database and then, if necessary, the database of the subscriber's carrier, the foreign carrier may already have permitted a fraudulent roaming communication to occur.

In order to detect "cloning fraud," a service provider may use, among other methods, a fraud management system that develops usage profiles. These profiles are based on the communications traffic information for particular customers and are obtained from billing records and other sources. If a call does not match the customer's profile, an analyst may contact the customer. A fraud detection system (like Clone-Detector available from GTE TSI (Telecommunications Services Inc.)) analyzes calling patterns to identify calls made close in time using identical MINs in widely-separated geographical areas. This type of condition generally indicates that one of the MINs is a clone. The customer corresponding to the MIN is contacted for confirmation and appropriate steps are taken to lock the clone out of the system.

Some clearinghouses are presently attempting to offer both fraud detection systems and customer on-line support systems intended to react in real time. Clearinghouses charge each subscribing service provider a per-transaction fee for providing fraud management services and also charge for certain on-line support data. In addition to charging transaction fees, clearinghouses incorporate each subscribing service provider's valuable and commercially sensitive customer information into a central pool within its exclusive control. Clearinghouses provide needed roamer visibility. But subscribing service providers lose the ability to obtain data on their own network transactions if they choose not to utilize the clearinghouses for validation for particular transactions. Data of this sort is critical, not only for network operation, but also for purposes of planning and marketing. Understandably, subscribing service providers also prefer to maintain control over their own customer profile and system traffic information. They thus prefer to eliminate the clearinghouse service and directly manage user validation for their own networks in order to eliminate the transaction fees charged by the clearinghouses and obtain their own on-line support data.

Subscribing service providers can circumvent the clearinghouse services by networking their switches with switches in foreign service providers' systems. This process is facilitated by deployment of SS7 networks, coupled with the advent of IS-41. IS-41 is an interim standard created by the Electronic Industry Association/Telecommunications Industry Association ("EIA/TIA") that permits switches produced by different manufacturers to communicate with one another. IS-41 enables the switch of a home system of a roaming subscriber to communicate with a foreign system providing services to the roaming subscriber in order to transmit validation and customer profile information. IS-41 messages may be transported over SS7 networks that many service providers are already connected with or soon will be deploying. Other standards may be developed and will likely also be capable of transmission over SS7 networks. Using such standard message formats and protocols, switches belonging to differing service providers become capable of requesting validation data and exchanging customer profile information. This information sharing not only eliminates the high transaction charges associated with a national clearinghouse, but it also returns control of valuable, proprietary customer profile information to the service providers.

Since many such fraud detection systems (such as GTE's) obtain fraud control and customer support data feeds from links between an individual MSC and clearinghouse, as wireless service providers connect their switches directly using SS7 or another network, the data traffic occurring between such interconnected switches is no longer "visible" to the clearinghouse system. In other words, clearinghouse systems often cannot obtain information on transactions involving wireless service providers whose switches are coupled directly to each other via the SS7 network.

Obviously, this is a problem that directly impedes clearinghouses ability to provide accurate and comprehensive fraud control and customer support data. The problem will accelerate as more service providers interconnect via SS7 or other networks. Such interconnections will increase as service providers take advantage of the flexibility of the SS7 network and new standards like IS-41 in order to interconnect directly with other service providers in adjacent geographic regions or in high use metropolitan areas frequented by business or tourist travelers.

Further, with the advent of SS7 networks, future service enhancements are likely. Those enhancements should be provided without disrupting fraud data feeds and other customer service operations; current systems do not eliminate or minimize disruptions, however.

As wireless service providers link their switches and move toward a nationwide network, "they will bypass the traditional methods of capturing roamer messages. They will have to assume more responsibility for insuring that the systems they use provide the required level of message visibility to maintain superior customer service and roamer management—especially as more customers are roaming and using additional enhanced services." Rolando Espinosa, "The Industry's Most Important Challenge: Cellular Signaling Network Management," Telephony, Vol. 227 at 27 (Aug. 22, 1994.) The ongoing and projected future conversion to SS7 networks therefore requires new methods and systems to extract fraud control and customer support information.

Even for service providers that may not adopt the SS7 or other standard network protocols, fraud control and customer on-line support systems furnished by outside providers suffer from drawbacks, both technical and financial. Among their technical shortcomings, the systems may not provide the full fraud data feeds necessary for minimizing and managing network fraud. Nor do the systems provide complete message "visibility" information on transactions with some of the carrier's closest roaming partners may not be obtained and transmitted to either the fraud control or customer support systems. Financially, reliance on outside network providers for fraud control and customer support systems costs service providers significant ongoing transaction fees.

Service providers face other difficulties which are only aggravated as they interconnect their switches to the switches of other service providers. Customer service, for example, is one aspect of operating a wireless network that becomes more of a challenge when subscribers roam into other service areas. Even when a subscriber has difficulty within the service provider's home network, isolating the source of the problem may take days or even weeks. The problem, for instance, could be with the subscriber's phone, with a particular switch within the provider's network, with the subscriber's billing system, or with a Home Location Register (HLR). Locating the problem is often accomplished through a process of elimination. When the problem occurs when the subscriber is roaming, the possible sources of the fault are compounded and additional time and expense may be incurred before the problem can be detected and corrected.

The difficulty in providing customer service is endemic of a larger difficulty in maintaining a service provider's network. Even when the source of the problem is known, such as a particular switch within the network, identifying and correcting the precise problem is often not an easy task. For a switch, the service provider must dispatch personnel to the switch so that they can monitor the operations of the switch. The personnel then try to replicate events that triggered the problem or fault in the hopes that they can detect the source of the fault. In general, the engineering and technical support personnel react to the problems and are often unable to stop problems before they occur. Additionally, the engineering and technical support personnel attempt to isolate and correct problems by monitoring future activity of the network and do not have clear records as to what occurred in the past at the time of the problem.

As discussed above, the advent of IS-41 allows greater communication between switches, especially between switches of two different service providers. The IS-41 messages transmitted and received by a service provider contains information about its network and subscribers and can be extremely valuable to the service provider. The service provider, however, is typically unable to capture the value in these messages since a single service provider have hundreds of thousands of these messages passing through its network each day. With such a large volume of messages, a service provider cannot easily extract useful information from the messages and the potential value in the messages is not captured.

SUMMARY OF THE INVENTION

According to one aspect, the present invention provides apparatus and methods for capturing information relating to communications traffic from one or more wireless telecommunications systems, and for processing the captured information at a message processor to produce roamer visibility and fraud data useful in administering such systems. A monitoring and data capture platform or subsystem monitors each of the telecommunications links coupling a Mobile Switching Center ("MSC") or network elements like Signal Transfer Points or particular types of MSCs directly. This data capture subsystem may be configured to capture selected data pertaining to wireless telecommunications, including any number of desired call control and processing messages, depending on the type of data desired for roamer visibility, fraud control engineering, customer support or other functions of importance to wireless service providers, whether they provide cellular, PCS or other wireless communications network services. The selected data, typically in the form of messages in an operative protocol (e.g., the IS-41 protocol), can then be buffered for analysis or transmission. The selected data can be formatted and transmitted to (1) a message processor subsystem for further processing or (2) directly to a fraud system, customer support system, or other administrative instrumentality for further analysis or use.

Similarly, a method associated with the data capture apparatus furnishes visibility and/or fraud data relating to wireless communications based on related message traffic. Signals pass through various network elements like a Signal Transfer Point ("STP") pair or switch and are transmitted over at least one telecommunication network link coupled to at least one wireless switching center. A data capture device is coupled to at least one of the links or one of the network elements. Links or network elements are monitored for messages of interest, such as a message belonging to a preselected (and changeable) set of message types.

According to the method, signals containing messages relating to wireless telecommunications traffic are read off of at least one of the telecommunications links. Messages pertaining to wireless traffic are identified, and, of these messages, those belonging to a preselected (but changeable) set of message types are selected. Selected messages are then forwarded to an administrative instrumentality. The administrative instrumentality may be a message processor that further processes messages received from a plurality of data capture devices to collate messages or filter out from the incoming data stream messages redundant to those already provided by an outside source. Alternatively, message processing can be done at the data capture device and messages forwarded directly to other administrative instrumentalities like a fraud detection system, customer on-line support station or any other end-user capable of operating upon the captured messages.

In an illustrative embodiment of a system according to the present invention, the data capture subsystem is configured to transmit the selected data to a message processor for further processing to yield useful visibility and fraud data. (Generally, "visibility data" is wireless system data that identifies subscriber roaming activity between wireless systems. An example of some of the visibility data generated is the location and system usage of roaming subscribers.) The message processor stores selected incoming messages from the data capture subsystem in a memory location. The message processor then collates received messages with the stored messages to provide roamer visibility, fraud, or other useful administrative data. This data may be made available for query by on-line customer support workstations that may display the forwarded data on a real-time basis. Additionally, the message processor processes incoming captured messages and extracts certain data for transmission to a fraud detection or control system in the form of a data feed, for example.

A data capture portion of an embodiment of the present invention thus generates a set of wireless telecommunications visibility and/or fraud data based on messages transmitted over at least one telecommunications link or through various network elements. The visibility or fraud data is for use by an instrumentality in monitoring, servicing or otherwise administering a wireless telecommunications system.

One embodiment of a data capture apparatus comprises a link capture device that includes at least one telecommunications link interface; each link interface corresponds and couples to a telecommunications link for reading signals off the link. A processor may be coupled to the link interface and may be programmed for any of the following tasks: retrieving signals read by the telecommunications link interface; identifying messages in the retrieved signals; selecting messages belonging to a preselected set of message types of interest; and formatting the selected messages for transmission to the administrative instrumentality.

Alternative embodiments of data capture apparatus exist for capturing messages of interest from message traffic in wireless systems.

For example, rather than read messages off of telecommunications links, message traffic through a Signal Transfer Point ("STP") can be directly monitored and messages of interest captured. Preprocessors provided for each of a pair of STPs read appropriate message traffic and, after reformatting, forward selected captured messages to a merge processor. The merge processor combines captured messages and forwards them to the message processor.

Alternatively, for MSCs (particularly those manufactured by AT&T) operating with a proprietary protocol (AT&T's protocol is called EFTN) the proprietary intra-switch messages can be "translated" to a standard format (e.g., IS-41). A switch message capture device, implemented in a separate processor or resident on a portion of the message processor, can obtain from the switch "translated" proprietary messages corresponding to messages of interest passing through, translated at and buffered at the switch. (To translate EFTN a software package may be obtained from AT&T and deployed at the switch of interest.) Captured messages are then transferred to an appropriate other portion of the message processor. (Absent this alternative embodiment of data capture device, messages in AT&T's proprietary EFTN format would not be captured since other data capture devices could not recognize the messages of interest given their proprietary format.)

A message processor may generate system fraud and roamer visibility data for use by a service provider in administering its wireless systems and detecting fraud. A portion of the message processor is in communication with at least one data capture device (as described herein), or other device, for capturing from a wireless system messages indicative of wireless system traffic, the messages corresponding to a number of classes. As an example, there may be a first class of "challenge" messages and a second class of "response" messages; these may be typical of any system that uses a query/response (or "ACK"/"NACK") certified delivery method. In wireless systems using IS-41 protocol, the first class of challenge messages would be an "invoke" message; the second class of response messages would be a return result messages.

At least one input port on the message processor may receive messages pertaining to wireless traffic from the data capture device or, if the message processor is centrally located, a plurality of data capture devices. The message processor may be coupled to at least one memory location. (The phrase "memory location" means a memory or data storage device of any sort, or a portion of such a device.) The message processor is programmed to: receive messages indicative of wireless traffic from a data capture device and store in the memory location received messages that belong to the first class. For each received message belonging to the second class, the message processor searches the memory location for a previously stored first class of message related to the received message. If any message located in the search is related to the received message of the second class, the message processor collates the received message with the located message, and provides the collated messages to an end-user or a processor.

A method associated with processing captured messages includes: receiving messages indicative of wireless traffic from the data capture device; storing the received messages belonging to a first class of message (e.g., IS-41 invoke messages) in the memory location; for each received message belonging to a second class (e.g., IS-41 return result messages), searching the memory location for a previously stored message of the first class related to the received message and, if any message located in the search of the memory location is related to the received message of the second class, collating the received message with the located message. Finally, the collated messages are provided to an end-user. Optionally, collated messages may be "filtered" to eliminate those messages already being provided by a third party fraud or customer support system.

Generally, the message processor may be centrally located and in communication with various data capture devices via a LAN, WAN or equivalent communication path. Central location allows for easier changes to the functionality implemented by the message processor. Nevertheless, the message processor may also be deployed with and connected directly to each data capture device. This would free up valuable system bandwidth since raw, unprocessed messages will not be sent, as is the case with a centrally located message processor.

A system for capturing desired messages from a wireless system that uses a preselected signaling system and preselected protocol thus includes data capture devices that (i) monitor wireless system message traffic through various network elements or across at least one network telecommunications link and (ii) select from the monitored messages those corresponding to a preselected set of message types. The system also includes a message processor coupled by a transmission path or directly to the data capture device(s) and programmed to collate selected messages with one another to produce records associated with the wireless telecommunications traffic, as well as means for providing such records to an end-user.

Indeed, if desired, the present invention could be used not only to capture messages of interest but also to monitor for messages of interest. Tallies of messages of interest could then be processed to create various statistics relevant to network traffic and extremely helpful to network engineering or customer support and marketing.

Accordingly, the present invention provides visibility data at a low cost as well as data to maintain or improve the effectiveness of existing fraud detection systems. Adopting the present invention avoids interrupting fraud investigation if the wireless system replaces an X.25 or any other existing network, including a SS7 network operated by an outside network provider, with its own SS7 or other network. Using the present invention, fraud control systems can be deployed in other markets without relying on third-party network operators and without losing roamer visibility when a carrier utilizes a selected protocol, such as SS7, to transport validation transactions. Presently deployed wireless systems will enjoy enhanced productivity benefits flowing from the provision of more detailed, yet real time, customer support, network traffic engineering or other administrative information. By implementing the carefully designed on-line support system, wireless providers will nevertheless receive just the right amount of data of interest, thus optimizing use of valuable system bandwidth.

According to another embodiment of the invention, a system includes a catcher for receiving data from data capture devices. A parser reads the daily files and interprets the messages into tables and fields. If the received message is a registration message or a reject message, then these messages are preferably written into a registration daily file and a reject daily file, respectively. The messages are preferably paired together so that all invoke messages are stored with the corresponding response message.

In the preferred embodiment, the system and method according to the method preferably maintain a separate table for each message type and a master daily file containing general information on all messages received that day. The database is structured so that it holds a week's worth of data, with the last day's data being deleted with each new day. The database also preferably contains a table holding the most current registration information on each MIN. By storing message data into a plurality of tables, responses to queries can be generated more quickly. For instance, rather than reading all of the data in a daily file to determine the location of a particular MIN, the system and method can perform a quick look-up in the MIN table, which contains a significantly less amount of data than the daily files. The system and method furthermore conserve space on the database by coding entries in the tables and fields. For instance, rather than storing "registration notification" when this type of message is received, the system and method instead store a specific number for that message, such as "38."

The system and method support a number of different types of queries. One such query is a MIN/ESN query. With this query, the roaming activity of a specific customer can be ascertained. This search may be performed on a single day or over a range of days. A second type of query that may be performed with the invention is an active roamer query. An active roamer query shows a list of roamers that are active in a serving market. This query may be limited to a certain SID, switch, home SID, or NPA-NXX. A third query supported with the invention is a switch-to-switch query. The switch-to-switch query provides information on all ANSI-41 messaging on one switch or between two switches. The search may be performed on a single day or a range of dates. A fourth query performed with the invention is a transaction statistics query. The transaction statistics query provides information on registration messages between two cellular service providers. With this query, information may be obtained on all subscribers roaming in a foreign market or information may be obtained on everyone served by a home network. This query can be limited to a home region, to specific dates, to a specific roaming partner, and to a particular company, SID, switch, NPA-NXX, or MIN.

From the results of any query, a user can obtain record details on any message. If a user double-clicks on a message in the results section, the information on that message is pulled from the message table and the information is displayed in a tabular format. Each tab of information contains data on a group of parameters. If no data exists for all parameters within a group, then that tab preferably is not displayed to the user.

The system and method provide extremely useful data to a service provider. For customer support, the service provider can more quickly determine the source of a customer's problem. The service provider need not place any type of "sniffer" on a switch but instead can quickly recall the messaging that occurred at the time of the customer's problem. Customer support, for instance, can determine whether the customer is able to register, whether the customer is authorized for a particular service. The engineering and technical support of a service provider can determine the cause of a past problem and, by monitoring the messaging within the network, can even prevent future problems from occurring.

It is accordingly an object of the present invention to provide a data capture device for monitoring and capturing a variety of information on telecommunications traffic within a wireless system.

It is an object of the present invention to provide a plurality of data capture devices, some of which capture data from a telecommunications link, others of which are coupled to particular network elements from which data of interest is captured.

It is a further object of the present invention to provide captured data to an administrative facility, such as a central message processor, where the results are collated or otherwise processed to yield roamer visibility, fraud, or other data useful in the administration of a wireless system.

It is an additional object of the present invention to provide a message processor for (1) receiving messages captured by data capture devices coupled to telecommunications links or network elements in a wireless system and (2) processing the received messages to yield paired IS-41 or other messages that provide roamer visibility and data useful in the detection of fraud.

It is another object of the present invention to provide a central message processor including a database containing roamer visibility data available for query by one or more on-line customer support systems.

It is a further object of the present invention to provide methods and apparatus for providing a central message processor for processing captured messages as well as fraud data received from outside or third party providers to generate a fraud data feed from which redundant fraud-related information has been removed.

It is still a further object of the present invention to provide methods and systems for enabling useful queries to be performed based on captured data.

It is yet another object of the present invention to provide methods and systems for allowing the capture of real-time roaming statistics.

It is another object of the present invention to provide methods and systems for allowing the capture of real-time data for use by engineering or technical support.

It is still another object of the present invention to provide methods and systems for enabling results of a query of a database to be returned in a relatively short period of time.

Other objects, features and advantages of the present invention will become apparent upon reading the remainder of this document.

BRIEF DESCRIPTION OF THE DRAWINGS

FIG. 6B is a flowchart illustrating a second portion of the logic flow associated with a real time decoding function implemented by a data capture device.

FIG. 7A illustrates the format for a data packet carrying a message captured by a data capture device.

FIG. 7B illustrates the format for a header portion of a data packet carrying a message captured by the data capture device.

FIG. 7C illustrates the format for a data portion of a data packet carrying a message captured by the data capture device.

FIG. 30A is an example of a GUI showing results of a MIN/ESN query and FIGS. 30B and 30C are examples of GUIs showing details of a specific record in the results of FIG. 30A.

FIG. 31A is a header for use with the GUI in performing an active roamer query and FIG. 31B is an example of the GUI showing results of an active roamer query.

FIG. 33A is a header for use with the GUI in performing a switch-to-switch query and FIG. 33B is an example of the GUI showing results of a swith-to-switch query.

FIG. 35A is an example of a GUI for performing a Transaction Statistics query and FIGS. 35B to 35F are examples of GUIs showing results of Transaction Statistics queries at various levels of specificity.

FIGS. 39A to 39C are GUIs showing record details of an authentication failure report message.

FIGS. 40A and 40B are GUIs showing record details of a feature request message.

FIGS. 41A and 41B are GUIs showing record details of a registration notification message.

In the flowcharts in this document, neither the particular breakdown of the logic into steps, nor the specific ordering of the steps, is required for implementation of the invention. Rather, the flowcharts provide one illustration of the operational logic of the invention; other implementations consistent with that logic could also be relied upon to practice the present invention. That the logic is illustrated in certain of the Figures according to a serial processing model, as opposed to, say, an object-oriented approach, is intended only for clarity of discussion, and does not limit the invention to a particular implementation approach.

DETAILED DESCRIPTION OF THE DRAWINGS

System Level Overview

Figure 1:
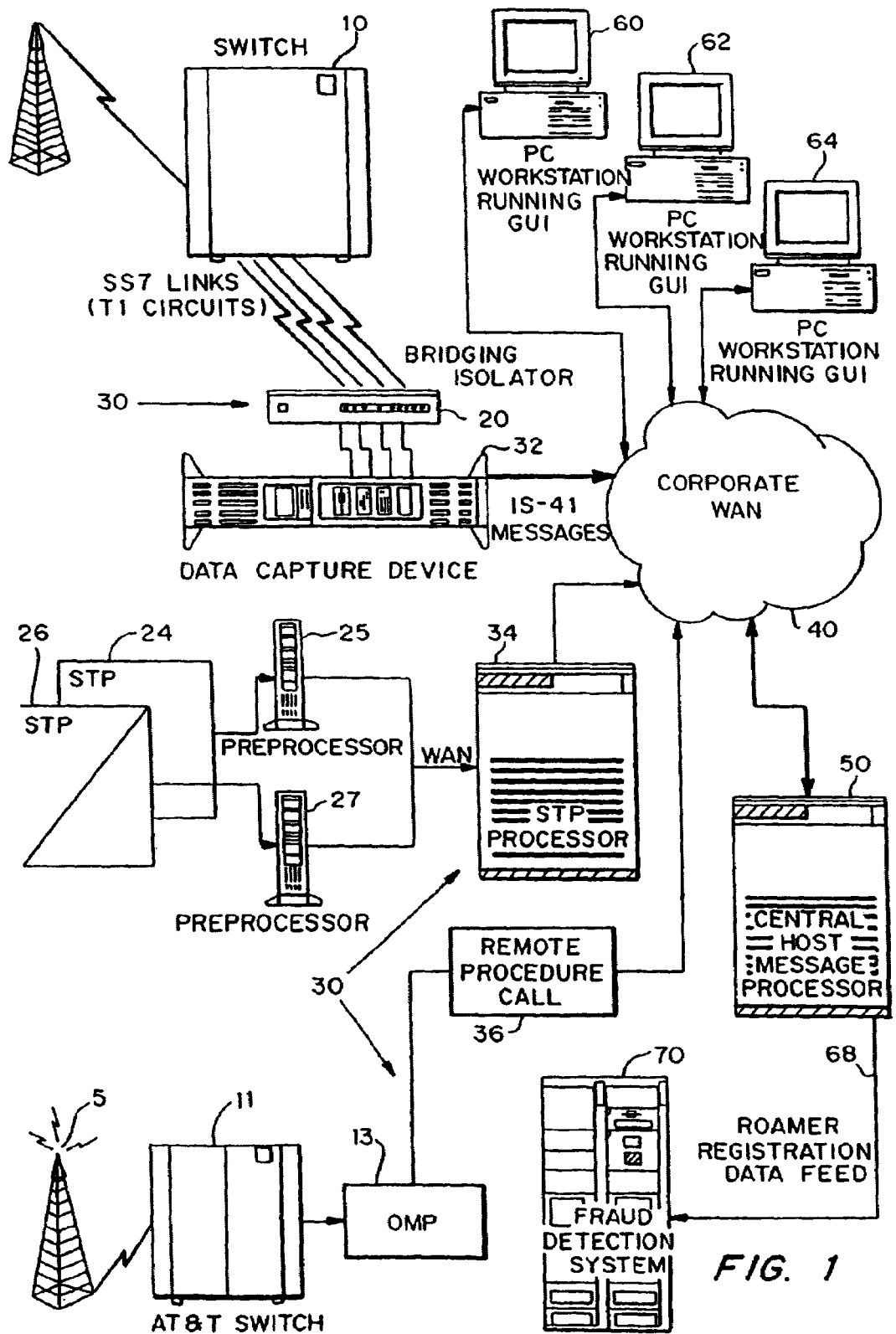
FIG. 1 is a schematic illustration of the architecture of an embodiment of a system for capturing fraud and customer data relating to a wireless telecommunications system according to one embodiment of the present invention.

FIG. 1 presents a high-level overview of the architecture of a system including apparatus and methods for capturing fraud and customer-related data from a wireless system according to one aspect of the present invention. The system and the methods carried out by the system include two main components: (1) data monitoring and capture; and (2) generation of visibility and fraud data from captured messages.

Representative switch 10 of a wireless telecommunications system may be a mobile telephone switching office (MTSO), MSC or other known mechanism for switching wireless telecommunications traffic from or to one or more wireless devices, an example of which is represented by antenna 5. Switch 10 couples by one or more links to corresponding elements of a public or proprietary network operating under a signaling standard, such as the SS7 standard. The switch 10 may be used by a cellular or PCS company to transport wireless validation transactions (using, e.g., a protocol like IS-41) on a switch-to-switch basis, rather than by resorting to a clearinghouse to perform validations. For purposes of this description, but without limitation, reference will be made to the SS7 signaling standard and to the IS-41 interim standard. (The Electronic Industries Association/Telecommunications Industry Association ("EIA/TIA") has published Interim Standard 41, Revisions A, B and C. Copies of these are available from the Electronic Industries Association, 2001 Pennsylvania Ave., N.W., Washington, D.C. 2006. The IS-41 standards, including all revisions, are hereby incorporated in their entirety by this reference.) Nevertheless, the system is in no way limited to functioning in the context of these standards, which include all future revisions, but could just as easily be adapted to work with networks operating under other signaling or interim messaging standards.

Figure 2:
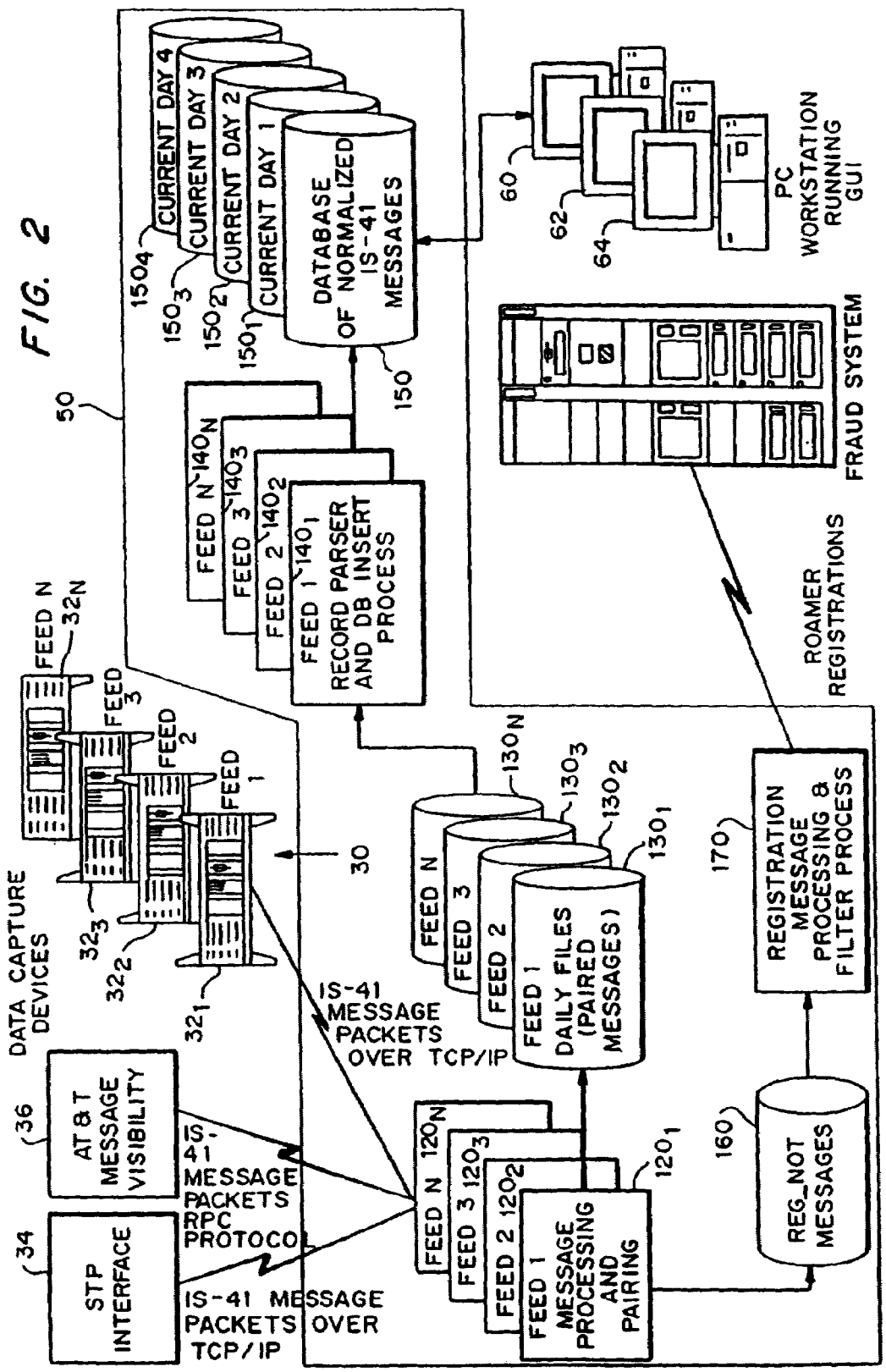
FIG. 2 is a schematic illustration of data flows associated with the system architecture illustrated in FIG. 1.

Various embodiments of data capture devices 30 are shown in FIGS. 1 and 2. Thus, link capture device 32, STP capture device 34 and switch capture device 36 each comprise a data capture device 30. Each can identify messages of interest out of a number of signals indicative of wireless traffic over a wireless telecommunications system. Output from a particular data capture device 30 is forwarded to a central message processor 50 by any suitable means for transporting digital data. For example, but without limitation, data retrieved and processed by link capture device 32 may be made available on a local area network (LAN), such as an Ethernet LAN, or over a corporate wide-area-network (WAN) 40, as illustrated in FIG. 1, to the central message processor 50.

Data capture devices 30 may monitor the wireless systems for any wireless traffic, including IS-41 messages, SS7 messages or TCAP messages. Wireless traffic is buffered, individual messages identified and messages of a particular type of interest are selected. For example, assuming the network transports messages in an IS-41 standard format, any embodiment of data capture device 30 can at least identify and capture the following set of IS-41 messages:

1. Registration Notification ("REG_NOT")
2. Qualification Request ("QUAL_REQ")
3. Qualification Directive ("QUAL_DIR")
4. Service Profile Request ("SRV_PRF_DIR")
5. Service Profile Directive ("SRV_PRF REQ")
6. Return Result IS-41 return result messages do not indicate the invoke message type to which they correlate. Accordingly, monitoring and capturing of all return results messages may be necessary to ensure that later message collating produces complete message sets that identify a wireless system transaction.

Alternative embodiments allow other or additional sets of message to be captured. Alternative message types (and their functions) are described in the IS-41 standards previously incorporated by reference as well as in future revisions and standards. Message sets may be selected for gathering not only data for customer support and fraud management, but also for network engineering. For example, message sets dealing with call setup or call feature activation may be chosen. Appropriate IS-41 messages, like Route Request that gives the dialed digits and destination, would be chosen to fill in this set, in which network engineering might be interested.

Generally, changing to a different message set is done simply by identifying which set of messages is to be captured and informing data capture device 30 of that set by software exchange (e.g., by providing a system disk or modem upload of the new message set of interest.) Also, if the invention is implemented with other than an IS-41 standard in place, messages analogous to those listed above could be gathered by data capture device 30. In any event, a set of captured and identified messages may be formatted into TCP/IP packets, as seen in FIGS. 7A–7C, and forwarded to central message processor 50 for further processing.

The central message processor 50 is preferably a facility for receiving data handled at a plurality of switches (not shown) and captured by corresponding data capture devices 30 similar or identical in function to link capture device 32, STP capture device 34 or switch capture device 36. IS-41 (or other) messages captured from SS7 links at switches 10 by these data capture devices 30 may be provided to the central message processor 50 via any suitable means, but in the preferred embodiment are sent in packets over a WAN 40 running the TCP/IP protocol. Central message processor 50 aggregates, stores, and processes the received IS-41 messages in order to provide coordinated customer-related visibility and fraud data, as will be described in detail below.

Messages captured by data capture device 30, and processed by central message processor 50 to yield useful data for visibility and fraud analysis, can be made available for query by one or more client customer on-line stations (several of which are indicated by reference numerals 60, 62 and 64) via WAN 40. These customer on-line stations are thereby provided with visibility data for roaming wireless service subscribers, enabling on-line customer service representatives (operating on-line stations 60, 62, 64, etc.) to provide quick, high quality and responsive service to subscribers of (or roamers using) the wireless system. Furthermore, fraud data in the form of a roamer registration feed culled from each switch, of which switch 10 is a single example, may be processed by captured data processing device 50 and provided to a fraud detection system 80 via an appropriate link 68.

FIG. 2 illustrates representative data flows between components of the embodiment shown in FIG. 1. Link capture device 32 monitors each link to which it is coupled for any message that belongs to a set of IS-41 message types useful for customer on-line support and fraud data feed purposes. In FIG. 2, N link capture devices $32_1$, $32_2$, $32_3$, through $32_N$, each receive a corresponding feed from an SS7 link for a particular switch. Also, STP capture device 34 receives a captured data feed from a pair of STPs 24 and 26 and switch capture device 36 receives a captured data feed from AT&T switch 11 that operates via the proprietary EFTN protocol. As described in connection with FIGS. 3–6, the link capture devices $32_{1-N}$, STP capture device 34 and switch capture device 36 each retrieve IS-41 messages and format the messages into packets (one format for which is described in connection with FIGS. 7A–7C, below.) The resulting packets are transmitted to the central message processor 50 via an appropriate transmission means, such as a corporate WAN 40 supporting the TCP/IP protocol, or other suitable path.

For example, but without limitation, the central message processor 50 may be implemented by a Hewlett Packard HP 9000 K400. The central message processor 50 preferably includes a subprocessor corresponding to each link capture device $32_{1-N}$, STP capture device 34 and switch capture device 36 for receiving and processing received IS-41 message packets. Each of the subprocessors of central message processor 50 preferably runs in parallel a set of message pairing and processing procedures $120_{1-N}$, each corresponding to the message feed received from a particular data capture device 30 over WAN 40. The operations of these procedures are discussed below in connection with FIGS. 8–10.

Each message processing and pairing operation $120_{1-N}$ writes its results to an associated daily file $130_{1-N}$ that contains paired IS-41 invoke and return-result messages for a particular day. The same process also detects registration notification messages (Reg_Not) and writes them to Reg_ Not file 160.

Records in the daily files $130_{1-N}$ containing paired message data are parsed by associated record parsing and database insertion processes $140_{1-N}$. These processes $140_{1-N}$ each insert their results into a database 150 of normalized IS-41 messages. Database 150 may be implemented by a suitable, commercially available database, such as (without limitation) an Informix Software, Inc. relational database. Other suitable databases, such as those marketed by Sybase and Oracle might also be used. Results inserted into database 150 preferably are also organized by day, so that previous days' results are available: paired messages for the day prior to the current day may be stored in a database table 150₁; for the day two days prior to the current day may be stored in database table 150₂; through a period N days prior to the current day may be stored in a file 150ₙ.

IS-41 messages typically contain information regarding the origination and timing of message generation. Thereby, the central message processor 50 can process paired message (and expired invoked messages) to sort them by day and occurrence of call. Sorted message are then indexed, segmented by date and stored in the database 150. Database 150 thus provides comprehensive visibility data available for query according to known techniques by customer on-line workstations, e.g., workstations 60, 62, and 64.

The registration notification (Reg_Not) messages stored in Reg_Not file 160 are processed and filtered according to a procedure 170 described in detail in connection with FIG. 11. The resulting filtered data may be provided via link 68 as a fraud feed comprising roamer registrations. This fraud feed can be used by existing fraud detection systems, such as fraud system 70, to detect various instances of fraudulent system use.

Data Capture Devices

Figure 3:
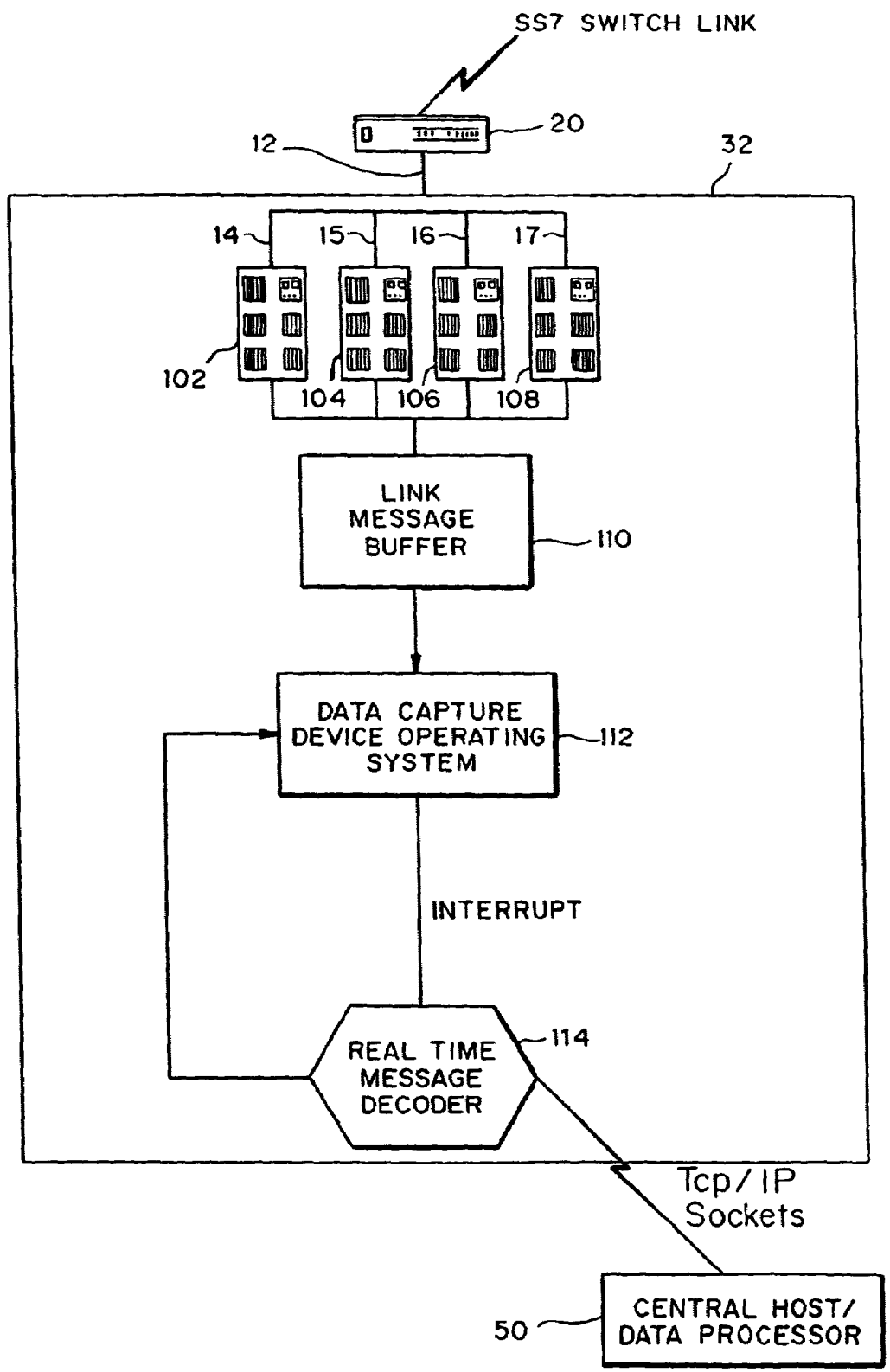
FIG. 3 is a block diagram illustrating signal links, interfaces and functionality of an embodiment of a data capture device and method for capturing fraud and customer data from a wireless system according to the present invention.
Figure 4:
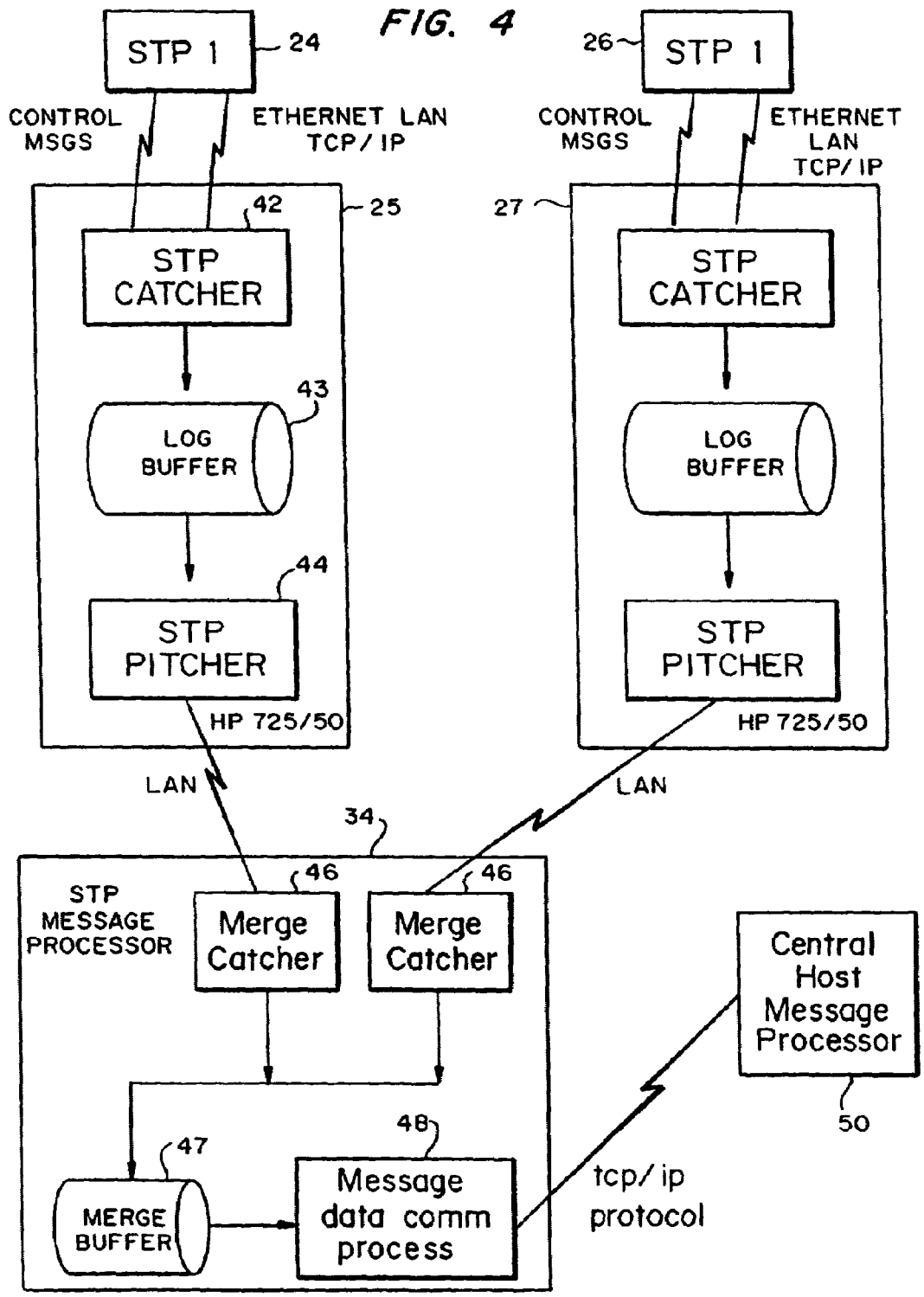
FIG. 4 is a block diagram indicating the functionality and components of another embodiment of a data capture device for coupling to STPs.
Figure 5:
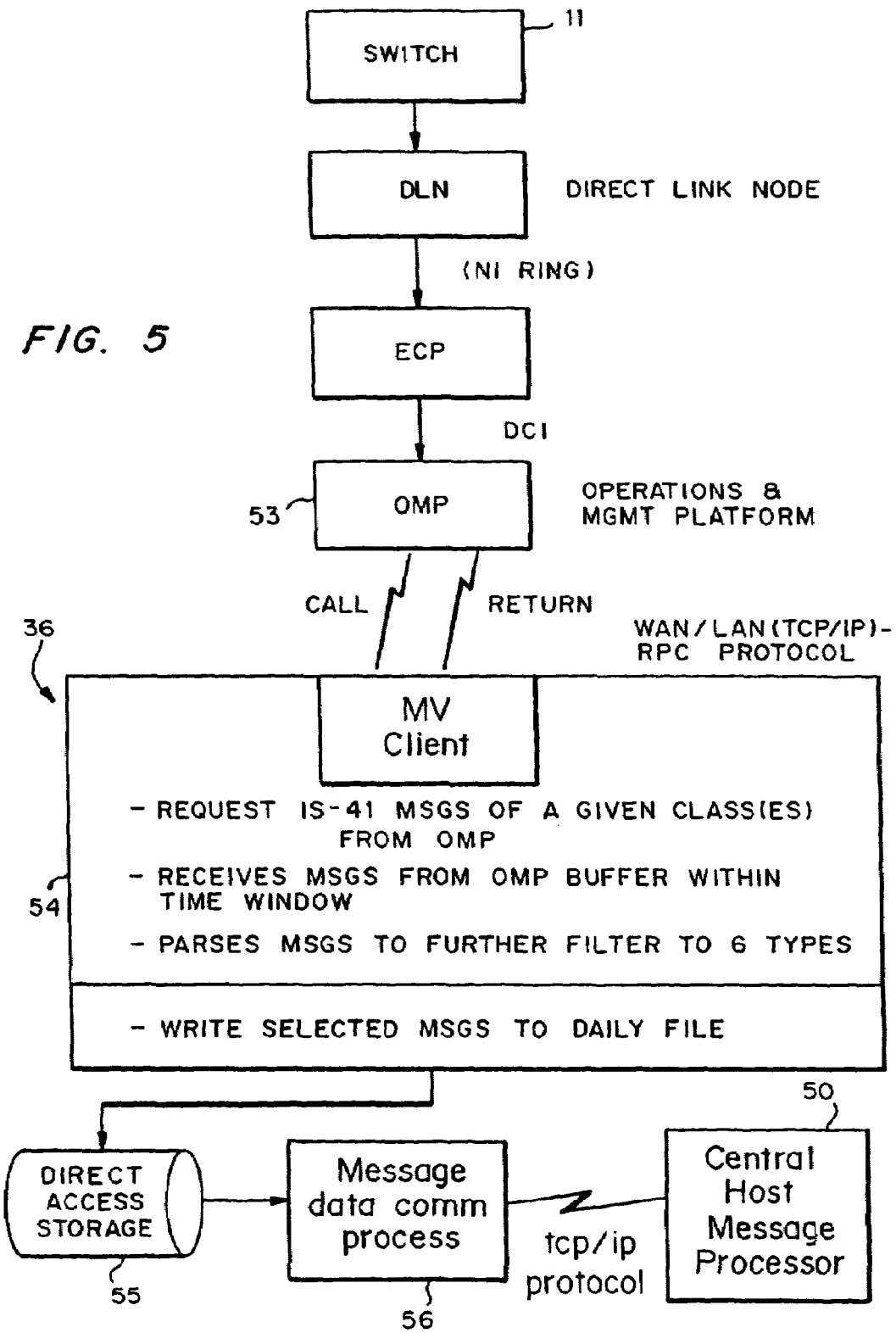
FIG. 5 is a block diagram and flowchart illustrating yet another embodiment of a data capture device that captures data from a switch using a manufacturer's proprietary protocol.

FIGS. 3–5 illustrate the components and functionality of various embodiments of data capture devices 30.

FIG. 3 shows the data links and functionality of an embodiment of a link capture device 32 and one method for capturing fraud and customer data from a wireless system according to the system as illustrated in FIGS. 1 and 2. Generally, each SS7 link may be passively monitored, and desired portions of the monitored traffic, like particular IS-41 messages, may be captured without disrupting the functioning of the switch 10. In particular, a suitable link capture device 32, implementations for which are described below, is coupled to the switch 10 via a bridging isolator 20. Bridging isolator 20 is coupled to one or more links of the SS7 network of which the switch 10 forms a part. Bridging isolator 20 may be (without limitation) a HP15821A Multiple Balanced Bridging Isolator manufactured by Hewlett Packard, or any suitable device capable of providing passive balanced resistive and transformer isolation between the link capture device 32 and the SS7 network. Link capture device 32 can be implemented, for example (but without limitation), by a HP 37900D Signaling Test Set, a protocol analyzer manufactured by Hewlett Packard Company. Other devices that may be suitable for performing the described link data capture function, if properly programmed to perform functions described below, are marketed by other vendors, including TecElec, Inet, Techno or Seimens.

Link capture device 32 passively monitors signals on the links accessed via bridging isolator 20, and extracts desired fraud and customer-related information, discussed below. To maximize its processing efficiency, the link capture device 32 preferably can monitor a plurality of signal links and can be programmed to perform specific tasks. For example, the HP 37900D may monitor up to four SS7 links and may be customized to conduct desired measurements and to process the gathered data, as will be further described below. If the switch 10 has a greater number of links than can be monitored by a single link capture device 32, more link capture device 32 can be used and incorporated into the system architecture. For example, if a link capture device 32 is implemented by a HP 37900D and the switch 10 handles nine SS7 network links, three data capture devices 30 would be required. But the number of input ports could just as easily be raised (or lowered) depending upon the specifications of the equipment implementing the link capture device 32. Thus, a link capture device 32 with additional link interface cards inserted in its chassis and additional processing power could be deployed.

FIG. 3 shows an SS7 switch data link 12 that includes four SS7 links coupled to bridging isolator 20. Each of four data lines 14–17 from bridging isolator 20 couples to an input port of link capture device 32. A telecommunications link interface 102, 104, 106 and 108 corresponds to each input 14–17. Each link interface 102–108 may be implemented by, for example, a signaling interface card, a T1 or V.35 interface card or any other suitable interface. In FIG. 3, link interface 102 couples to data line 14; link interface 104 couples to data line 15; link interface 106 couples to data line 16; and link interface 108 couples to data line 17. Each link interface 102–108 transduces the signal on the corresponding data line 14–17, making it available to be read, stored or otherwise manipulated by link capture device 32.

An operating system 112, running on an internal processor of the data capture device 30, monitors all active link interfaces 102–108. In one embodiment, but without limitation, the operating system functionality may be implemented by a Pascal 3.2 workstation system on, e.g., the HP 37900D. A daemon subprocessor of the operating system 112 listens for IS-41 messages on the link interfaces 102–108 and, when one is received, writes it temporarily to a link message buffer 110, where it may be stored (along with other such messages) according to a first-in-first-out (FIFO) discipline.

Figure 6A:
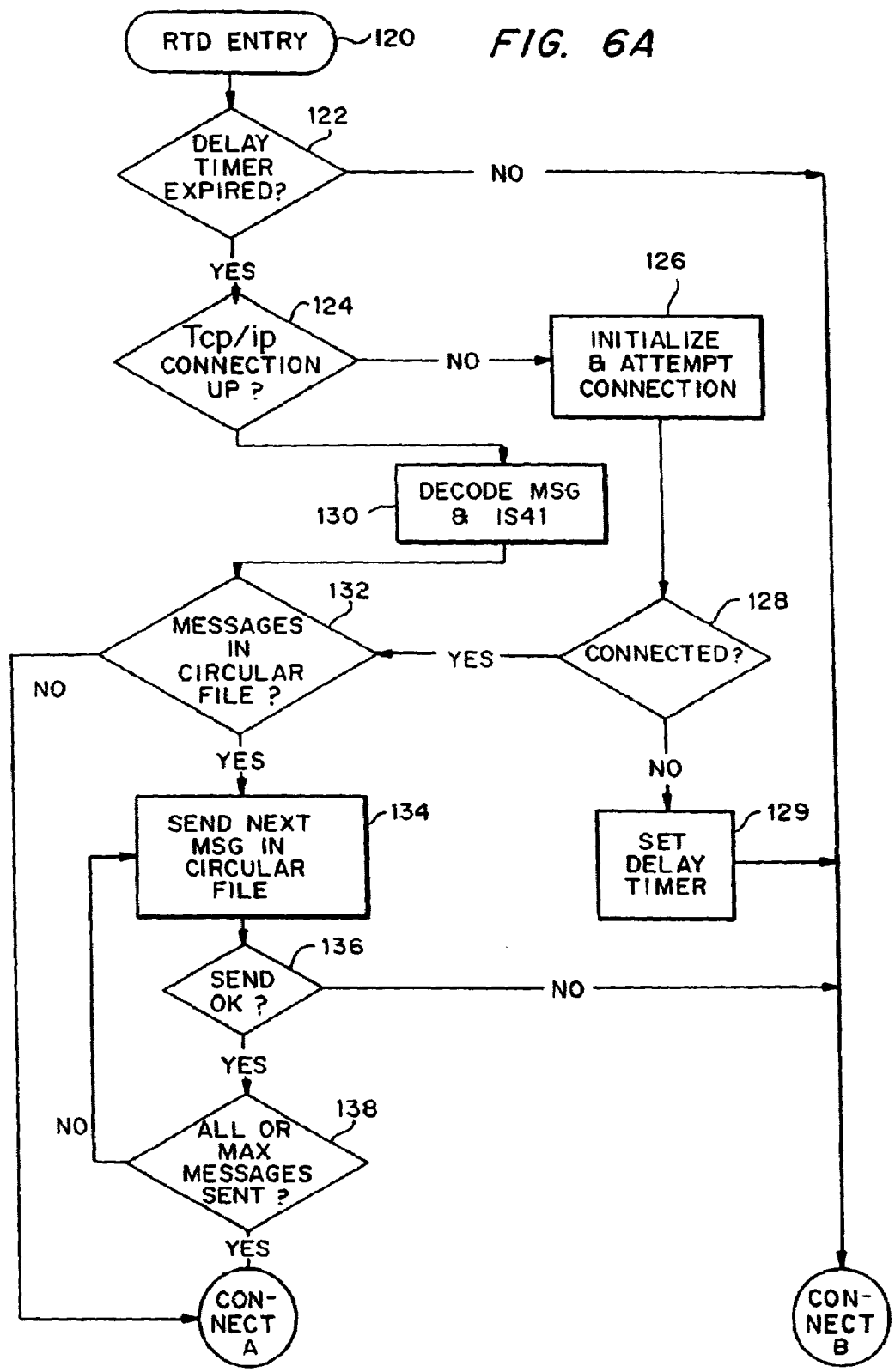
FIG. 6A is a flowchart illustrating a first portion of the logic flow associated with a real time decoding function implemented by a data capture device.

Upon the occurrence of a periodic interrupt, operating system 112 initiates a real time decoder process 114, the logic for an embodiment of which is provided in FIGS. 6A and 6B. In the period between interrupts, many IS-41 messages may have been received by the link interfaces 102–108 and temporarily stored in the link message buffer 110. The periodic interrupt permits the real-time decoder process 114 to retrieve captured IS-41 messages from the link message buffer 110 for processing and transmission to central message processor 50, as described in connection with FIGS. 6A and 6B.

FIG. 4 illustrates an STP capture device 34 that obtains messages of interest from STP pair 24, 26. Generally, a Signal Transfer Point ("STP") is a high-capacity packet switch that routes messages between network access nodes such as switches (MSCs) and databases (like SCPs). An STP typically comprises geographically separated pairs so that if one STP fails the other can handle total traffic volume (thus, the volume of message traffic for a single STP should never exceed fifty percent of its capacity.) Each STP 24, 26 in a pair has a preprocessor 25, 27. Preprocessors 25, 27 can be implemented on an HP 725/50 UNIX workstation. (Depending on the features the preprocessors 25, 27 implement, other properly programmed computers with less or even more processing power could be used to implement the preprocessor. For example, preprocessors with greater processing power could provide roaming or engineering reports as well as captured data.) Each preprocessor 25, 27 implements a daemon subprocessor called STP catcher 42 that reads messages from one or multiple LAN card(s) located at the corresponding STP 24, 26. STP catcher 42 filters the messages coming across the LAN card(s) and selects only those messages belonging to a desired type. Selected messages may be formatted (one format may be that shown in FIG. 7) and provided to log buffer 43. Daemon subprocessor STP pitcher 44 reads the buffer and transfers messages via a LAN or other communication medium to STP merge processor 35. Control messages exchanged between preprocessors 25, 27 and STP pair 24, 26 assure synchronization. (Control messages can comprise time exchange information in the RFD 868 standard protocol.)

Because STPs are paired, related messages could come across different STPs. Thus, for example, an IS-41 invoke message could come across STP 24 and its corresponding IS-41 return result message could come across STP 26. Message traffic captured from each STP 24, 26 is merged via a merge catcher process 46 that may reside on STP merge processor 34, which may be implemented with an HP K 400. This ensures that all messages of interest are combined for forwarding by message data communication process 48 to the central message processor 50. The message communication process 48 implements the real-time message decoder 114 process shown in FIGS. 6A and 6B and described below. Generally, this process formats and sends received messages to the central message processor 50.

To central message processor 50, the data feed flowing from STP capture device 34 is just like any other data feed from any other data capture device 30. Thus, processing of data captured from STP pair 24, 26 proceeds as described generally above and in more detail in text associated with FIGS. 8–11.

FIG. 5 shows switch capture device 36. Switch 11 is an AT&T switch that operates via a proprietary format, EFTN, often favored by wireless service providers because of advanced features it provides that otherwise would not be available. Switch 11 comprises various components including at least one Executive Control Process ("ECP") and connects to an Operations and Management Platform ("OMP") 53 provided by AT&T. OMP 53 may be provided with a package (purchased from AT&T) capable of translating any EFTN message that has an equivalent IS-41 message into that equivalent. The equivalent is then stored in a buffer located at OMP 53. The buffer may be polled for messages of interest.

Thus, Message Visibility ("MV") client process 54 may periodically request from the OMP 53 IS-41 messages of a particular class or classes. Requests from the "client" switch capture device 36 to the "server" OMP 53 initiate a Remote Procedure Call ("RPC") protocol that executes a server function running on the OMP 53 to send requested data. MV client process 54 filters received messages, transmitted in TCP/IP format, to choose only message types of interest, as defined by the preselected set. For instance, the set of six messages identified above could be selected. Selected messages are written to a daily file, like direct access storage 55. A message data communication process 56 formats the stored messages into an appropriate format (such as that shown in FIGS. 7A–7C).

Components of switch capture device 36, (e.g., MV client process 54, storage 55 or message communication process 56) may reside on central message processor 50 to maintain transparency across the system. Formatted messages are stored in a file within central message processor 50 so that the processing portions can parse the file and obtain the stored messages. (Message communication process 56 has the same functionality as message communication process 48 described in FIG. 4.) To the message processing portions of the central message processor 50, messages received from switch capture device 36 are the same as messages received from other data capture devices 30 and processed in the same fashion.

Industry trends are away from proprietary protocols and toward standardization. Nevertheless, even though switch capture device 36 is described as for use with the AT&T switch 11, it could easily be modified to work with other manufacturers' switches should trends reverse and proprietary protocols be deployed (and assuming manufacturers offer translation packages).

Each embodiment of data capture device 30 could be monitored for failure in its data feed. For example, a daemon subprocess may be provided on the link capture device 32, the STP capture device 34, or the switch capture device 36 that periodically checks to ensure that the captured data has been transmitted. If a selected interval passes without data transmission, the daemon subprocess could activate an automatic dialing device that causes a preselected paging number (or several) to be dialed and a stored message to be sent. Thus, one or several designated network service personnel could receive a message that identifies the particular data capture device 30 and indicates that its data feed was down. Network service personnel could then promptly proceed to place the data capture device 30 back on line.

Selection and Packaging of Captured Data for Transmission

Returning to a more detailed description of link capture device 32, FIG. 3 shows various processes implemented by it and FIGS. 6 and 7 describe those processes in detail. Processing and formatting associated with FIGS. 6 and 7 also may be implemented by the STP capture device 34 or switch capture device 36. (Although TCP/IP connection requests do not have to be made for the switch capture device 36, implementing the same functionality of other data capture devices 30 enhances system standardization and transparency.)

A real time decoder ("RTD") process 114 is entered at 120 by a function call. Each function call processes a single IS-41 message stored in the link message buffer 110, preferably the earliest received message consistent with FIFO principles. Processed messages are transmitted over WAN 40 from data capture device 30 to central message processor 50. As shown in FIG. 6A, following entry into RTD process 114 at step 120, condition check 122 determines whether a delay timer has expired.

The delay timer forces a wait time between reconnection attempts following either a shut down request or some other connection interruption. The delay timer therefore prevents expending too much processor time in fruitless checking of the connection. For example, the delay timer can be set for a first delay of thirty seconds. After expiration, connection check 124 determines whether a connection is up. If not, initialization step 126 attempts a connection. When no connection can be made, the delay timer is set and begins running again. (A longer delay (e.g., five minutes) might be chosen for this second delay period so that the connection problem can be resolved before initiation of another connection check.)

Generally, the RTD process 114 logs the incoming IS-41 message at step 150 (FIG. 6B) in a buffer, such as a circular buffer (not shown). The RTD process 114 then returns to the instruction of the operating system 112 (in FIG. 3) which had been the next step prior to the RTD process 114 having been called.

If condition check 122 instead reveals that the delay timer has expired, RTD process 114 determines (according to known methods) at step 124 whether the data capture device 30 had an established TCP/IP connection with central message processor 50 across WAN 40. If no such connection established, RTD processor 114 at step 126 initializes a socket open process and attempts to set up a TCP/IP connection with the central message processor 50 over the WAN 40. The RTD process 114 at step 128 checks for a successful attempt to set up a TCP/IP connection. If not, the delay timer is set at step 129, the current message is logged at step 150 (FIG. 6B) in the circular buffer, and control is restored to operating system 112.

On the other hand, when condition check 124 shows a TCP/IP connection, the current message from link message buffer 110 is decoded according to known methods. Specifically, the message is examined to determine whether it is one of a set of messages of interest. In one illustrated embodiment, the decode message and IS-41 process 130 determines whether the message is one of six IS-41 messages of interest. Messages not of interest are discarded. (In STP capture device 34, STP catcher 42 may implement decode message process 130; in switch capture device 36, MV client process 54 may implement decode message process 130.)

Messages of interest are formatted (as shown at step 154 in FIGS. 7A–7C and described below) and held for transmission. Then, or if condition check 128 confirms an established TCP/IP connection, the RTD process 114 checks at step 132 whether any messages are in the circular buffer, which holds messages unsent due to lack of a network connection with central message processor 50. RTD process 114 at step 134 attempts to send the next message available in the circular buffer over the WAN 40 to the central message processor 50. Send check 136 determines if the transmission attempt of step 134 was not satisfactory; if not, then the message is left in its location in the circular buffer and retrieved for sending at a later time. On the other hand, after a successful transmission at step 134, RTD process 114 checks whether either all messages in the circular buffer have been sent (i.e., the buffer has been flushed) or a pre-set maximum number of messages from the circular buffer have been sent. Transmission continues until either condition is met.

After step 138 determines all or a pre-set number of messages were sent, then (referring to FIG. 6B) RTD process 114 checks at step 140 for an incoming message, like one from an operator or from central message processor 50. If a message has been received (e.g., at a TCP/IP socket over WAN 40), host process step 142 processes it. For example, the host could send any of multiple messages including: (i) a shutdown message; (ii) a shutdown response or (iii) an error message. Shutdown messages request the link capture device 32 to close connections and properly store all data received but not yet transmitted upon receipt of a shutdown request. Link capture device 32 also can request shutdown. In that case, the shutdown response from central message processor 50 acknowledges and authorizes shutdown. Error messages simply indicate a system error. They are logged so that the time and date of the error is tracked for later analysis.

Shutdown check step 144 determines if the processed message indicates that a shutdown of a data capture device 30 has been ordered. (A shutdown message may be sent, for example, if a link capture device 32 is to be removed from service for maintenance or other reasons.) Shutdown results in closing the TCP/IP connection at step 146 and setting the delay timer at step 148. The message is logged in a file, and control returns to the operating system 112. According to the described logic, graceful shutdown can thereby be achieved, since any data currently being handled is retrievably stored, avoiding its loss. To facilitate an operator (of the data capture device 30 or central message processor 50) in removing the device from service without the central message processor 50 failing to be notified, data capture device 20 may optionally include a "hotkey." The "hotkey" prompts an operator of the data capture device 20 for confirmation of a command to shutdown communication and would forward a message to central message processor 50 if confirmation were received.

If step 140 had detected no incoming message from the socket, RTD process 114 determines whether the circular file is empty at step 152. This condition might occur if, for example, a pre-set maximum number of messages can be sent, and have been (as determined at step 138), but the circular buffer still contains messages. Transmission of the current message from link message buffer 110 would occur prior to sending earlier-received messages. Therefore, if the circular buffer is not empty, the current message is stored there in order to maintain FIFO discipline.

In the absence of a shutdown message, then at step 154 RTD process 114 attempts to send the current message over the WAN 40 to the central message processor 50. Control returns to the operating system 112 whether the message was successfully sent or not successfully sent (in which case it is subsequently logged in the circular file at step 150).

Each captured IS-41 message sent at step 154 (FIG. 6B) is preferably sent in a separate packet or other discrete block of data. Numerous formats providing suitable functionality could also be used. Generally, the format selected is such that the system is provided sufficient information regarding the origination (source, timing, etc.) of packaged data that error tracking and debugging is easier. If the TCP/IP protocol is used, however, FIGS. 7A–7C show one manner of formatting a data packet. The format shown is an application level format that can work with any other protocol, for example, X.25.

Thus, a data packet containing a captured IS-41 message is organized into a TCP/IP packet containing a header of nineteen bytes and a variable length data block, as shown in FIG. 7A. The header, shown in greater detail in FIG. 7B, includes: (1) an STS ID that may be a three byte ASCII identifier (which may be stored at and retrieved from a storage medium such as a disk drive) for uniquely identifying the particular data capture device 30 from which the data is sent; (2) a link number identifier of three bytes for specifying from which of the monitored SS7 links the captured message was derived if a link capture device 32 obtained the message; (3) a one-byte opcode for indicating whether the packet is carrying data or whether the data capture device 30 is shutdown (an ASCII D indicating data and an ASCII S indicating shutdown); (4) a message type code of one byte and containing ASCII for one of the integers in the set $\{1, \ldots, N\}$ of messages of interest to identify which type of IS-41 (or other standard) message was captured; (5) a TCAP (transaction capabilities application part, a component of the SS7 architecture) transaction ID of six bytes and (6) an indication of the total message length, allocated five bytes. The data portion of the message packet, shown in FIG. 7C, includes a time stamp of four bytes for containing an integer indicating the time at which the message was captured. A TCAP transaction ID field and DPC/OPC (Destination or Origination Point Codes) field also are included in the data portion. Finally, the unaltered IS-41 message payload, which can be of variable length, completes the data. Preferably, one captured message is allocated to a particular packet.

Generally, the same packet format can be used for message originating from a STP capture devices 34 or a switch capture devices 36. For STP capture devices 34, the STS ID may be its particular assigned identification number and the link number may be the individual ECU from which the packet originated. (MSCs may have multiple ECPs that are usually included in IS-41 message headers.) The header for the switch capture device 36 will include the same information (i.e., switch capture device 36 identification and ECU identification). While the information in the packet shown in FIGS. 7A through 7C is generally used for system maintenance and debugging, it also has some use to customer support personal at customer on-line work stations 60, 62 and 64. For instance, the DPC/OPC point codes may be displayed on the work stations 60, 62 or 64 to indicate generally the origination and designation of particular message. (Even though a number of SIDs may be associated with a particular point code, there is some correlation between the point code and location of a subscriber; experienced customer services representatives will recognize and be assisted by this correlation.)

Processing of Captured Data

Referring again to FIG. 1, data capture devices 30 are coupled to the central message processor 50 by a suitable data transmission medium like, for example, the WAN 40. Central message processor 50 can communicate by way of the WAN 40 to one or more customer on-line stations 60, 62, and 64 or to the fraud detection system 70.

Central message processor 50 preferably may receive, aggregate and route input from a number of data capture devices or analogous devices. Central message processor 50 may be implemented by any processing device having sufficient input/output channels and processing capacity for performing the operations described below, and running any suitable operating system. For example, central message processor 50 may be an HP-840, manufactured by Hewlett-Packard Co. and running the UNIX operating system, HP-UX 10.0. Alternatively, the central message processor 50 may be an HP 9000H40, also manufactured by Hewlett Packard Co. (Any workstation programmed configured according to the present invention could conceivably perform as the central message processor 50 depending on the volume of records and number of users.)

FIG. 2 describes the functionality and data flows associated with central message processor 50 regardless of the platform used to implement it. FIGS. 8–11 illustrate the logic flows associated with processes implemented by central message processor 50 for carrying out its functions.

Figure 8:
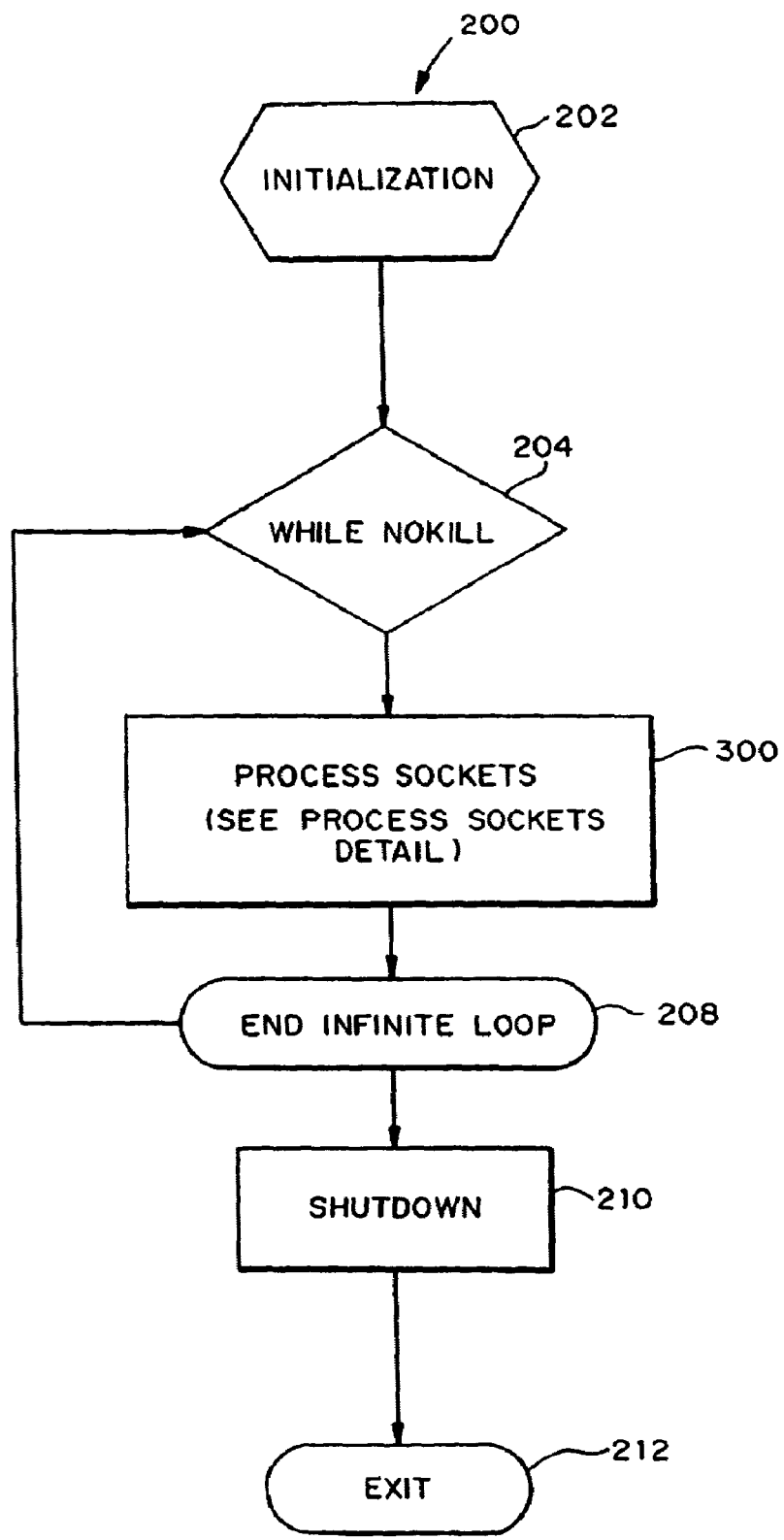
FIG. 8 is a flowchart illustrating at a high level of abstraction the logic flow of the processing performed by a central message processor illustrated in FIG. 1-3.

FIG. 8 illustrates the logic flow for a high level loop 200 implemented by central message processor 50. Since the primary function of the central message processor 50 is to collect data sent to it by a plurality of data capture devices 30, the central message processor 50 devotes a portion of its attention to monitoring input received at its ports. To this end, it implements server functionality for interfacing with an application program running on a remote client system. The interfacing functionality may be implemented, for example and without limitation, by the TCP/IP Sockets API (application programming interface). The Sockets API may be used to implement a client-server relationship between two application programs running in different computing environments, such as between data capture devices 30 and central message processor 50. The Sockets API can permit access to protocols other than TCP/IP.

Figure 9:
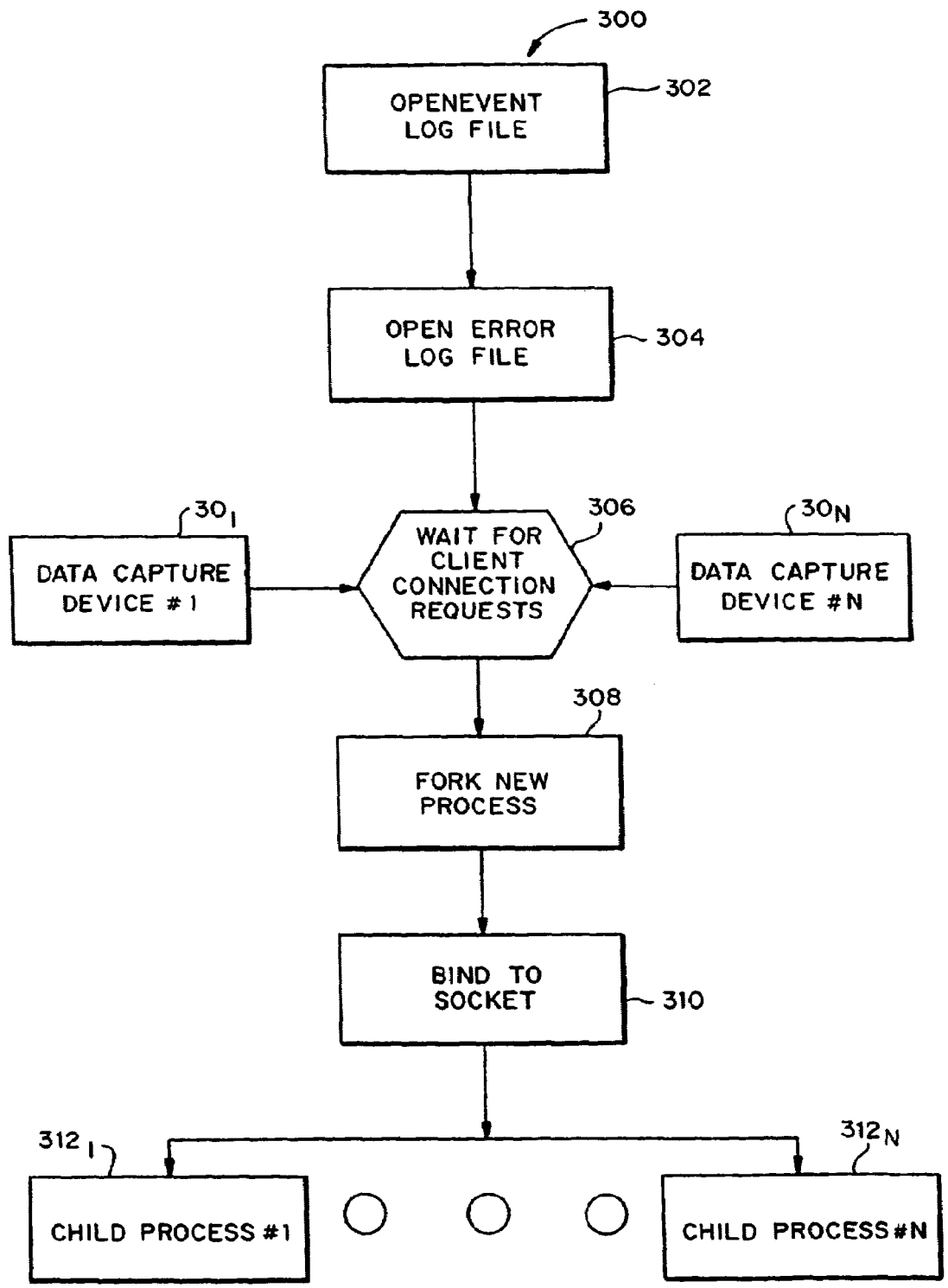
FIG. 9 is a flowchart illustrating the logic flow of a socket processing module of the logic flow illustrated in FIG. 8.

After initializing at step 202, the high level loop 200 processes the sockets, via which the results from data capture devices 30 are received. As long as the loop has not been terminated, as checked at step 204 (While NoKill), a process sockets routine 300, illustrated in FIG. 9, is called. When (i) the high-level loop 200 returns from the process sockets routine 300, (ii) the end of the loop 200 is reached at 208, and (iii) if shutdown has been requested by the operator, then the process implements a shutdown routine 210 that stores any unprocessed data to prevents its being lost. The high level loop 200 then exits at 212. As long as no shutdown request has been received, however, the high level loop 200 cycles between steps 204 and 208, continually processing TCP/IP packets received at the sockets from the data capture devices 30.

Logic flow associated with the process sockets routine 300 is shown in FIG. 9. Generally, there are many socket child processes, which initialize in order to handle each connection request from particular data capture devices 30. Initially, an event log file is opened at 302 and an error log file is opened at 304. These files are used for general debugging and maintenance activities. For example, the event log file may be used for informational messages like open, close, shutdown, etc. The error log records warnings and system errors. At 306 the process waits for connection requests from a number (1, . . . , N) of data capture devices 30 that are essentially clients served by the central message processor 50. When a TCP/IP connection request has been received, routine 300 at step 308 forks a new child process 312 to handle it. The routine 300 binds the newly forked child process 312 to a socket at 310, creating as many child processes $312_{1-N}$ bound to each socket as there are data capture devices 30 that have requested connections to central message processor 50.

Of course, switch capture devices 36 that reside on the central message processor 50 can store their captured data in a file on the central message processor 50. No process sockets routine need be initiated for these switch capture devices. Instead, the collation processing shown in FIG. 10 is done by accessing the resident file holding the captured data.

Figure 10A:
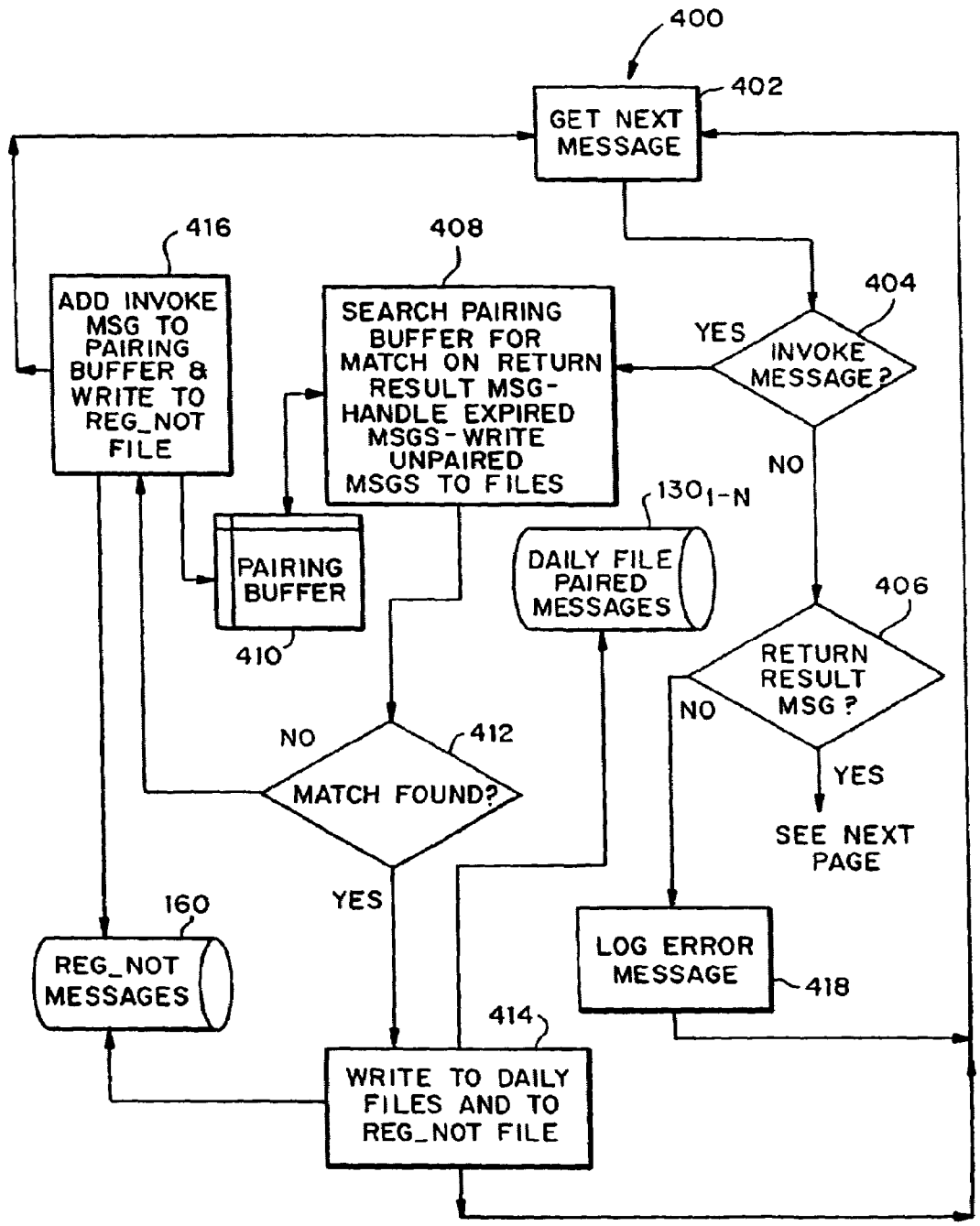
FIGS. 10A–B are flowcharts illustrating the logic flow of a "process sockets" module of the socket processing module illustrated in FIG. 9.
Figure 10B:
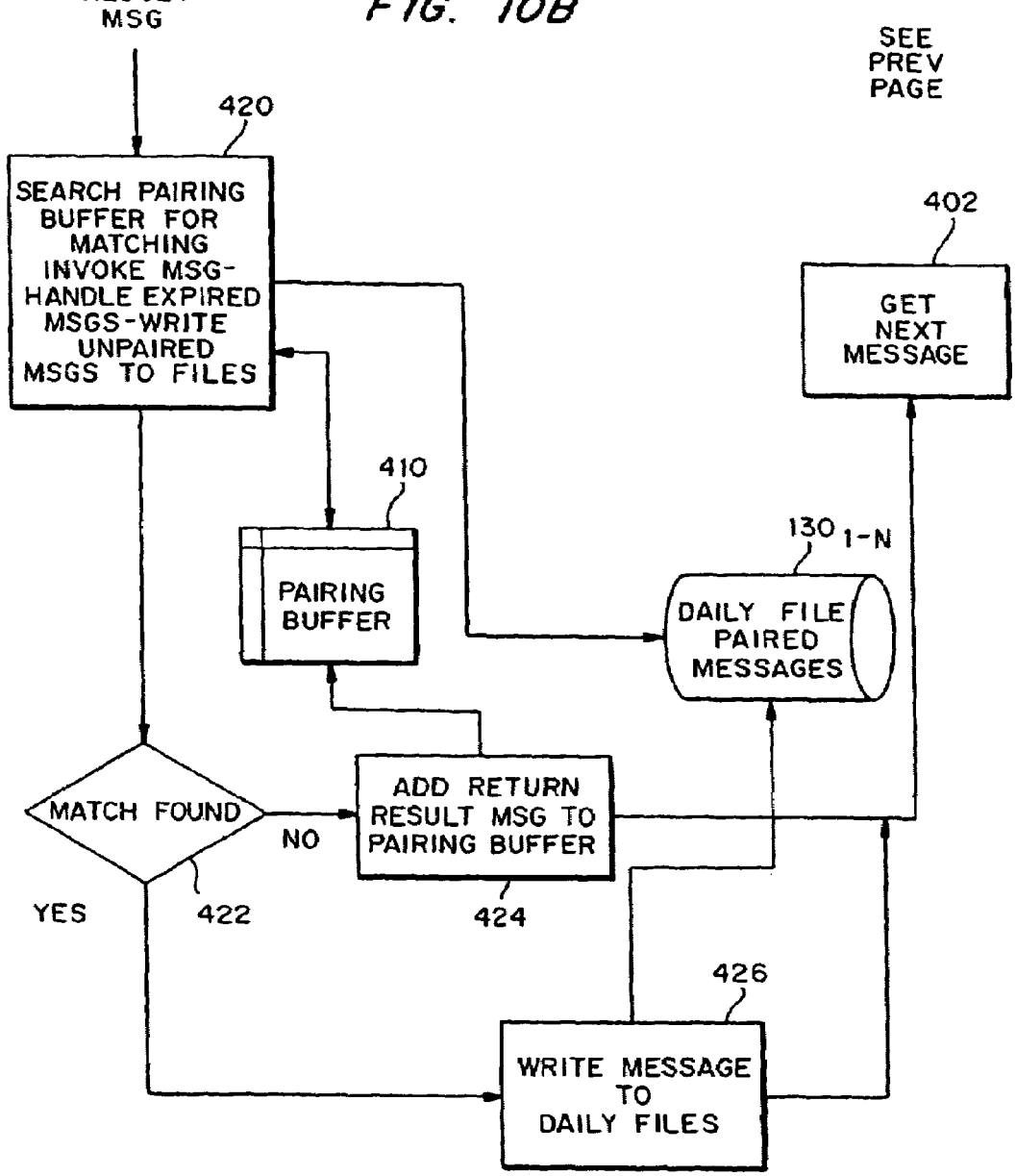

Logic flow associated with a collation process 400 of each forked child process $312_{1-N}$ is illustrated in FIGS. 10A–B. The collation process 400 collates received messages to yield more useful visibility and fraud data. At step 402 the message contained in the packet received from the data capture device 30 corresponding to the current socket is retrieved. Type check step 404 checks to determine whether it is an invoke message. Invoke messages are processed via searching step 408 that searches the pairing buffer for its matching return result message. Matches may be found by comparing the transaction IDs and DPC/OPC of the message. (IS-41 messages each carry a transaction ID; return result messages have an ID that matches the ID of the invoke message leading to generation of the return result message.)

No match as determined by check step 412 results in the invoke message being written by step 416 to the pairing buffer 410 and Reg_Not message file 160. On the other hand, when matches are found at step 412 they are written to the daily files paired messages database 130 and the Reg_Not file 160 at record step 414. (Reg_Not messages written to Reg_Not file 160 will later be retrieved and processed according to logic described in connection with FIG. 11.) The collation process 400 then begins again at step 402, which retrieves the next message.

Assuming the next message is not an invoke message, it will pass through type check step 404. Step 406 checks the passed message, which either is an error or return result message. Error messages are logged at step 418. Return result messages are processed by the logic of FIG. 10B. Step 420 searches the pairing buffer 410 for the invoke message that matches the return result message being processed. If no match is found at check step 422, the return result message is added to the pairing buffer 410. Matches, however, found at check step 422 are written at record step 426 to the daily file database 130. After either adding the return result message to the pairing buffer 410 or, if paired, to daily file database 130, the loop restarts at step 402.

Note that the processing associated with FIGS. 10A and 10B is directed to finding mates of invoke and return result messages and saving unmated messages until missing mates are captured and matched. This processing is necessary since the invoke and return result messages may not necessarily be captured and transmitted to the central message processor 50 immediately in the order in which they were generated. Thus, it is possible that a particular return result message is received well before its mating invoke message. Absent proper processing the return result message may be lost, eliminating valuable visibility or fraud data. For return result messages resident in the pairing buffer 410 for longer than a predetermined period, those "expired message," are identified by step 420 and then discarded. This is because the central message processor 50 generally receives return result message that may relate to invoke message that are not of a desired IS-41 message type. On the other hand, expired invoke messages identified at step 408 are flagged as unpaired and sent to the daily file database 160 for ultimate forwarding to a customer support station 60, 62 or 64 or fraud detection system 70. Expired invoke messages are saved because they may still provide the system information such as why the customer had a problem.

Elimination of Redundant Data

Figure 11:
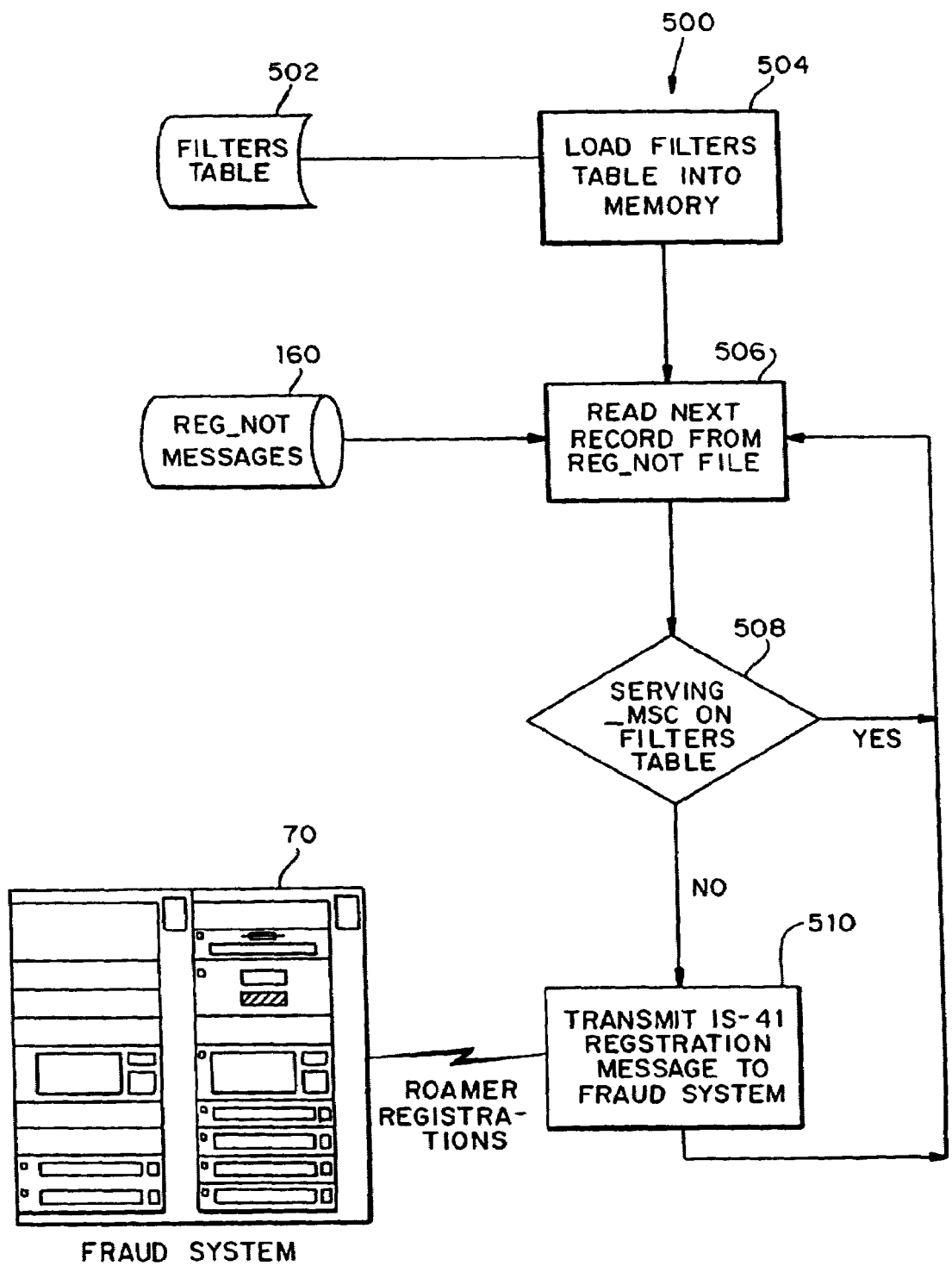
FIG. 11 is a flowchart illustrating the logic flow of filtering captured data collected according to the present invention.

Logic flow for the registration message processing and filtering 170 is illustrated in FIG. 11. As described in the Background section, fraud data comprising roamer registrations may already be available (e.g., from GTE Nationwide Roamer Data Delivery Services, GTE-TSI's "IREC" service or the Roamex service provided by Systems Link). A service provider employing systems and methods described in this document may already be using these or similar existing fraud data services, particularly if deploying the systems and methods described still would not provide total coverage for a market of interest. Also, such third party systems may provide services other than just fraud data. For example, billing applications could be supported by other data provided by third party systems.

Multiple sources of fraud data (i.e., data captured by the present invention and data provided from third party systems) may generate redundant data incoming into fraud detection system 70. This is objectionable for several reasons. First, the service provider is paying per transaction fees (which translates into a lot of money) for data that a system such as the present invention is already providing. Obviously, purchase of the redundant data from the third party system could be discontinued. But other data or services provided by the third party system may render that course impractical. Second, the fraud detection system 70 may generate erroneous results in the form of false positive fraud detections. With multiple data sources, two or more records of the same event could be generated, which may trigger a fraud detection system since it may analyze the data and conclude that multiple phones with the same MIN/ESNs were operative at the same time. Further, sending and processing redundant data ties up network bandwidth and valuable processing power.

To eliminate redundant data, the present invention provides a registration message processing and filter process 170 (implemented by central message processor 50) as described by the filtration process 500 shown by FIG. 11. A filters table 502 includes the identification of every MSC for which data is commercially received. Typically the identification is a System Identification Number or "SID" and, for smaller providers that simply contract another provider's network and provide billing services, a Billing Identification Number or "BID." Thus, for example, if data were already being sent to fraud detection system 70 for a switch in Nashville, Tenn., the filters table 502 would include that system's SID (or BID).

Once the filters table 502 has been loaded into memory at load step 504, creating a list of SIDs (and BIDs) whose data should be filtered out, the next Reg_Not messages are read from a daily Reg_Not file 160 at read record step 506. As noted, IS-41 messages carry various origination data, including the SID (or BID) for the MSC servicing the customer who generated the particular Reg_Not message ("Serving_MSC"). At comparison step 508, a check is made as to whether the SID for the Serving_MSC from which the Reg_Not message came matches any SID in the filters table 502 loaded in memory. If a match is detected, the present Reg_Not message read at step 506 is ignored, and the process loops to select at step 506 the next record from Reg_Not file 160 and compare the SID associated with that record against the SID values in the filters table 502. Again any Reg_Not message with a Serving_MSC listed on the filters table 502 is ignored. But if the Serving_MSC is not on the filters table 502, then the current message is transmitted by a transmission process 510 to a fraud detection system 70. Transmission process 510 may also implement a process for appropriately packaging the data to match the format of a particular fraud detection system 70. Thus, by way of example, if used with the CloneDetector system, the message is parsed for its SID and a header necessary to implementing the CloneDetector functionality is added. (Customized packaging of the filtered data to match formats required by other fraud analysis systems is well within the ability of one skilled in the art.)

In this way, a fraud data feed in the form of non-redundant roamer registrations is sent to a fraud detection system 70. The fraud detection system 70, using data from this feed and perhaps other feeds like those from third party systems described above, analyzes this data to help detect fraud.

Customer On-Line Support Applications

Figure 12:
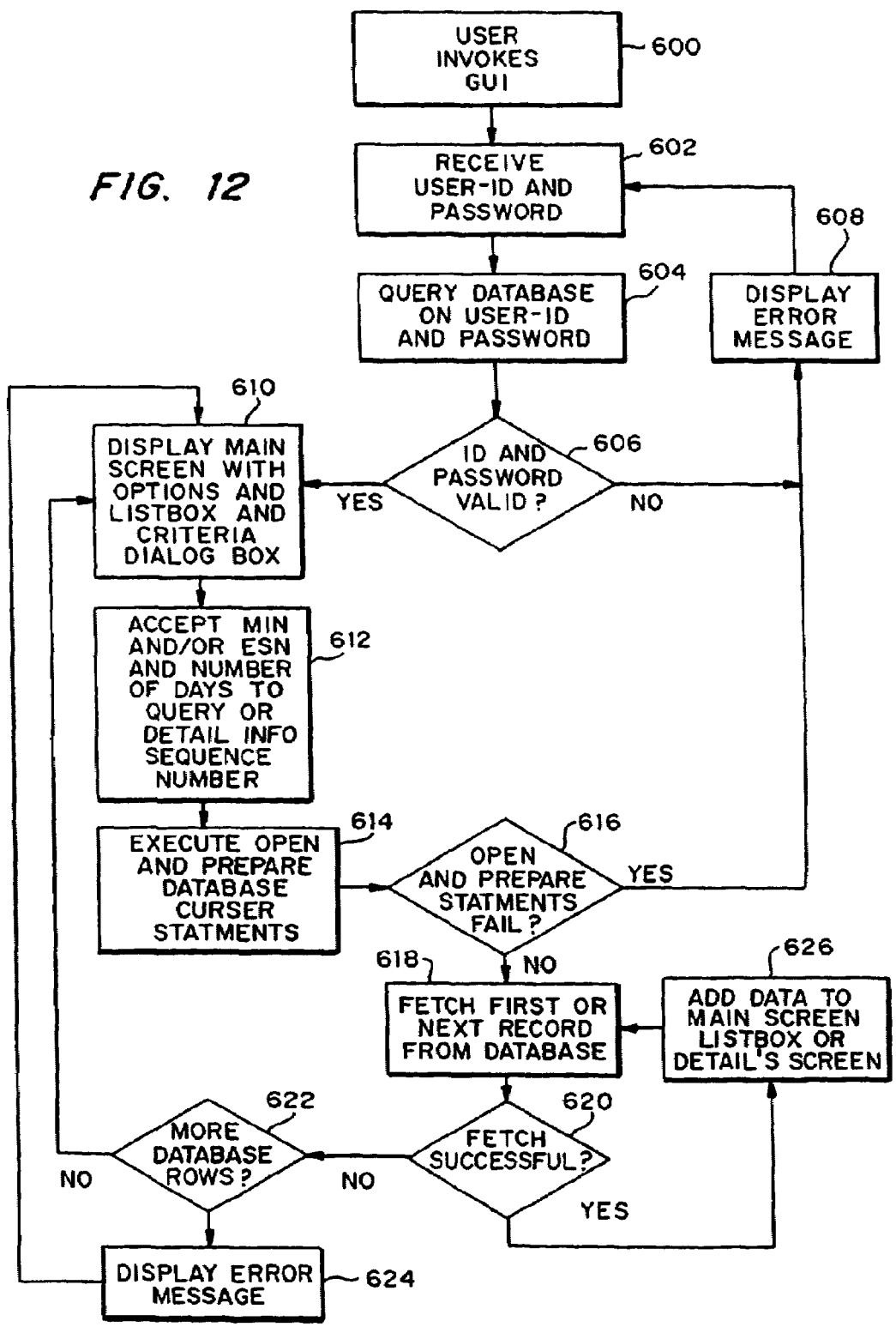
FIG. 12 is a flowchart showing the processing flow associated with operating an embodiment of a customer on-line support station.

Customer on-line support requires a user friendly system, typically run in a WINDOWS environment, for viewing in real time current roaming traffic in and away from home markets and allowing inquiries on roamer status anywhere within the digital SS7 network. A properly designed customer on-line support system provides an extremely efficient method for obtaining and displaying large volumes of data in real time. The data must be properly organized and displayed in order to give the customer service representatives a better picture of the wireless service provider's home market and the provider's roaming customers. One such on-line support system is shown deployed on support stations 60, 62 and 64 in FIG. 1. FIG. 12 shows the functionality that may be implemented by the support stations 60, 62 or 64.

A customer support operator accesses the support system at access step 600 by invoking the graphical user interface ("GUI") and inputting at receive step 602 an ID and password. After the database is queried at step 604, an ID and password check is performed at validity check step 606. Invalid IDs or passwords generate an error message displayed at step 608. Otherwise valid IDs or passwords generate a main option screen at step 610. A cellular user's MIN or ESN and search parameters are entered at step 612. For example, the number of days of call activity data for the input MIN may be one search parameter. Search criteria for identifying the user other than MIN or ESN may be used for other fraud detection systems. Alternatively, instead of manually entering search parameters each time, the system can be set to a default search or the operator can enter a "profile" sequence number associated with specific search parameters.

In any event, the database upon which all system fraud data resides is opened at step 614. The database is partitioned by day so that information retrieval is more efficient. Step 614 opens and prepares the database, while step 616 confirms that operation; if there is a failure an error message is displayed. Records are fetched from the database at step 618 and added to the main screen list box at step 626. The main screen list box allows the customer support application to store in RAM the results for the search parameters entered. This allows the particular customer on-line support stations 60, 62 or 64 to obtain its search results and load them locally for further processing, thereby providing distributed processing of search results to eliminate or minimize demands on the host database and its processor. If step 620 determines that a record fetch was unsuccessful, it may mean that the search results all have been retrieved. But if step 622 also determines that more data rows should be displayed, an error has occurred that step 624 displays. Otherwise, step 622 cycles back to the main screen display step 610 to await a new search by the operator.

A General Case

This document has focused on describing several possible embodiments of the present invention, describing in particular detail alternative embodiments of data capture devices 30 coupled with a central message processor 50. Those skilled in the art will understand that of the alternative data capture devices 30 disclosed, the link capture device 32 is one of the most flexible because persons implementing the present invention need not rely on the assistance of third parties. For example, implementation of STP capture device 34 requires access to the telephone company's network; not all wireless providers will have such access, particularly where the network operator is a fierce competitor. Similarly, the switch capture device 36 requires obtaining expensive translation packages from switch manufacturers like AT&T and places the provider implementing the switch capture device 36 at the mercy of the switch manufacturer, who could always change protocols, overcharge for or eliminate altogether the translation packages.

Additionally, although the described embodiment discusses using a "central" message processor 50, the functionality of the central message processor 50 may be implemented by the data capture devices 30 simply by choosing platforms with sufficient processing power to perform the collating and filtering tasks of the central message processor 50. For example, link capture device 32 or STP capture device 34 each could be deployed on larger, more powerful workstations and couple via bus to a processor portion that processes selected message, pairing invoke and return result messages and saving unpaired invoke messages. Filters tables could even be downloaded to each data capture device 30 so that they can do necessary filtering of redundant fraud data.

Indeed, such a network design would decrease overall system bandwidth requirements and take advantage of the flexibility of distributed processing. That is, by having a central message processor 50 perform message collating and filtering, providers implementing the present invention must capture and send all return result messages as well as the invoke messages of interest to the central message process 50. This obviously consumes significant system bandwidth. Of course, it may allow for lower hardware costs since less powerful processing platforms need be deployed as data capture devices 30. In any event, those skilled in the art will recognize that the present invention contemplates various embodiments of data capture devices 30 and either distributed or central processing of captured messages so as to provide useful fraud, roamer visibility, customer support, network traffic management or other data useful in administering a wireless telecommunications system.

The foregoing is provided for purposes of explanation and disclosure of preferred embodiments of the present invention. Modifications and adaptations to the described embodiments, particularly including changes, upgrades or revisions in response to new or revised signaling and transmission protocols or standards (including without limitation, X.25, IS-41, or SS7 standards), or changes in system architecture, will be apparent to those skilled in the art and may be made without departing from the scope or spirit of the invention and the following claims. By way of example, the "IS" in IS-41 stands for "Interim Standard." IS-41 Rev. C has now been accepted by American National Standards Institute and is referred as ANSI-41. It is fully expected that the standard will be revised and message types of interest to users of the present invention will be added, particularly as new service features are deployed over networks. The present invention contemplates monitoring and capturing of such future message types.

System Level Overview of Alternate Embodiment

Figure 13:
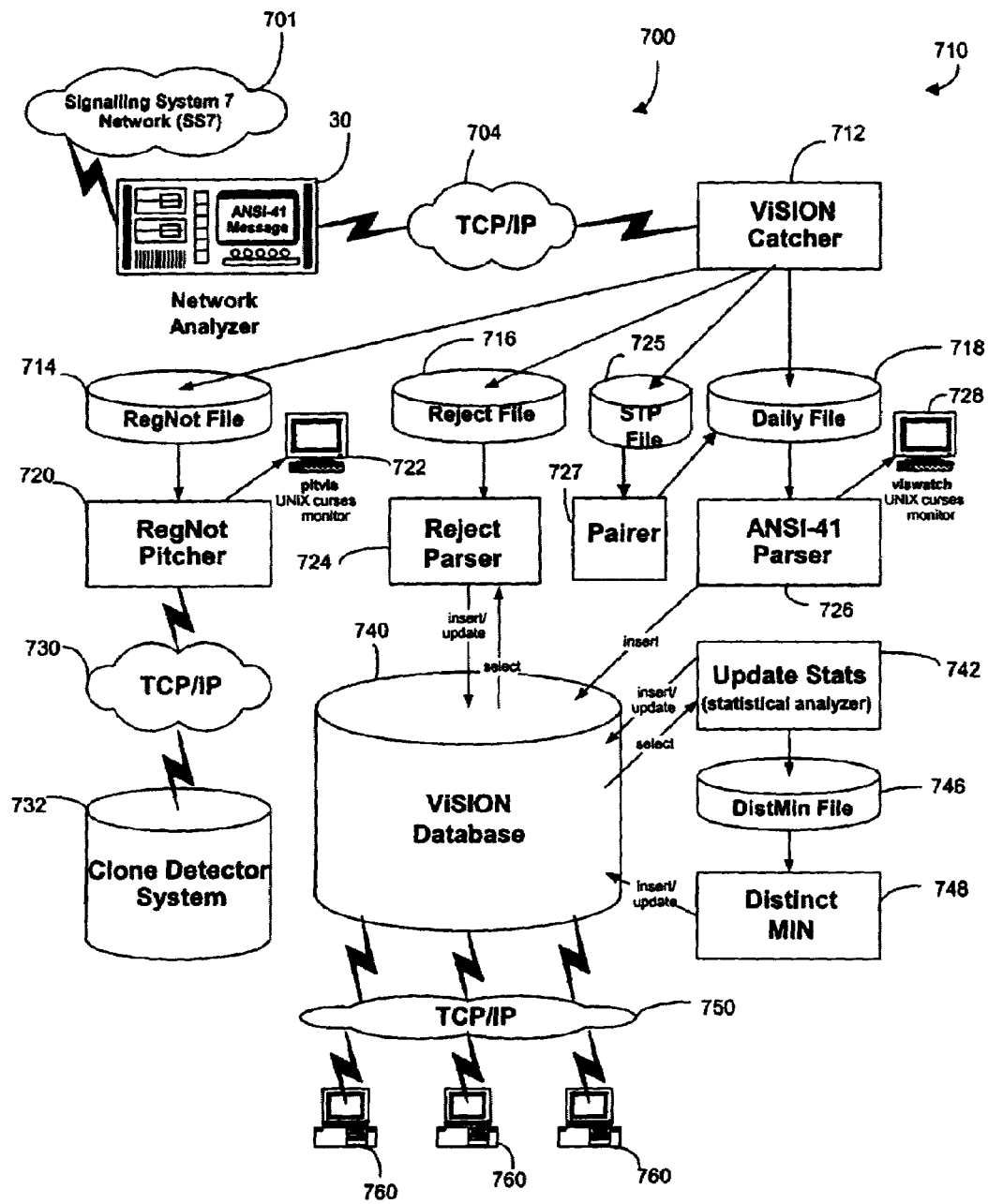
FIG. 13 is a schematic diagram of a system architecture according to a second embodiment of the invention.

A second embodiment of a system 700 is shown in FIG. 13. As with the embodiment shown in FIG. 1, the system 700 monitors and captures messages traveling over an SS7 network, such as SS7 network 701. These messages may be captured in any suitable manner, such as with data capture devices 30 described above with reference to FIG. 1. These data capture devices 30 are not limited to any specific type of equipment but instead may comprise, for instance, the link capture device 32, STP capture device 34, and switch capture device 36. The data capture devices 30 preferably includes the STP data capture device 34.

The data captured by data capture devices 30 are forwarded over a network 704 to a system 710. The network 704 may comprise any suitable network, such as an Ethernet Local Area Network (LAN) or other type of LAN or Wide Area Network, such as WAN 40.

The system 710 performs many of the functions of the central message processor 50 and fraud detection system 70. Consequently, in order to avoid introducing redundant material, reference may be had to the descriptions above for an explanation of these functions and implementation of the functions.

In summary, the system 710 includes a catcher 712 that operates 24/7 and receives the data that is captured and sent over the network 704. The catcher 712 stores records in a daily file 718 and also a Registration Notification (RegNot) file 714 or Reject file 716. A RegNot pitcher 720 transfers data from the RegNot file 714 to a clone detector system 732 over a network 730. The clone detector system 732 may comprise the fraud detection system 70 or any other suitable system for detecting clones.

A Reject parser 724, an ANSI-41 parser 726, an update stats unit 742, and a distinct MIN unit 748 have access to a database 740. The database 740 is comprised of separate tables, fields, and storage areas which are described in more detail below. The Reject parser 724 reads data in the Reject file 716 and inserts or updates data within a database 740. The ANSI-41 parser 726 reads the data in daily files 718 and parses the data into separate tables and fields within the database 740. The update stats unit 742 selects records from the database 740 and updates statistical information stored in the database 740 and also a distinct MIN file 746. This statistical information, as described in more detail below, can be relayed to users through one or more interfaces 760. The distinct MIN unit 748 access data from the distinct MIN file 746 and database 740 and maintains a separate record for each MIN for each day.

The interface 760 may comprise stations, such as on-line stations 60, 62, and 64, having access to the database 740 through a network 750. As with stations 60, 62, and 64, interface 760 support queries for use by customer support as well as by other personnel. The system 710 supports the same types of queries as the system in FIG. 1, namely queries related to roamer visibility, fraud, network traffic, network engineering, customer support, marketing, and other aspects of administrating a network. Specific examples of these queries will be provided in the description below.

Although networks 704, 730, and 750 have been shown as TCP/IP networks, it should be understood that the invention may employ other types of networks, such as frame relay or ATM networks. Furthermore, although the networks 704, 730, and 750 have been depicted as separate and distinct networks, these networks may instead form a single network.

Figure 14:
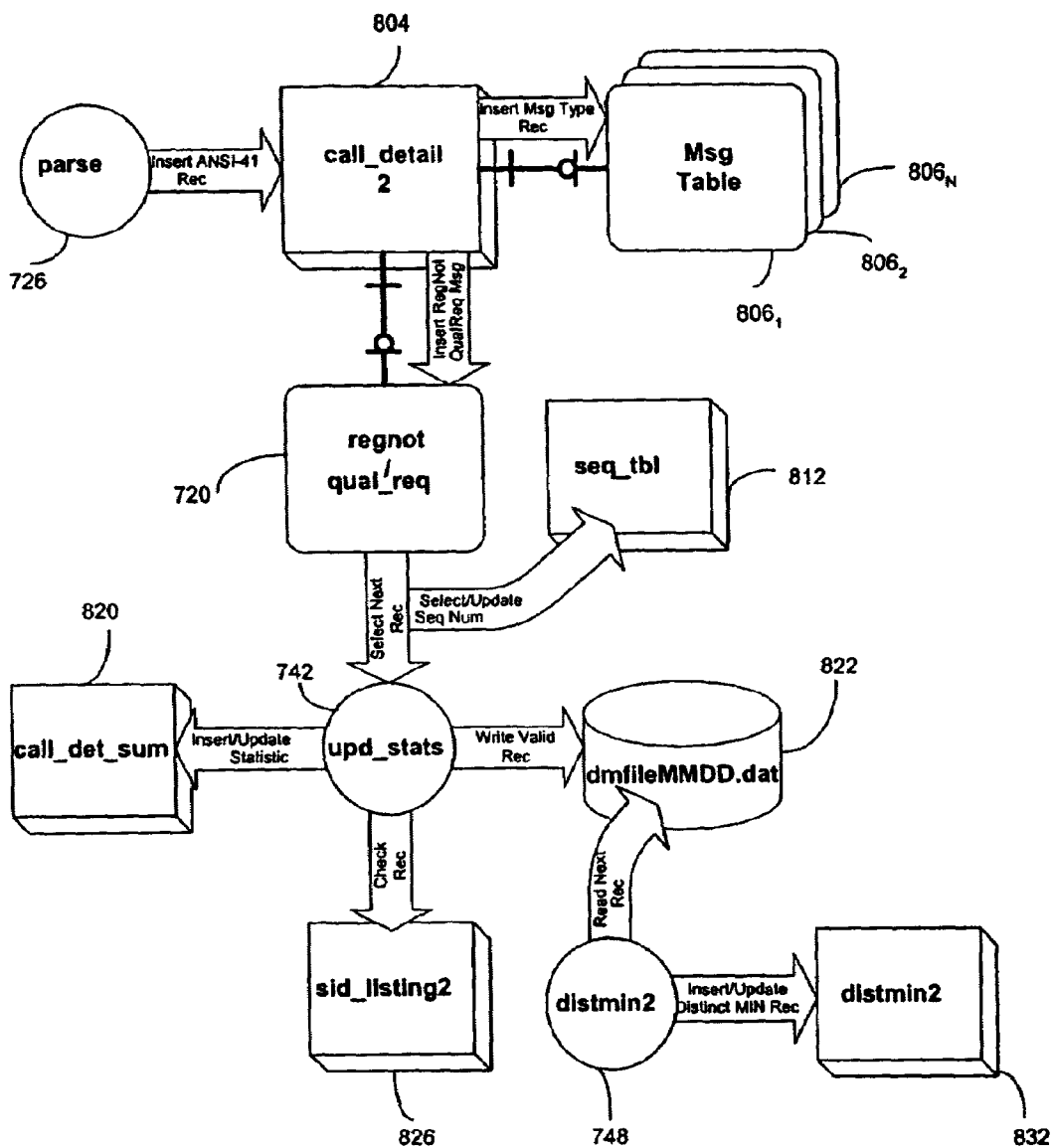
FIG. 14 is a process-table relationship diagram for the system architecture of FIG. 13.

A general description of the processing performed by the system 700 will be provided with reference to FIG. 14 followed by more detailed descriptions of the processing with reference to FIGS. 15 to 42. FIG. 14 depicts a process-table relationship of the system shown in FIG. 13. The ANSI-41 parser 726 is depicted as a parse object 726, the update stats unit 742 as an upd_stats object 742, a distinct MIN unit 748 as distmin2 object 748, and RegNot Pitcher 720 as RegNot/QualReq object 720.

In general, the parse object 726 inserts a record into a call_detail2 table 804 with this record preferably being a pair of ANSI-41 messages. A child process is spawned after receiving the message and this child process inserts the message record into one of the message tables 806. If the message, however, is a RegNot, which is a Registration Notification sent to the HLR to indicate that a customer has been newly registered or re-registered, or a QualReq, which is a Qualification Request used to request validation of a mobile or request validation and profile of a mobile, then the message is stored in a RegNot/QualReq table 720. In the preferred embodiment, each of the message tables 806 and RegNot/QualReq table 720 stores a unique message type whereby the messages stored in message table $806_1$ differs from the messages stored in message tables $806_2 \ldots 806_N$ and from the messages stored in RegNot/QualReq table 720. Thus, with 54 different ANSI-41 messages presently available, the system 710 may have a RegNot/QualReq table 720 and 52 different message tables $806_1$ to $806_{52}$. The invention, however, is not limited to the 54 presently available ANSI-41 messages but, as will be more apparent from the description below, encompasses additional messages transmitted over the SS7 network 701.

The upd_stats object 742 selects records from the RegNot/QualReq table 720, writes all valid records into a daily file dmfileMMDD.dat file 822, and inserts or updates statistics into a call_det_sum table 820. The upd_stats object 742 reads the records sequentially from the RegNot/QualReq table 720 with the location within the table 720 being maintained in a seq_tbl table 812. The upd_stats object 742 uses an NPA-NXX and line range within the records to look up the home company, SID, and switch within a sid_listing2 table 826.

The distmin2 object 748 reads the records from the daily file dmfileMMDD.dat 822 and inserts or updates an entry for each MIN with the latest registration for that day as a record in a distmin2 table 832.

The system 710 may be implemented with any suitable hardware and software. In the preferred embodiment, the system 710 is implemented on a version 7.22 Informix server running on a six CPU Hewlett-Packard K-570 with 728 MB RAM and version 10.20 of an Operating System. The storage for the database is provided by an MTI disk array configured with raid level ten protection. Users fall under one of three categories: parsers that input ANSI-41 switch data, background processes that provide data summarization support, both utilizing shared memory connections to the server, and users that actively query the data through one of the interfaces 760 using TCP sockets.

The Informix server has fourteen logical data volumes with six supporting the server instance for the master database, physical and logical logs, and sorting. The eight remaining volumes are assigned to the database supporting the VISION application. Seven of these eight volumes are reserved for the ANSI-41 messages and are isolated for table fragmentation. The remaining volume is used to store reference and summarization tables. The database is non logged ANSI isolation level dirty read. Backups are performed at 1:00 am utilizing SQL unload scripts, each backup cycle unloads the previous day's data and creates the next day's fragment. In the event of system failure recovery can be as granular as a single day to the full historical data volume. Upon completion of a system restore the current days data feeds are reprocessed up through current real-time. The backup system is designed to achieve the best balance between transaction performance and recoverability.

Catcher Processes

A more detailed description of the catcher 712 will now be provided with reference to FIGS. 15 to 18. As discussed above, a data capture device 30 may capture data from a variety of sources, such as from the link capture device 32, or the STP capture device 34. The processing that occurs when data is capture by the link capture device 32 differs from the processing that occurs when data is captured from the STP capture device 34.

Figure 15:
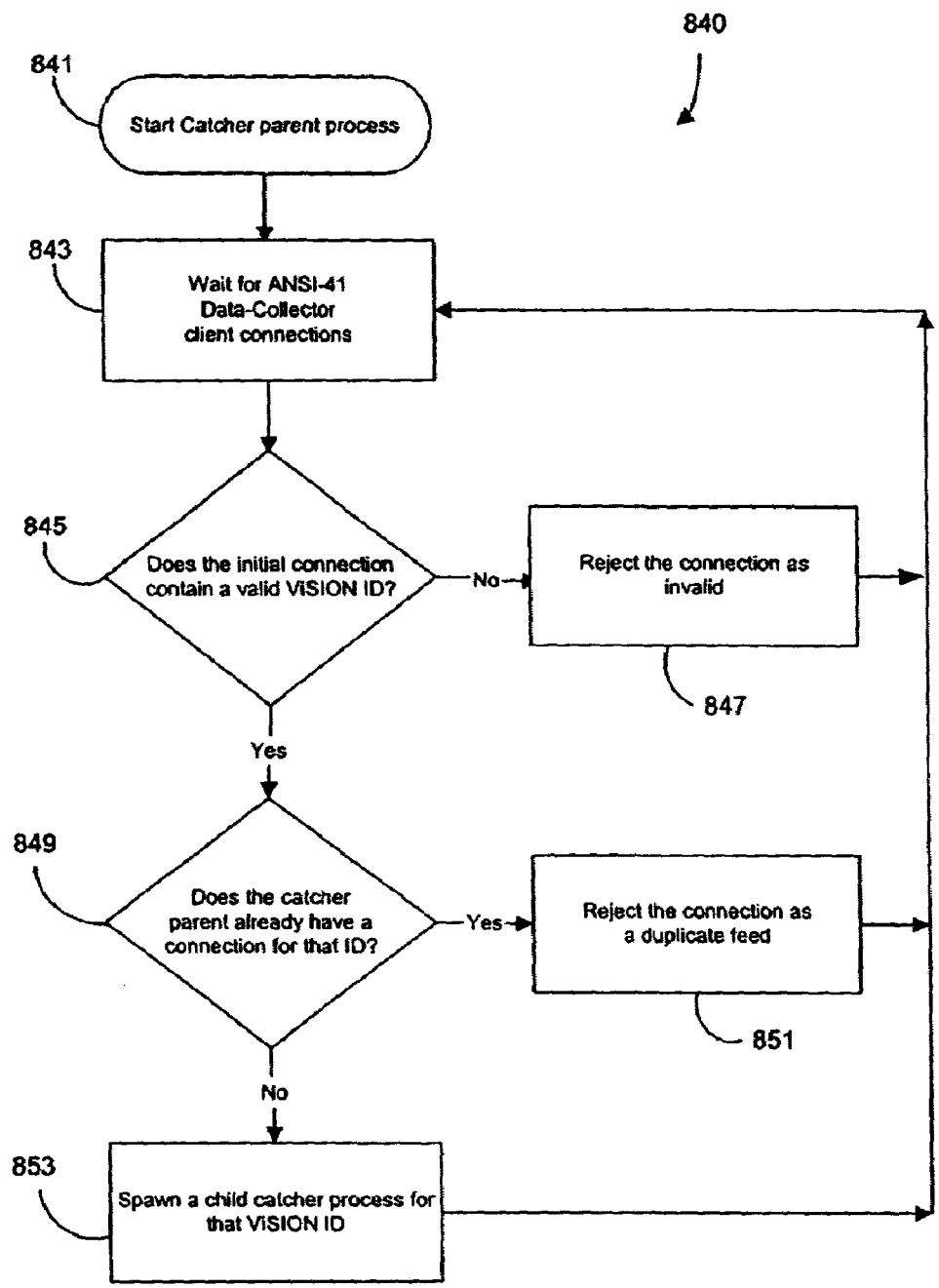
FIG. 15 is a flowchart showing a parent process performed in catching data captured with a data capture device.

An explanation will first be given as to the processing that occurs when data is captured over the link capture device 32. With reference to FIG. 15, a catcher parent process 840 is started at 841 and waits for a client connection to occur at 843. At 845, the catcher 712 checks whether the initial connection contains a valid ID. As discussed above with reference to FIG. 7B, each transmission from the link capture device 32 includes a header having an STS ID as well as other information. The catcher 712 determines whether that STS ID is a valid ID and, if it is not, it rejects the connection as invalid at 847 and then returns to 843 and waits for the next client connection. If the ID is valid, then at 849, the catcher 712 determines whether a connection has already been established for that ID. If a connection has been established, then at 851 the catcher 712 rejects the connection as being a duplicate feed and returns to 843 and enters a wait state. If no connection has been established, then at 853, the catcher 712 spawns a child catcher process for that ID.

Figure 16:
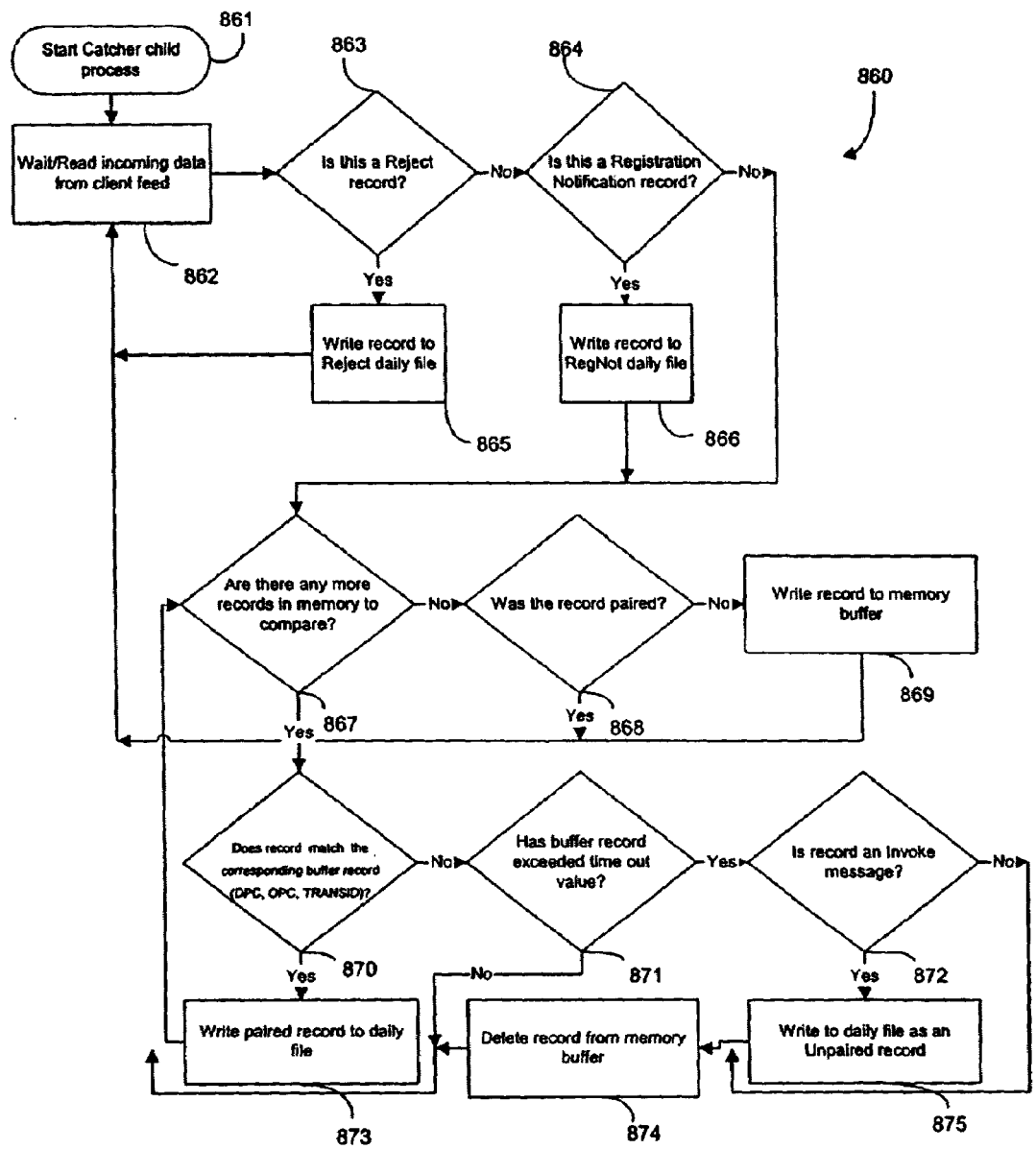
FIG. 16 is a flowchart showing a child process, spawned by the parent process of FIG. 15, in catching and handling the captured data.

An operation of a catcher child process 860 is shown in FIG. 16. The catcher child process begins at 861 and at 862 reads incoming data from a client feed. At 863, the catcher 712 determines whether the data is a reject record, and, if it is, writes the record to the reject file 716 at 865. If the data is not a reject record, then the catcher 712 next determines whether the data is a registration notification record at 864. If the data is a registration notification record, then at 866 the catcher 712 writes the record to the RegNot file 714 at 866. At 867 the catcher 712 determines whether there are any more records in the memory to compare. For the first message, the catcher 712 does not have any more messages to compare and turns to 868 and determine whether the record has been paired. As discussed above, certain of the ANSI-41 messages can be paired together as a set of "invoke" and "return" messages. If the record is not paired, then at 869 the record is written to a memory buffer and processing returns to a wait state at 862. When records exist in memory to compare, then at 870 the catcher 712 determines whether the record matches a corresponding record in the buffer memory at 870. The catcher 712 determines whether a match exists by comparing the destination point code (DPC), origination point code (OPC), and transaction ID (TRANSID). If a match exists, then at 873 the catcher 712 writes the paired record to the daily file 718. The vision catcher 712 then returns to 867 to check whether any additional records exist in memory to compare.

If the record does not match a corresponding record in buffer memory, then at 871 the catcher 712 determines whether the buffer record has exceeded its time-out value. If the time-out value has not been exceeded, then the vision catcher 712 returns to 867 to determine whether any more records exist in the memory. The time-out period is implemented to prevent records from remaining in the buffer memory indefinitely. If the time-out value has been exceeded, then at 872 the catcher 712 determines whether the record is an invoke message. If the message is an invoke message, then at 875 the catcher 712 writes the record to the daily file 718 as an unpaired record and at 874 the record is deleted from the buffer memory. The return message is not written to the daily file 718 since by itself it does not contain enough of the critical information used by the system 710. In other applications of the system 710, however, the return message may contain information that is useful and may alternatively be written to the daily file 718 after its time-out value has been exceeded.

Figure 17:
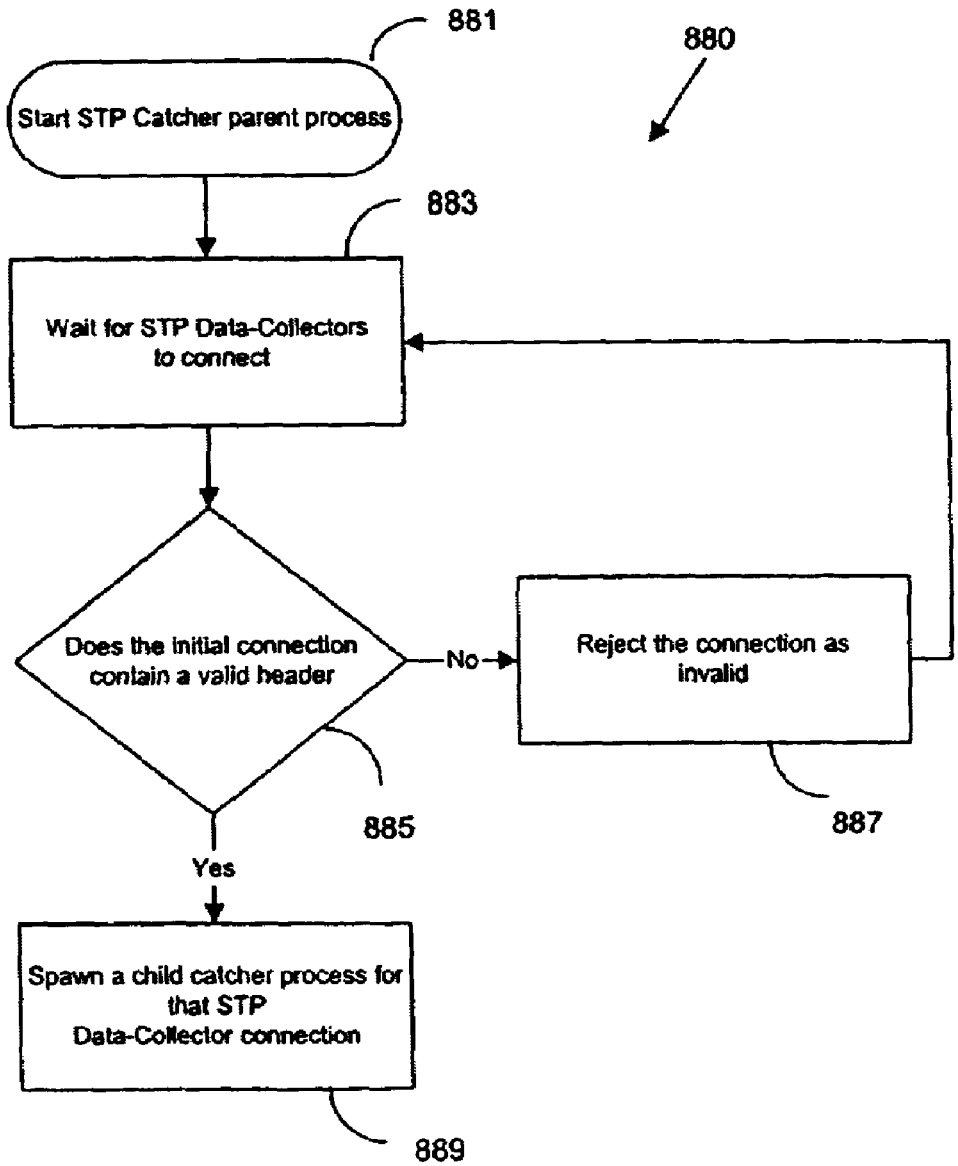
FIG. 17 is a flowchart showing a parent process performed in catching data captured at an STP.

An STP catcher parent process 880 which is performed by the vision catcher 712 when receiving data from the STP capture device 34 will now be described with reference to FIG. 17. The STP catcher parent process begins at 881 and at 883 the catcher 712 waits for one of the STP data collectors 34 to connect. At 885, the catcher 712 determines whether the initial connection contains a valid header. As discussed above with reference to FIG. 15, the header of a data transmission includes an ID, such as an STS ID which the catcher 712 reads to determine whether the header is valid. If the header is not valid, then at 887 the catcher 712 rejects the connection as invalid and returns to a wait state at 883. If the connection has a valid header, then at 889 the parent process spawns a child catcher for that STP data-collector connection.

Figure 18:
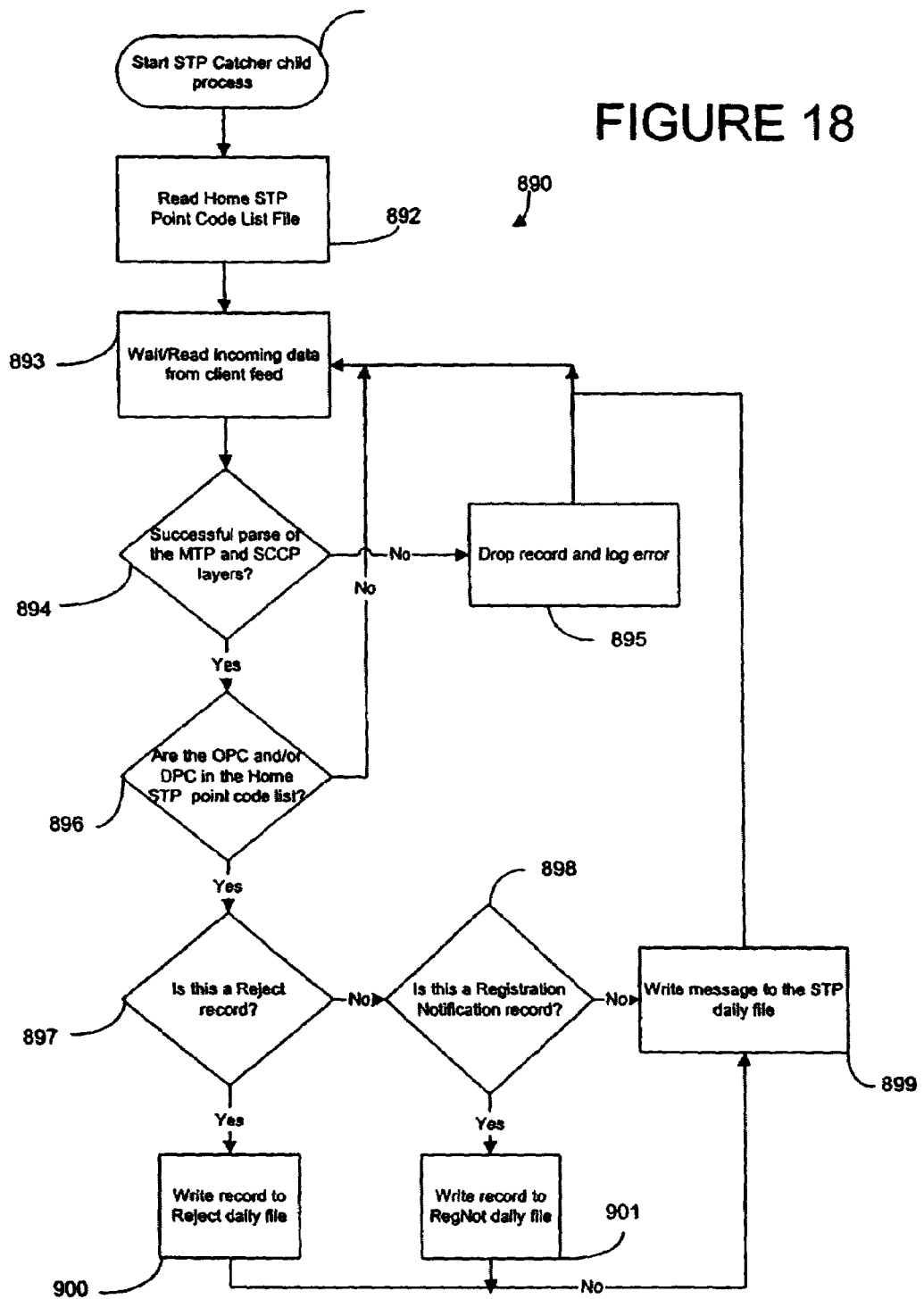
FIG. 18 is a flowchart showing a child process, spawned by the parent process of FIG. 17, in catching and handling the captured data.

With reference to FIG. 18, an STP catcher child process 890 begins at 891 and at 892 the catcher 712 reads its point code list. The point code list file contains all of the home networks point codes for filtering duplicate messages. The point code list is used for two reasons: one is to determine which messages to capture from the STP and the second is to eliminate receiving duplicate messages caused by intercompany messaging. At 893, the catcher 712 waits for incoming data from a client feed. At 894, the catcher 712 determines whether the MTP and SCCP layers have been successfully parsed. The data coming from an STP pair is coming from a higher level than data off the SS7 network from one of the data capture devices 32. As a result, the network layers of communications need to be removed. If the network layer parse was unsuccessful, then at 895 the record is dropped and the catcher 712 writes the message to an error log. If the network parse layer parse was successful, then at 896 the catcher 712 checks whether the OPC and/or DPC are in the STP point code list. If one of them is in the STP point code list, which is determined by the catcher 712 with reference to the STP point code list file, then at 897 the catcher 712 checks whether the record is a reject record. If the record is a reject record, then at 900 the catcher 712 writes the record to the reject daily file 716. If the record is not a reject record, then at 898 the catcher 712 determines whether the record is registration notification. If the record is a registration notification, then the catcher 712 writes the record to the RegNot file 714. If the record is neither a reject record nor a registration notification record, then the catcher 712 writes the message to the STP daily file 718 at 899.

Pairing

Figure 19:
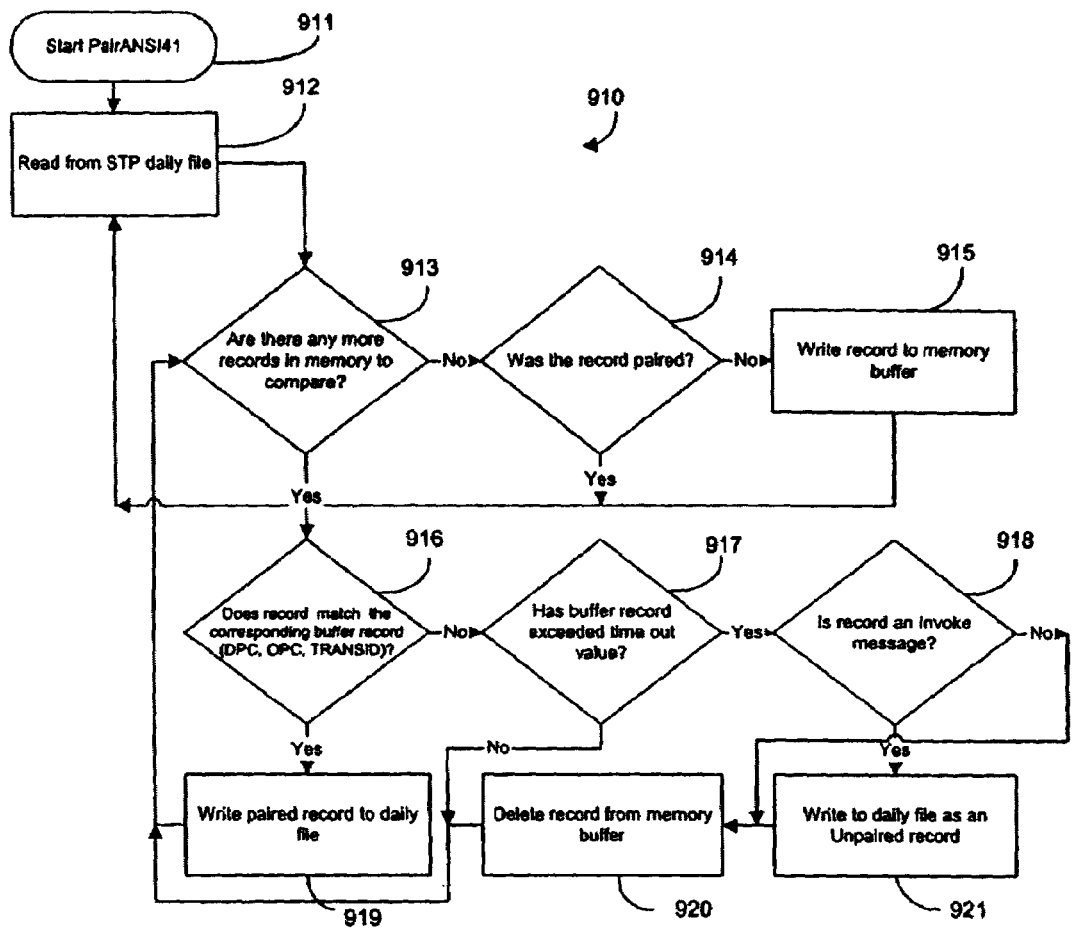
FIG. 19 is a flowchart showing a process of pairing message records captured at the STP.

A process 912 of pairing records from the STP daily file 718 will now be described with FIG. 19. The process 910 begins at 911 and at 912 a pairer 727 reads from an STP daily file 725 and determines at 913 whether any more records exist in memory to compare. If no more records exist to compare and, as determined at 914, that the record was not paired, then at 915 the pairer 727 writes the record to the buffer memory and returns to 912 for reading the next entry in the STP daily file 725. If additional records exist in memory to compare, then at 916 the pairer 727 checks whether the record matches a corresponding record in the buffer memory by comparing the DPC, OPC, and TRANSID of the records. If a match exists, the pairer 727 writes the paired record to the daily file 718. If the record does not match a record in the buffer memory, then at 917 the pairer 727 checks whether a time out value has been exceeded. If the time out value has been exceeded, then at 918 the pairer 727 checks whether the message is an invoke message and, if it is, writes it to the daily file 718 as an unpaired message at 921. After the record has been written to the daily file 718, the pairer 727 deletes the record from the buffer memory at 920.

Parsing

Figure 20:
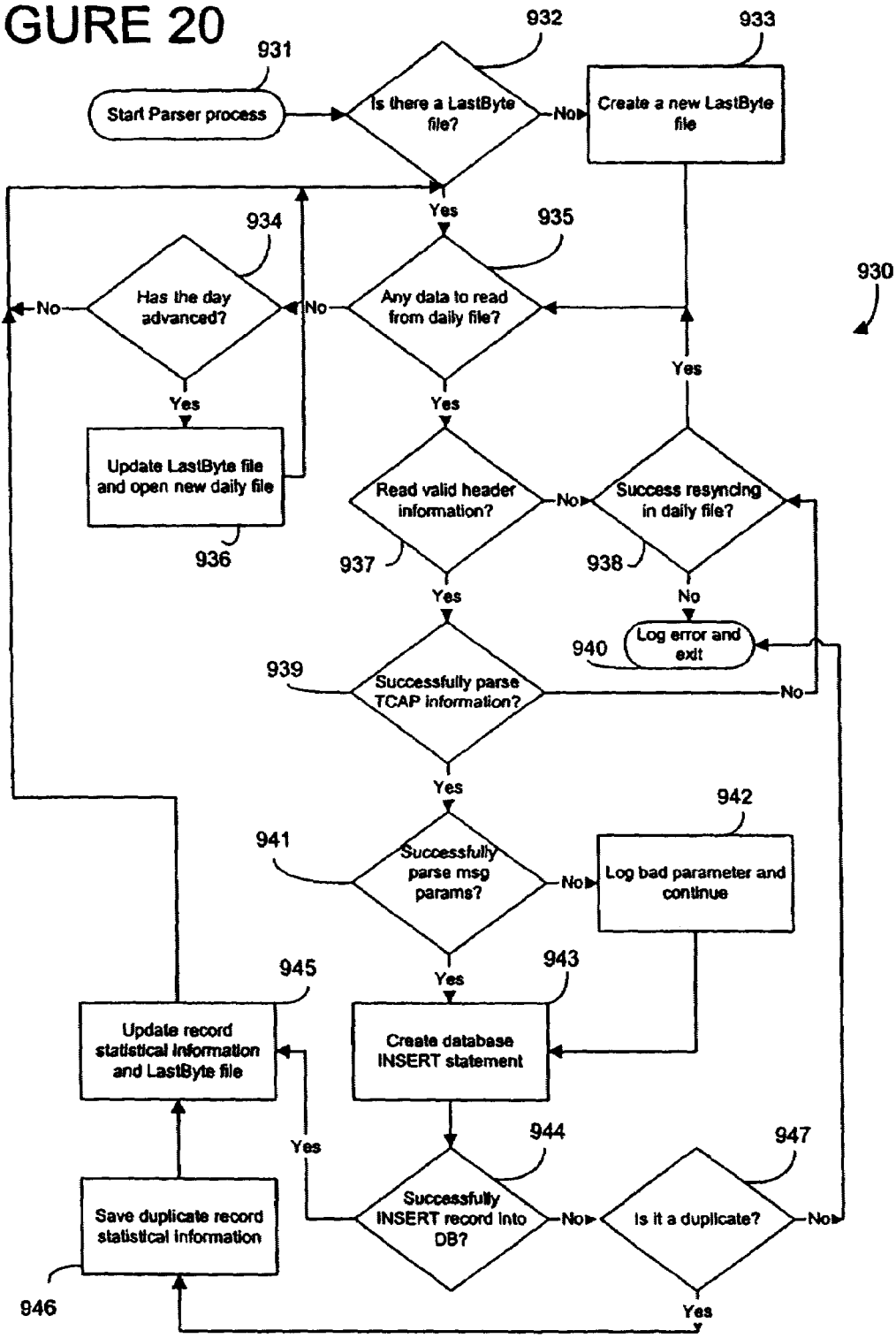
FIG. 20 is a flowchart showing a process of taking stored captured data and parsing into tables and fields.

A method 930 of parsing the data will be described with reference to FIGS. 20 to 22. The parsing process 930 begins at 931 and at 932 the parser 726 determines whether there is a last byte file and creates one if there is not at 933. At 935, the parser 726 determines whether the daily file 718 contains any data to read. If no data exists in the daily file to read, then at 934 the parser 726 checks whether the day has advanced and updates the last byte file and opens a new daily file if it has at 936. When the daily file 718 contains data to be read, the parser 726 reads the data and determines whether it contains valid header information at 937. If the header information is not valid, then at 938 the parser 726 attempts to resync the daily file 718 and determines whether the resyncing was successful at 938. If it was not successful, then at 940 the parser 726 logs the error and exits. If the resyncing, on the other hand, was successful, then the parser 726 returns to 935 and checks whether any data needs to be read from the daily file 718.

If the header information is valid, then at 939 the parser 726 parses the TCAP information and determines whether the parse was successful. If the parse was unsuccessful, then the parser 726 attempts to resync the daily file 718 at 938. If the TCAP information was successfully parsed, then at 941 the parser 726 parses the message parameters and determines whether the parse was successful. If the parse was not successful, then at 942 the parser 726 logs the bad parameter and continues at 943 to create a database insert statement. At 944, the parser 726 determines whether the insert statement has been successfully stored on the database 740. The insert record is actually stored in the message table 806 or RegNot/QualReq table 720 dedicated for the particular message in the data record. Consequently, the system 710 stores like messages in common message tables 806. If the insert was unsuccessful, then at 947, the parser 726 determines whether the record is a duplicate, and, if it is not, logs the error and exits at 940. If the record was a duplicate, then at 946 the parser 726 saves the duplicate record in statistical information. After saving the duplicate record at 946 or after a successful placement of an insert record into the database 740, the parser 726 updates the statistical information and the last byte file at 945. The parser 726 then returns to 935 to determine whether the daily file 718 contains any data to be read.

Figure 21:
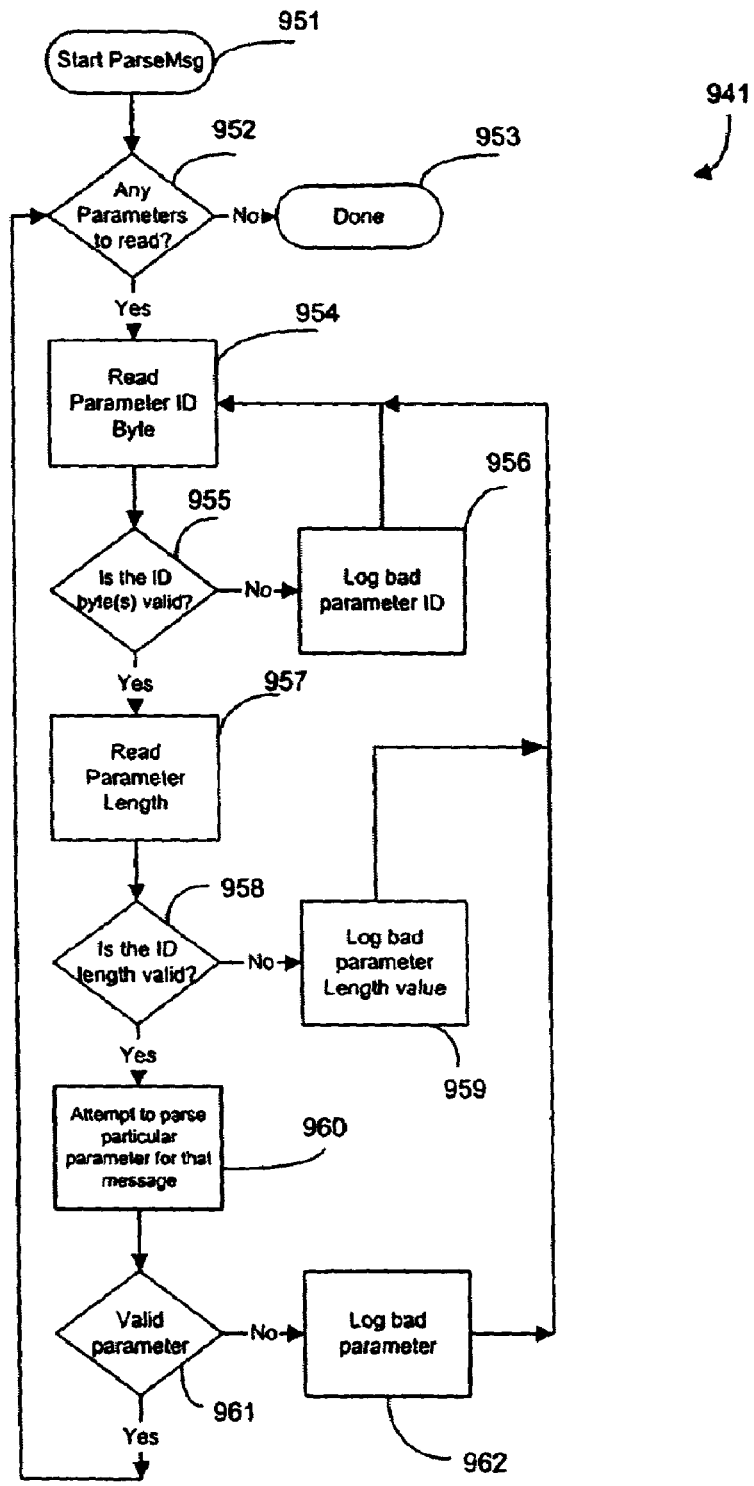
FIG. 21 is a flowchart showing a process of parsing message parameters performed in the flowchart in FIG. 20.

FIG. 21 illustrates a process in which the parser 726 determines whether the message parameters have been successfully parsed at 941. The parsing of the message parameters begin at 951 and at 952 the parser 726 determines whether any parameters exist to be read. If no parameters exist, then at 953 the process terminates. If parameters do need to be read, then at 954 the parser 726 reads the parameter ID byte and determines at 955 whether the ID byte is valid. If the ID byte is invalid, then at 956 the parser 726 logs the bad parameter ID and returns to 954 to read the parameter ID byte. If the ID byte is valid, then at 957 the parser 726 reads the parameter length and at 958 determines whether the length is valid. If the length is invalid, then at 959 the parser 726 logs the bad parameter length value and returns to 954 to read the parameter ID byte. If the ID length is valid, then at 960 the parser 726 attempts to parse a particular parameter for that message. If the parameter is valid, as determined at 961, then the parser 726 returns to 952 to determine whether any other parameters need to be read. If the parameter is invalid, then at 962, the parser 726 logs the bad parameter and returns to 954 to read the next parameter ID byte.

Figure 22:
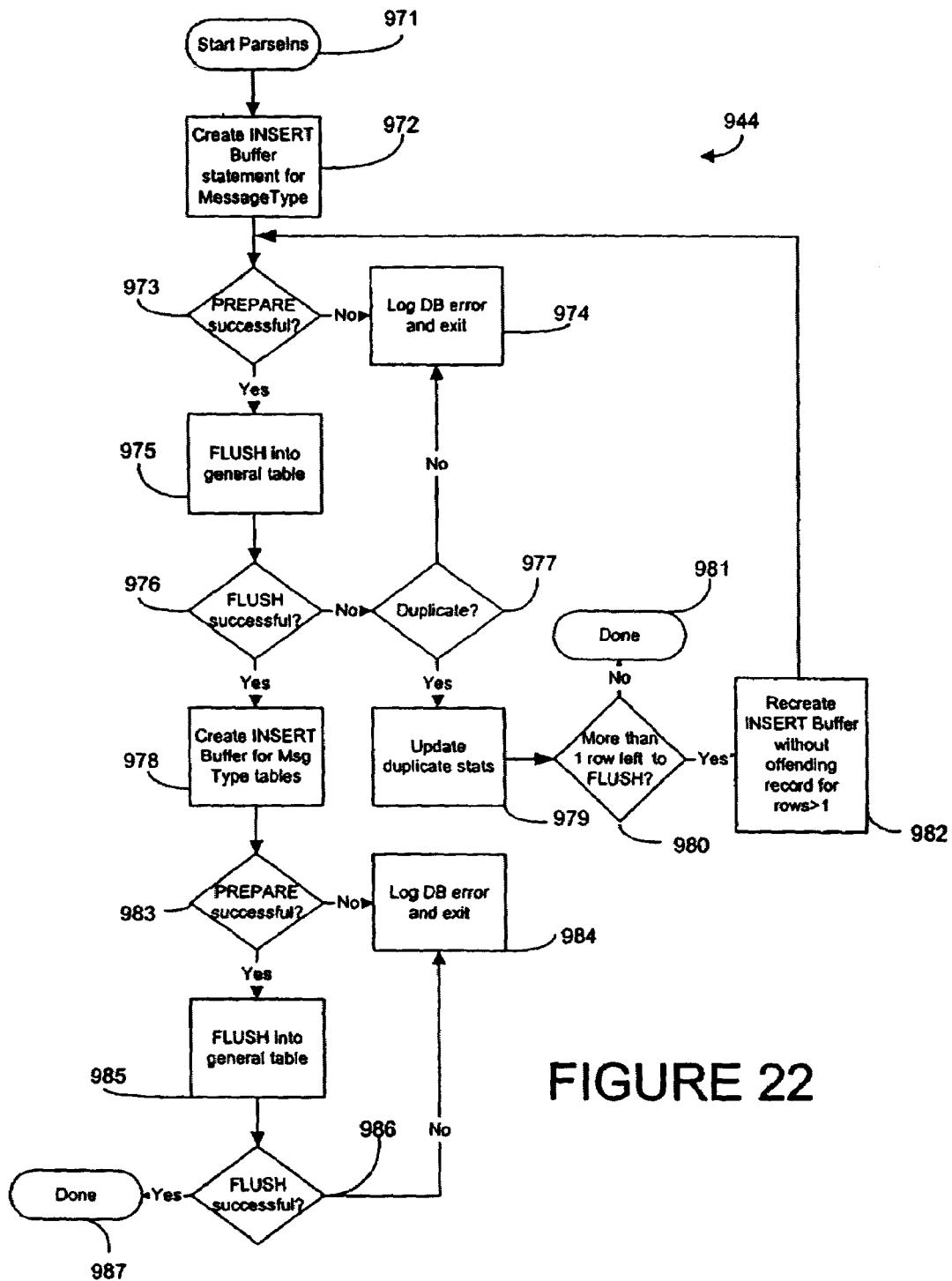
FIG. 22 is a flowchart showing a process of creating and placing an INSERT statement into a database performed in the flowchart in FIG. 20.

FIG. 22 illustrates a flow chart by which the parser 726 determines at 944 whether the INSERT record has been successfully placed into the database 740. The parser begins at 971 and at 972 creates an INSERT buffer statement for that particular message type. At 973 the parser determines whether the PREPARE has been successful and, if it was not, logs the database error and exits at 974. If the PREPARE was successful, then at 975 the parser 726 attempts to FLUSH into the general table and at 976 determines whether the FLUSH was successful. If the FLUSH was unsuccessful, then at 977 the parser 726 determines whether the FLUSH was a duplicate, and, if not, logs the database error and exits at 974. If it was a duplicate, then at 979 the parser 726 updates the duplicate statistical information and at 980 determines whether there is more than one row left to FLUSH. If not, the parser 726 terminates at 981 and otherwise recreates an INSERT buffer with the remaining rows at 982.

If the FLUSH was successful as determined at 976, then at 978 the parser 726 creates an INSERT buffer for the message type tables. As discussed above, the INSERT is generated for one of the message tables $806_1$ to $801_N$ or RegNot/QualReq table 720. At 983, the parser 726 determines whether the PREPARE was successful, and if not, logs the database error and exits at 984. If the PREPARE was successful, then at 985 the parser 726 performs a FLUSH into the message table 806. If the FLUSH was successful, as determined at 986, the parser 726 terminates at 987, otherwise, the parser 726 logs the database error and exits at 984.

Figure 23:
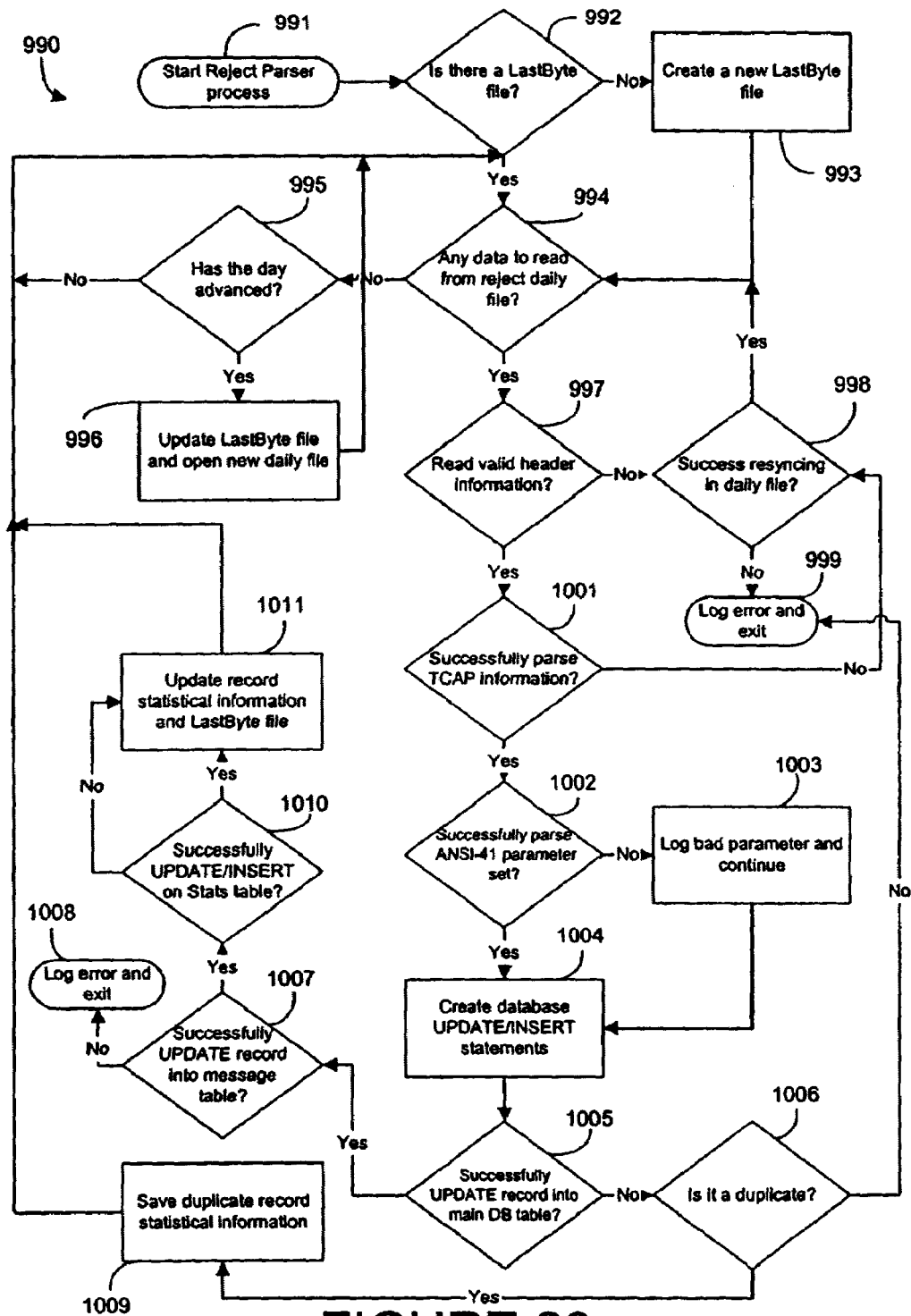
FIG. 23 is a flowchart showing a process of taking reject records and parsing the records into tables and fields.

A process 990 of parsing records from the reject file 716 will now be described with reference to FIG. 23. The reject parser 724 begins at 991 and at 992 determines whether there is a last byte file. If not, the reject parser 724 creates a new last byte file at 993. After the last byte file has been created or if there already was one, then at 994 the reject parser 724 determines whether the reject file 716 contains any data to be read. If no data exists, then at 995 the reject parser 724 determines whether the day has advanced. If the day has advanced, then at 996 the reject parser 724 updates the last byte file and opens a new daily reject file 716 at 996.

When the reject daily file 716 contains data to be read, the reject parser 724 at 997 reads the header information and determines whether it is valid. If it is invalid, then at 998 the reject parser 724 attempts to resync the file 716 and checks whether the resyncing was successful. If the resyncing was unsuccessful, then at 999 the reject parser 724 log the error and exists. If the resyncing was successful, then the reject parser 724 returns to 994 to read the data from the reject daily file 716.

If the header information is valid, then at 1001 the reject parser 724 attempts to parse the TCAP information and checks whether the parsing was successful. If the parsing was unsuccessful, the reject parser 724 attempts to resync the file 716 and determines at 998 whether the resyncing was successful. If the TCAP information was successfully parsed, then at 1002 the reject parser 724 attempts to parse the ANSI-41 parameter set and checks whether that parse was successful Tf the parsing was unsuccessful, then at 1003 the reject parser 724 logs the bad parameter and continues at 1004 to create a database UPDATE/INSERT statement. At 1005, the reject parser 724 attempts to place the UPDATE record into the call_detail2 table 804 and determines whether the record was successfully placed. If it was not, then at 1006 the reject parser 724 determines whether the record was a duplicate and, if it was not, logs any error and exits at 999. The reject parser 724, at times, will not be able match the reject message with a message in the database 740 and will have to wait for a subsequent operation of process 990 to match the reject message. If the record was a duplicate, then at 1009 the reject parser 724 saves the duplicate record as statistical information in a reject statistical file in the database 740 and returns to 994 to determine whether the reject daily file 716 has any data to be read from.

If the UPDATE record was successfully placed in the call_detail2 table 804, then at 1007 the reject parser 724 attempts to place the UPDATE record into one of the message tables 806 dedicated for reject messages. If the reject parser 724 was successful in placing the UPDATE record into the message tables 806, then at 1010 the reject parser 724 attempts to UPDATE/INSERT the record into the reject statistical file in database 740. At 1011, the statistical information is updated and the last byte file is updated. If the UPDATE record was unsuccessfully placed into the message table 806, then at 1008 the reject parser 724 logs the error and exits.

Updating Statistics

Figure 24:
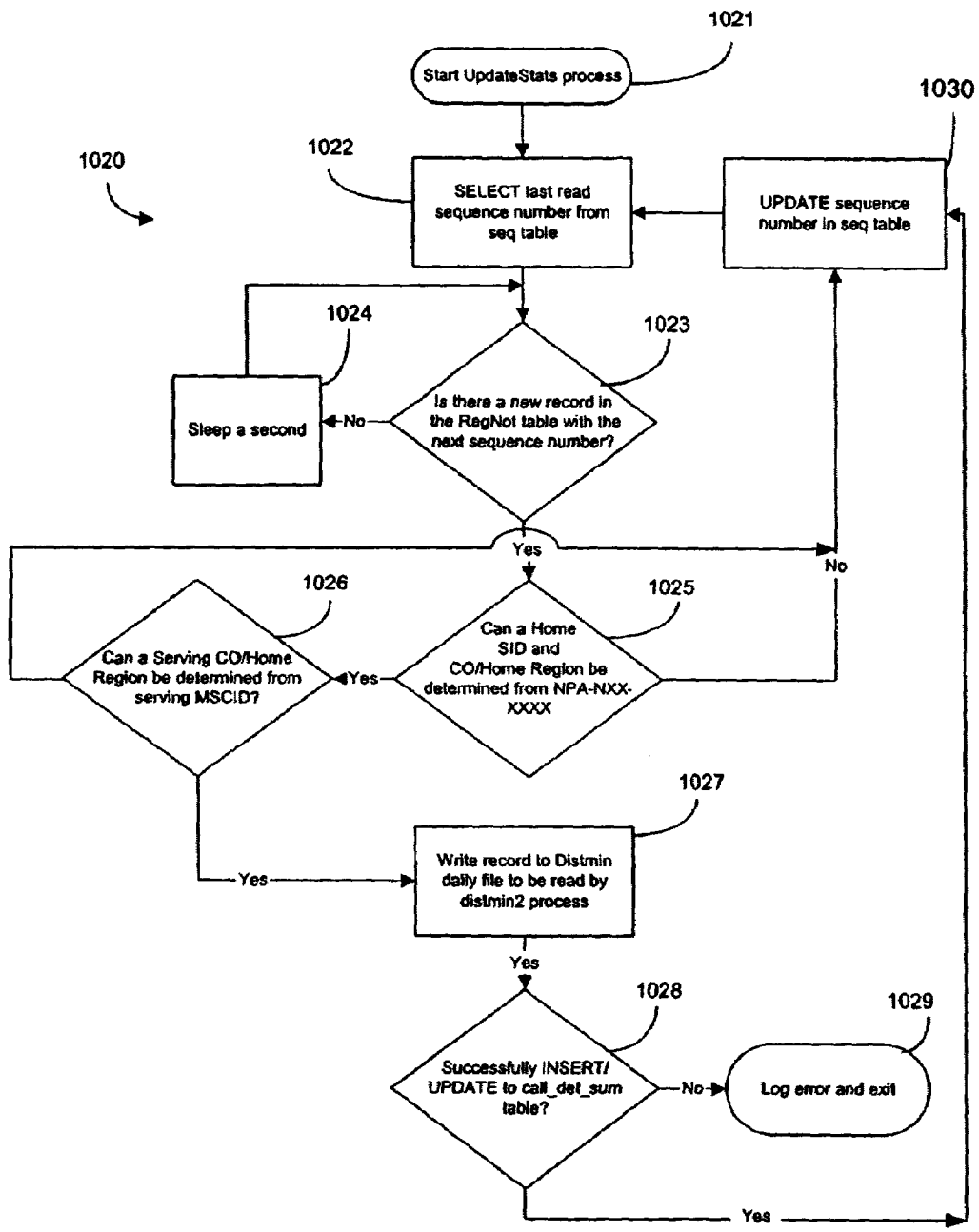
FIG. 24 is a flowchart showing a process of updating statistical information based on captured data.

A process 1020 performed by the Upd_Stats object 742 will now be described with reference to FIG. 24. In general, the Upd_Stats object 742 selects records from the RegNot/QualReq table 720, may acquire additional information from the sid_listing2 table 826, and inserts or updates information in the call_det_sum table 820. The process 1020 begins at 1021 and at 1022 the Upd_Stats object 742 selects the last read sequence number from the sequence table Seq_Tbl 812. At 1023, the Upd_Stats object 742 determines whether a new record exists in the RegNot/QualReq table 720 with the next sequence number. If no record exists, then at 1024 the Upd_Stats object 742 sleeps for a period of time, such as a second, and then repeats 1023 to determine whether the record now exists. When a record does exist in the RegNot/QualReq table 720 with the correct sequence number, then at 1025 the Upd_Stats object 742 determines whether a home SID and company or home region can be determined from the NPA-NXX-XXXX information in the record. The Upd_Stats object 742 performs a look-up function in the sid_listing2 table 826 to find the home SID and company or the home region. If this information cannot be determined, then at 1030 the Upd_Stats object 742 updates the sequence number in the sequence table Seq_Tbl 812. If the information on the home SID and company or home region can be determined, then at 1026 the Upd_Stats object 742 determines whether a serving company or home region can be determined from the MSCID. The Upd_Stats object 742 derives the serving company and home region from information in the sid_listing2 table 826. If this information is unavailable, then at 1030 the Upd_Stats object 742 updates the sequence number in the sequence table Seq_Tbl 812. If the information is available, then at 1027 the Upd_Stats object 742 writes a record to the dmfileMMDD.dat file 822. The dmfileMMDD.dat file 822 contains all the records already tested for STATS and are ready to be used by the distmin2 object 748. At 1028, the Upd_Stats object 742 attempts to INSERT/UPDATE information in the call_det_sum table 820 and determines whether this action was successful. If it was not, then at 1029, the Upd_Stats object 742 logs the error and exits. If it was successful, then at 1030 the Upd_Stats object 742 updates the sequence number in the Seq_Tbl 812.

The call_det_sum table 820 contains fields for the home company, home SID, home switch, serving company, serving SID, OPC, DPC, TRANSID, message type, date time, STATS, and message errors. Some of this information, as discussed above, is obtained by the Upd_Stats object 742 from the sid_listing2 table 826. The STATS in the call_det_sum table 820, in this example, may fall into one of four categories. The category of "valid" indicates that the paired record has a valid return and means that no error or authorization denied information accompanies this message. The category of "invalid" means that the paired record has an invalid return and that there is an error in or authorization denied associated with that message. A third category is "unpaired" meaning that the record did not have a return and the status is consequently unknown. The fourth category is a "reject" category which is handled by the reject parser 724.

Distinct MIN

Figure 25:
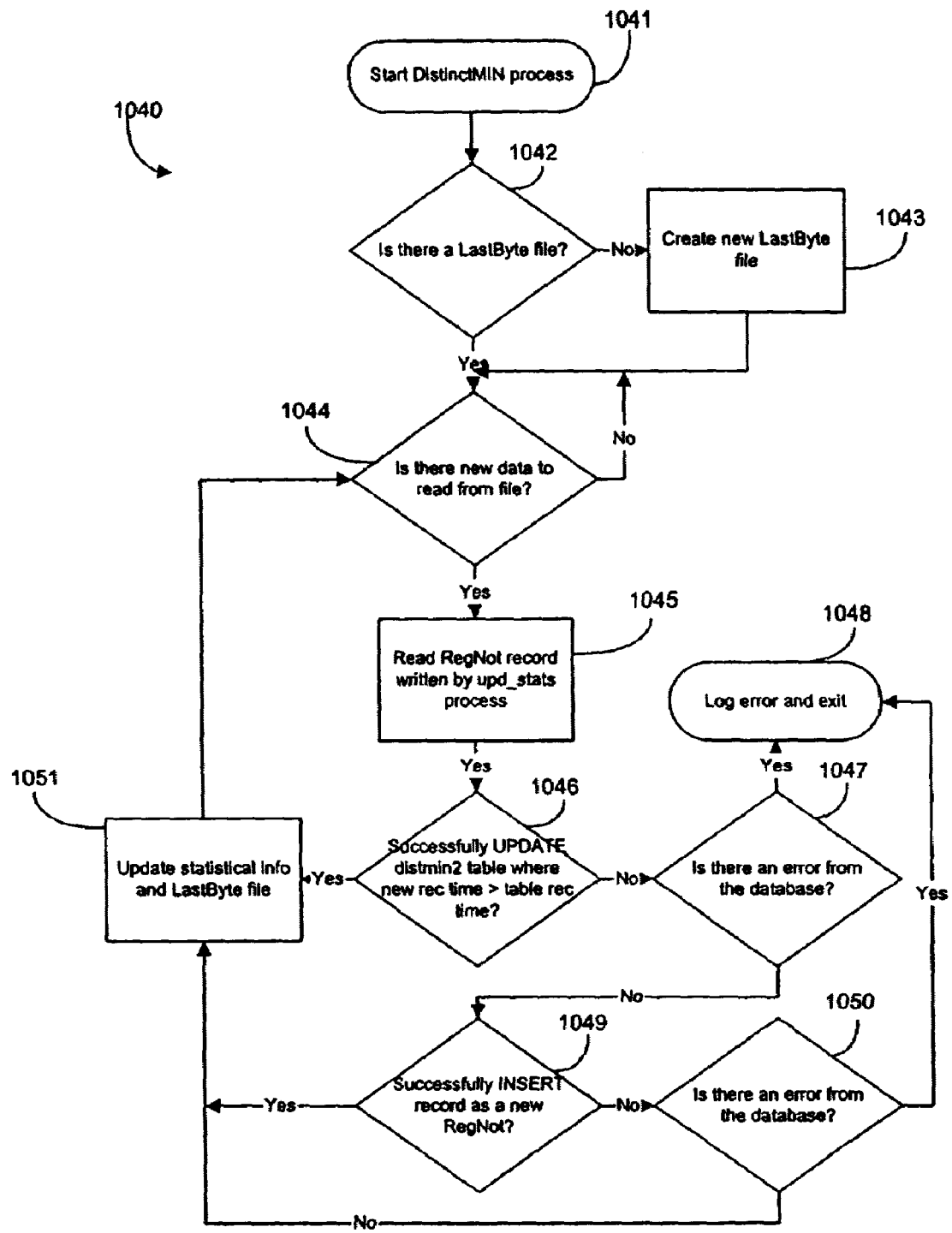
FIG. 25 is a flowchart showing a process of updating fields in a table of MINs.

A process 1040 performed by the distmin2 object 748 will now be described with reference to FIG. 25. The process 1040 begins at 1041 and at 1042 the distmin2 object 748 determines whether there is a last byte file. If not, the distmin2 object 748 creates the last byte file at 1043. At 1044, the distmin2 object 748 waits for data to be read from the dmfileMMDD.dat table 822. When there is new data to be read, the distmin2 object 748 reads the RegNot record written by the Upd_Stats object 742. At 1046, the distmin2 object 748 attempts to update the distmin2 table 832 when the time associated with the new record is more recent than any record in the distmin2 table 832 associated with that particular MIN. The distmin2 object 748 also determines whether the update was successful at 1046, and, if it was not, determines whether there was an error from the database. If there was, the distmin2 object 748 logs the error and exits at 1048. If there was no error from the database, then at 1049 the distmin2 object 748 attempts to place an insert record as a new RegNot in the distmin2 table 832. If this new RegNot record was successfully placed in the distmin2 table 832, then the distmin2 object 748 updates statistical information and the last byte file at 1051. If the distmin2 object 748 was unsuccessful in placing the RegNot record into the distmin2 table 832, then the distmin2 object 748 checks whether there was an error from the database at 1050 and logs the error and exits at 1048 if there was such an error.

The distmin2 table 832 has an entry for every MIN encountered during a day. The distmin2 table 832 preferably contains the fields of the MIN, home SID, serving company, the serving SID, the serving switch, the message type, the date, the time, DPC, the OPC, and the NPA-NXX. As discussed above, the distmin2 object 748 checks the time of the entry of the distmin2 table 832 and compares that to the time of a new record in the dmfileMMDD.dat file 822. The distmin2 object 748 only updates the distmin2 table 832 when the new record is more recent than that stored in the distmin2 table 832 for a particular MIN.

Graphical User Interface

As described in the summary of the invention, information from the messages provides roamer visibility, fraud, and other useful administrative data. This data is available for query by on-line customer support work stations as well as other personnel. This data, as mentioned in the summary of the invention, can be processed to create various statistics relevant to network traffic, network engineering, customer support, and marketing. The interfaces 760 to the system 710 provide personnel with this query capability.

Figure 26:
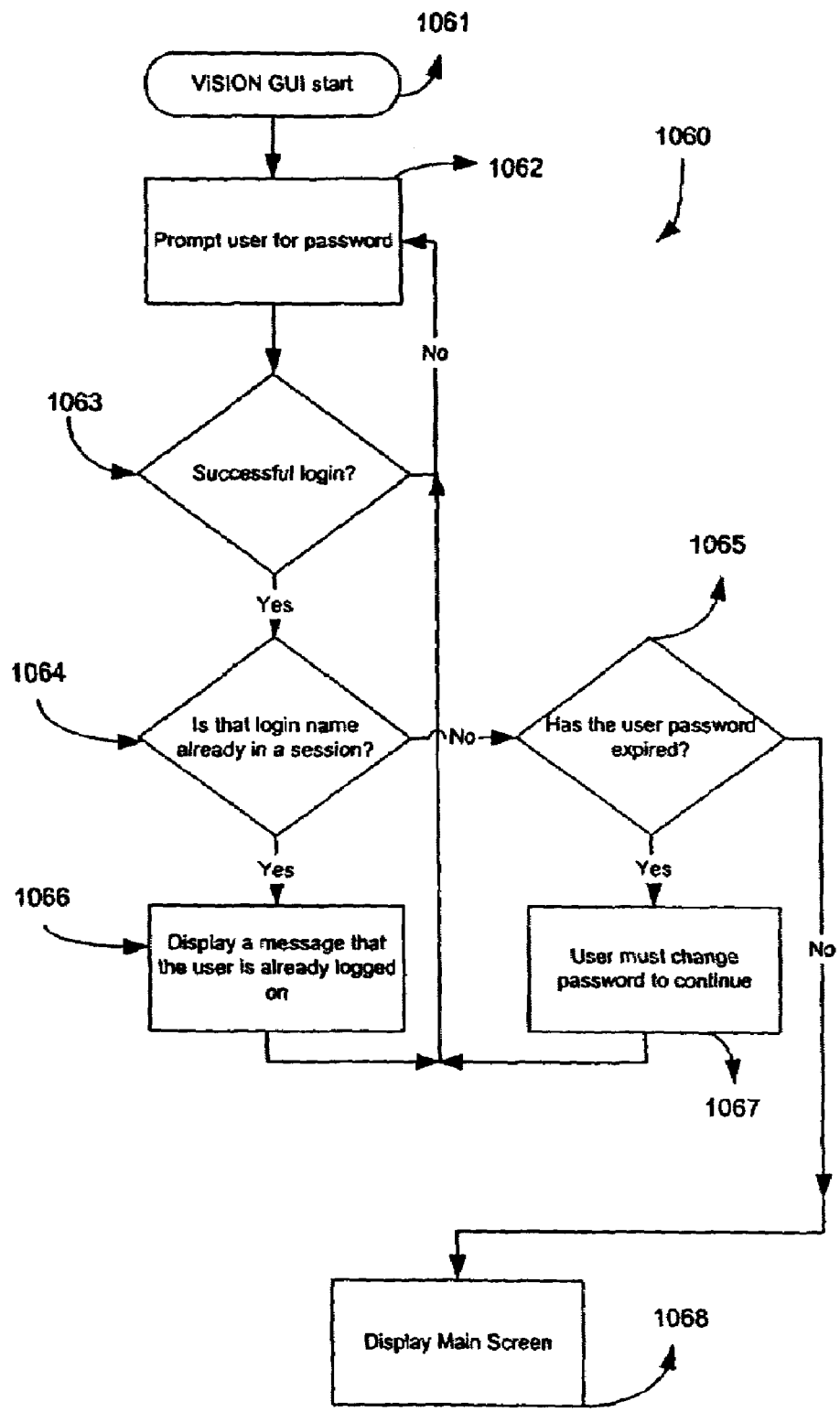
FIG. 26 is a flowchart depicts a process of using a GUI to go on-line with the system of FIG. 13.

A process 1060 by which personnel gain access to the system 710 through one of the interfaces 760 will now be described with reference to FIG. 26. A graphical user interface, ("GUI") begins at 1061 and at 1062 the interface 760 prompts the user for a password. Upon successful login as determined by the system 710 at 1063, the system 710 next checks whether that login name is already in a session at 1064. If the login name is already in a session, then the system 710 displays a message to the user that the user is already logged on at 1066 and processing returns to 1062 at which the time the user is prompted for a password. If the login name is not already in a session, then the system 710 checks whether the password has expired at 1065. If the password has expired, then at 1067 the user is required to change the password and to continue the login procedure at 1062. If the password has not expired then the system 710 displays a main screen at 1068.

Figure 27:
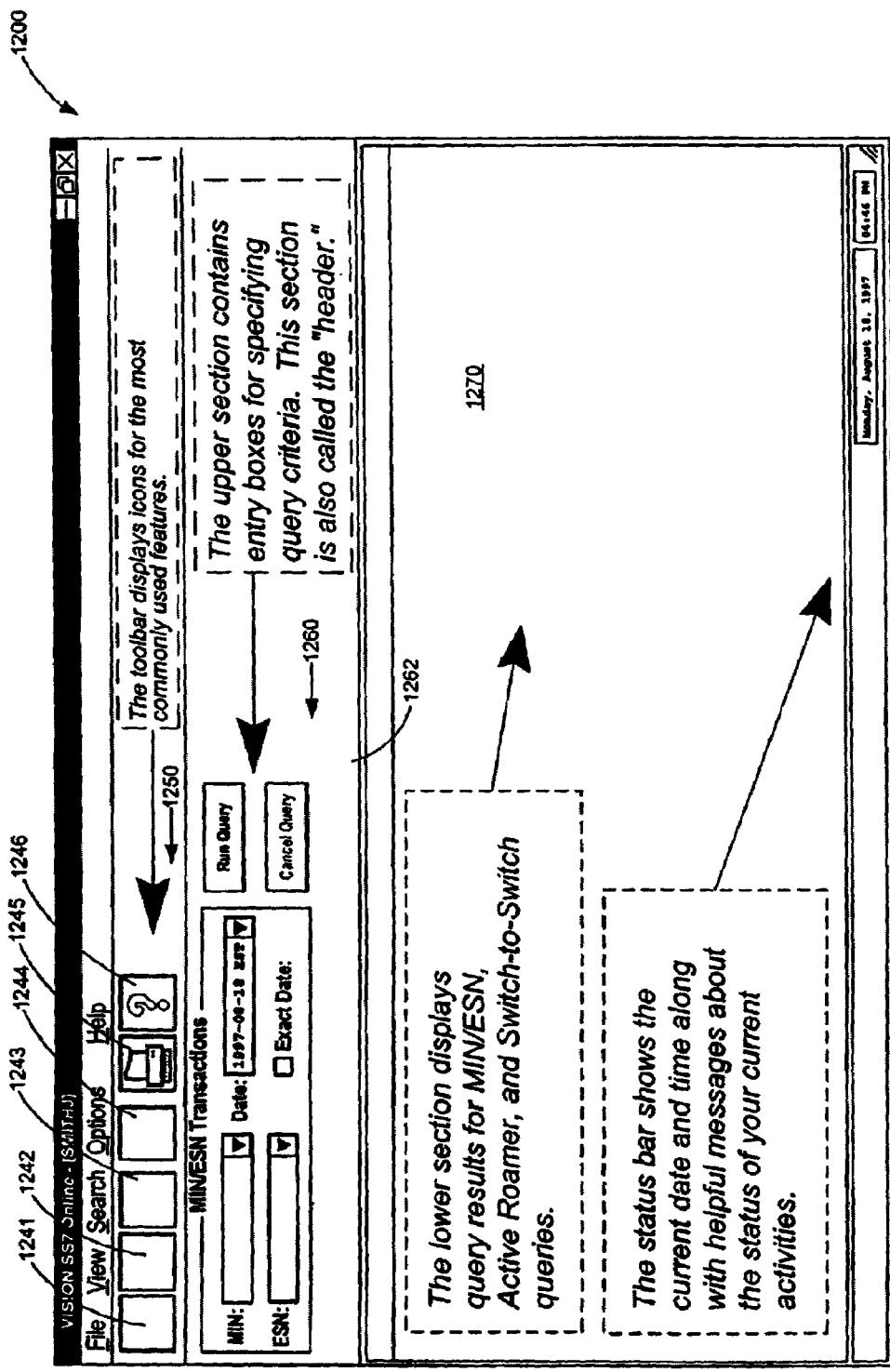
FIG. 27 is an example of a main menu for a GUI according to a preferred embodiment of the invention.
Figure 28:
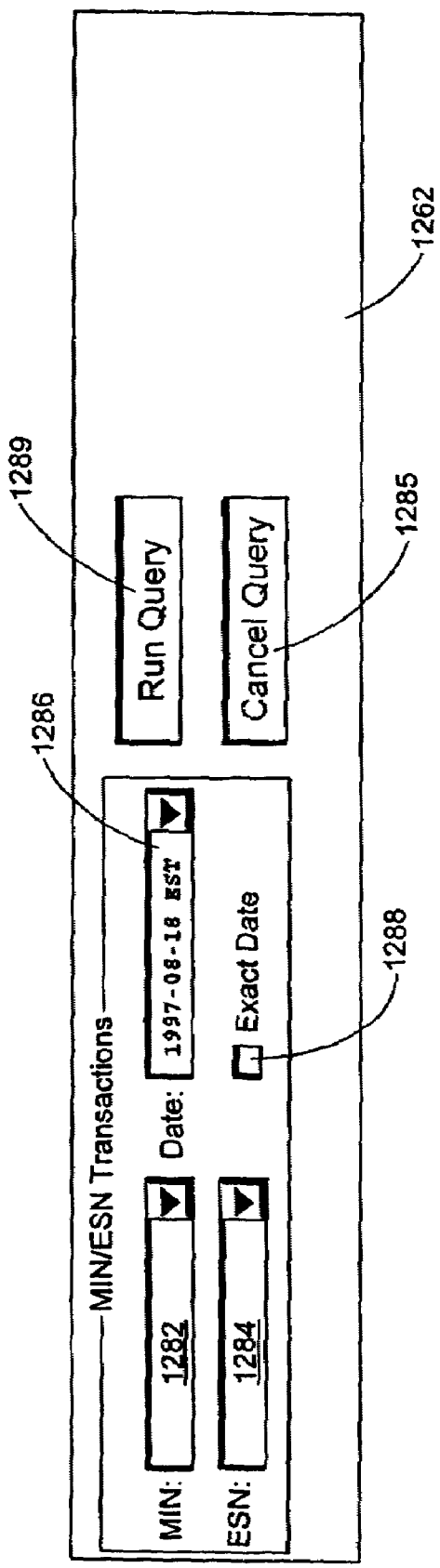
FIG. 28 is a header for use with the GUI in performing a MIN/ESN Transactions query.

An example of a Graphical User Interface 1200 is shown in FIG. 27. FIG. 27 depicts a main menu 1240 having a tool bar 1250, a header section 1260, and a results area 1270. In this example of the GUI 1200, the tool bar 1250 includes an icon 1241 for a MIN/ESN query, an icon 1242 for an active roamer query, an icon 1243 for a switch-to-switch query, an icon 1244 for a transaction statistics query, an icon 1245 for printing the query results, and an icon 1246 for on-line help. The tool bar 1250 is not limited to these icons but may include additional icons for other types of queries.

The header section 1260 varies according to the query selected. In the example shown in FIG. 27, the MIN/ESN icon 1241 was selected for a MIN/ESN query. Consequently, the header section 1260 displays the MIN/ESN header 1262. The result section 1270 contains all entries satisfying the search parameters of one of the queries.

MIN/ESN Query

One of the queries available to a user of the system 710 is a MIN/ESN query. Through a MIN/ESN query, the roaming activity of a specific customer can be seen. As shown in more detail in FIG. 28, the MIN/ESN header 1262 includes a field 1282 for entering the MIN, a field 1284 for entering the ESN, and a field 1286 for entering a date. The user enters one of or both of the MIN and ESN and also provides date information in field 1286. To execute the query, the user selects the "Run Query" button 1289 and can cancel the query at any time by pressing the "Cancel Query" button 1285. The user may specify the date in one of two ways, by specifying an exact date or by indicating a range of dates. To limit the query to one single date, the user selects the date within field 1286 and clicks on the exact date field 1288. On the other hand, to perform a query on a range of dates, the user selects the starting date within field 1286 and leaves the exact date field 1288 unmarked whereby the query will pull all records from the date specified in field 1286 to the present date.

Figure 29A:
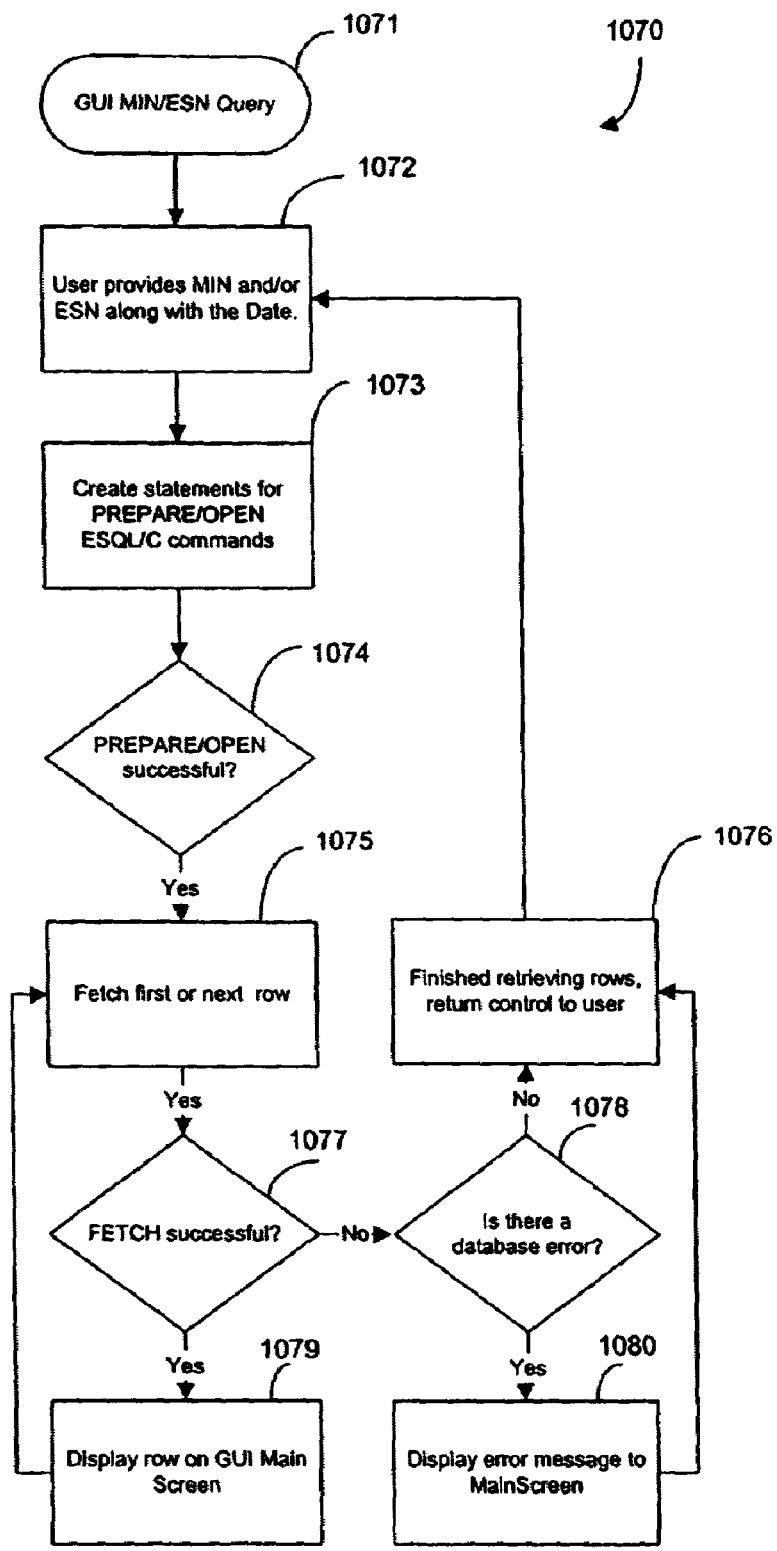
FIGS. 29A and 29B are flowcharts depicting processes of performing a MIN/ESN query.
Figure 29B:
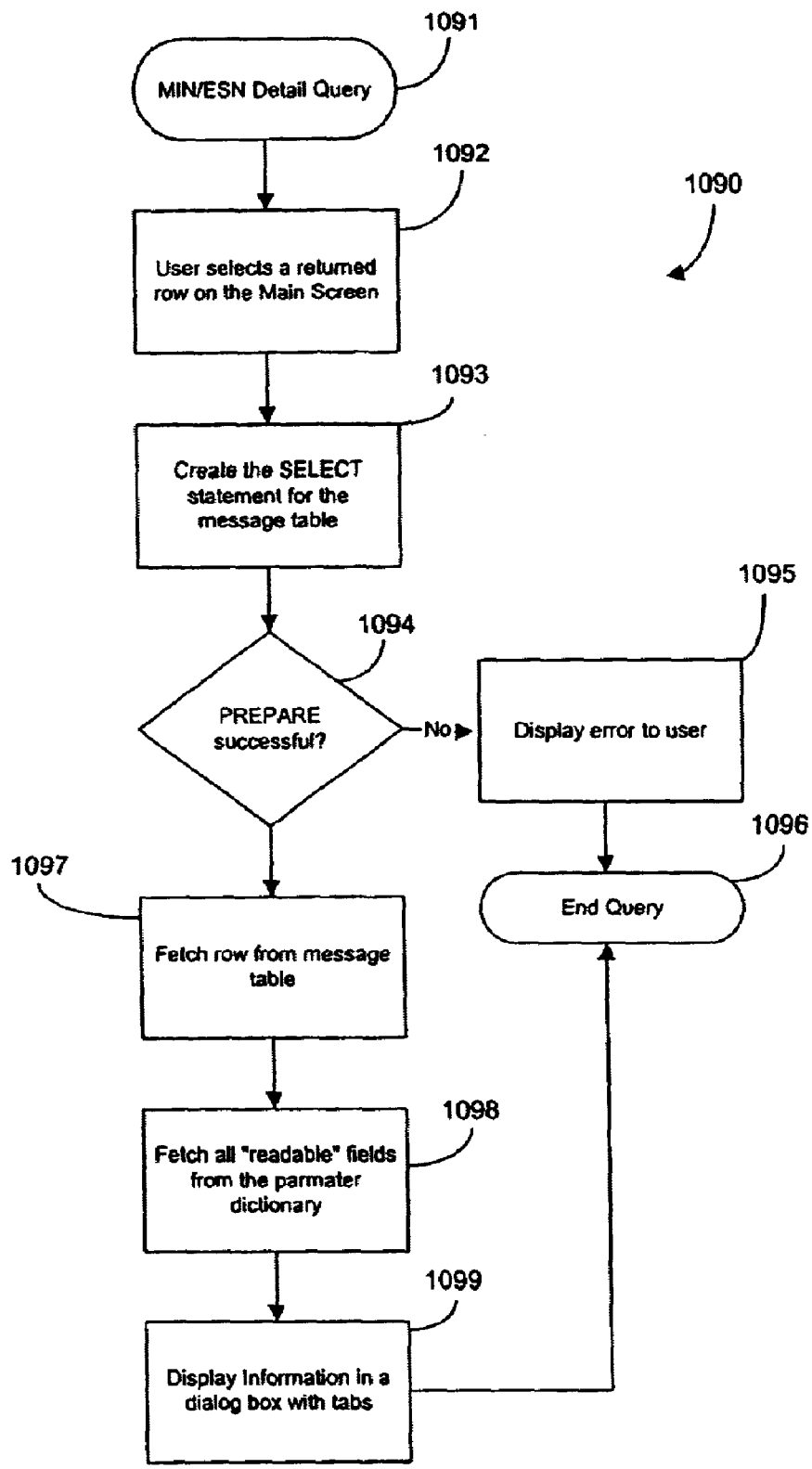

A process 1070 of performing a MIN/ESN query will now be described with reference to FIGS. 29A and 29B. The process 1070 begins at 1071 and at 1072 the system 710 receives the MIN and or ESN along with data information at 1072. The system 710 creates statements for PREPARE/OPEN ESQL/C commands at 1073 and checks whether the PREPARE/OPEN was successful at 1074. If it was unsuccessful, then the process 1070 returns to 1072 so that the user may reenter the MIN and/or ESN and data information. If the PREPARE/OPEN was successful, then at 1075 the system 710 fetches the first row from the call_detail2 table 804. If the FETCH was successful, as determined by the system at 1077, then at 1079 the system 710 displays the row on a main screen on the interface 760. Subsequent rows are fetched at 1075 and displayed at 1079 until the complete set of records satisfying the query are displayed on the interface 760. If a FETCH is unsuccessful, then at 1078 the system 710 checks whether there was a database error. If an error does exist, then the system 710 displays an error message to the interface 760, finishes retrieving rows, and returns control to the user at 1076.

A process 1090 by which a user can obtain detailed information for individual entries in the search results will be described with reference to FIG. 29B. A MIN/ESN detail query begins at 1090 and at 1092 the system 710 receives a user selection for a row on the main screen 1040. At 1093, the system 710 creates a select statement for one of the message tables 806 or RegNot/QualReq table 720. At 1094, the system 710 determines whether the PREPARE was successful, and, if it is not, displays an error to the user at 1095. If the PREPARE was successful, then at 1097 the system 710 fetches the record from the message table 806 or RegNot/QualReq table 720 and fetches all "readable" fields from the parameter dictionary at 1098. The system 710 then displays the information in a dialog box at 1099 and ends the query at 1096.

Figure 30A:
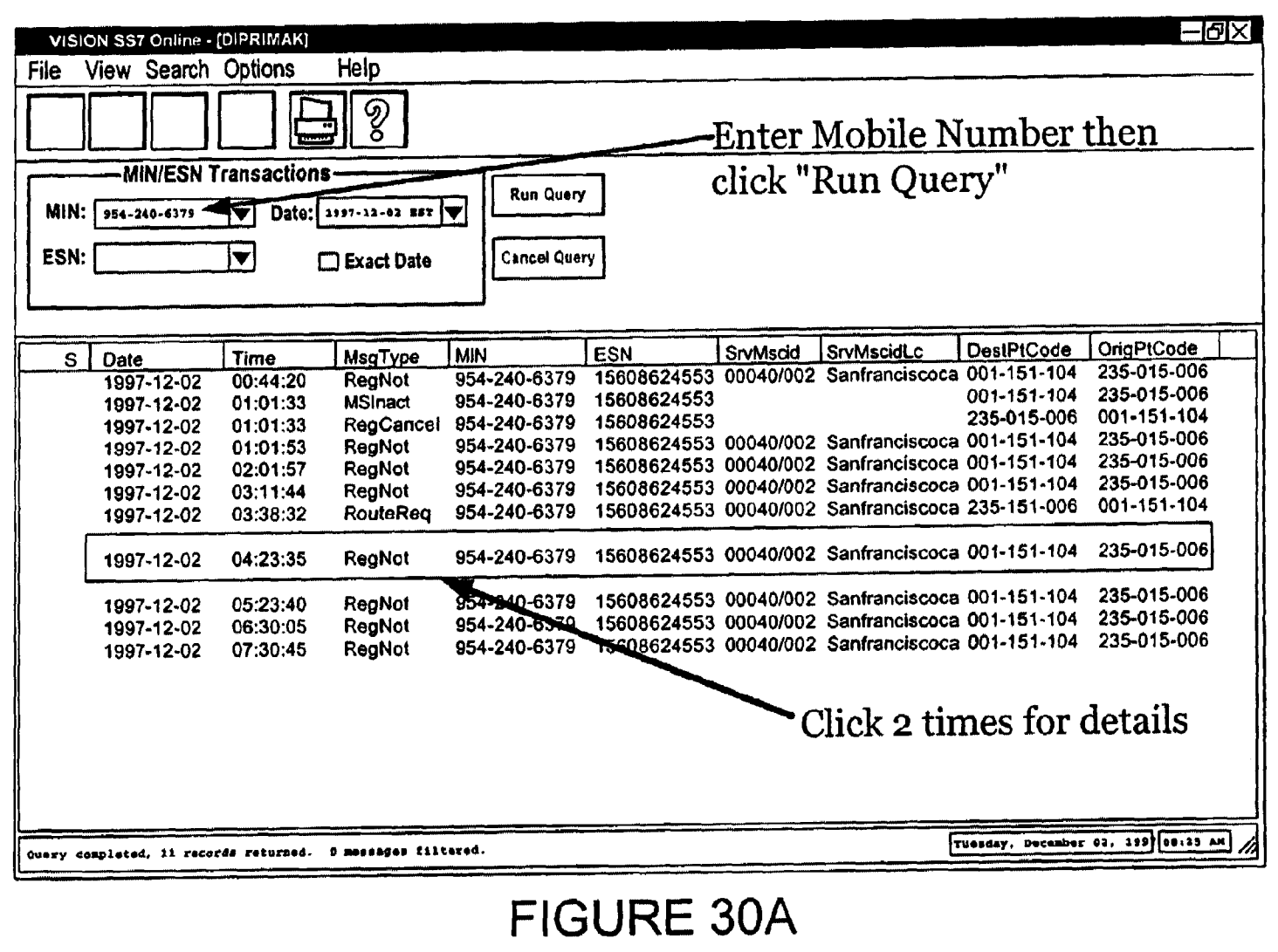
Figure 30B:
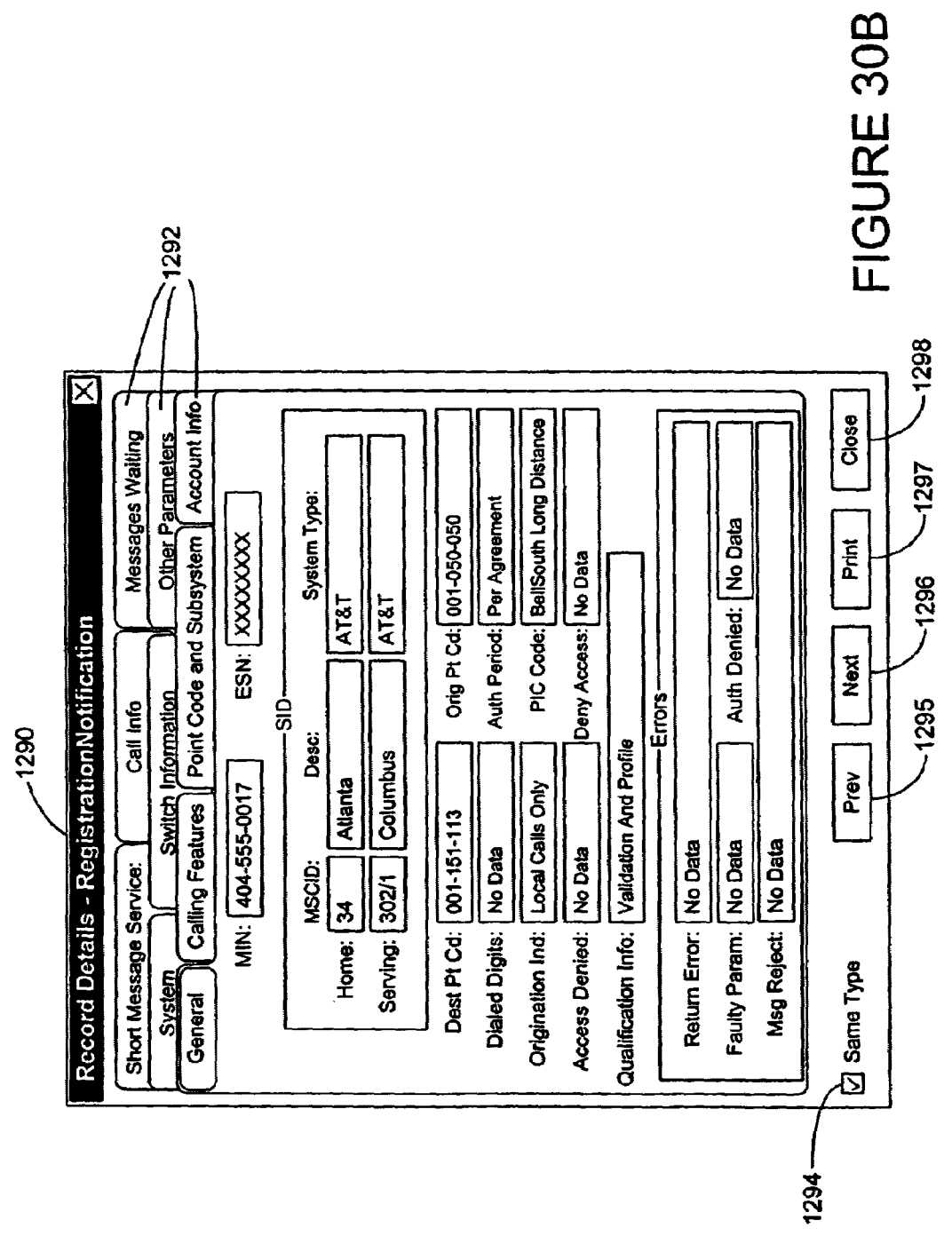
Figure 30C:
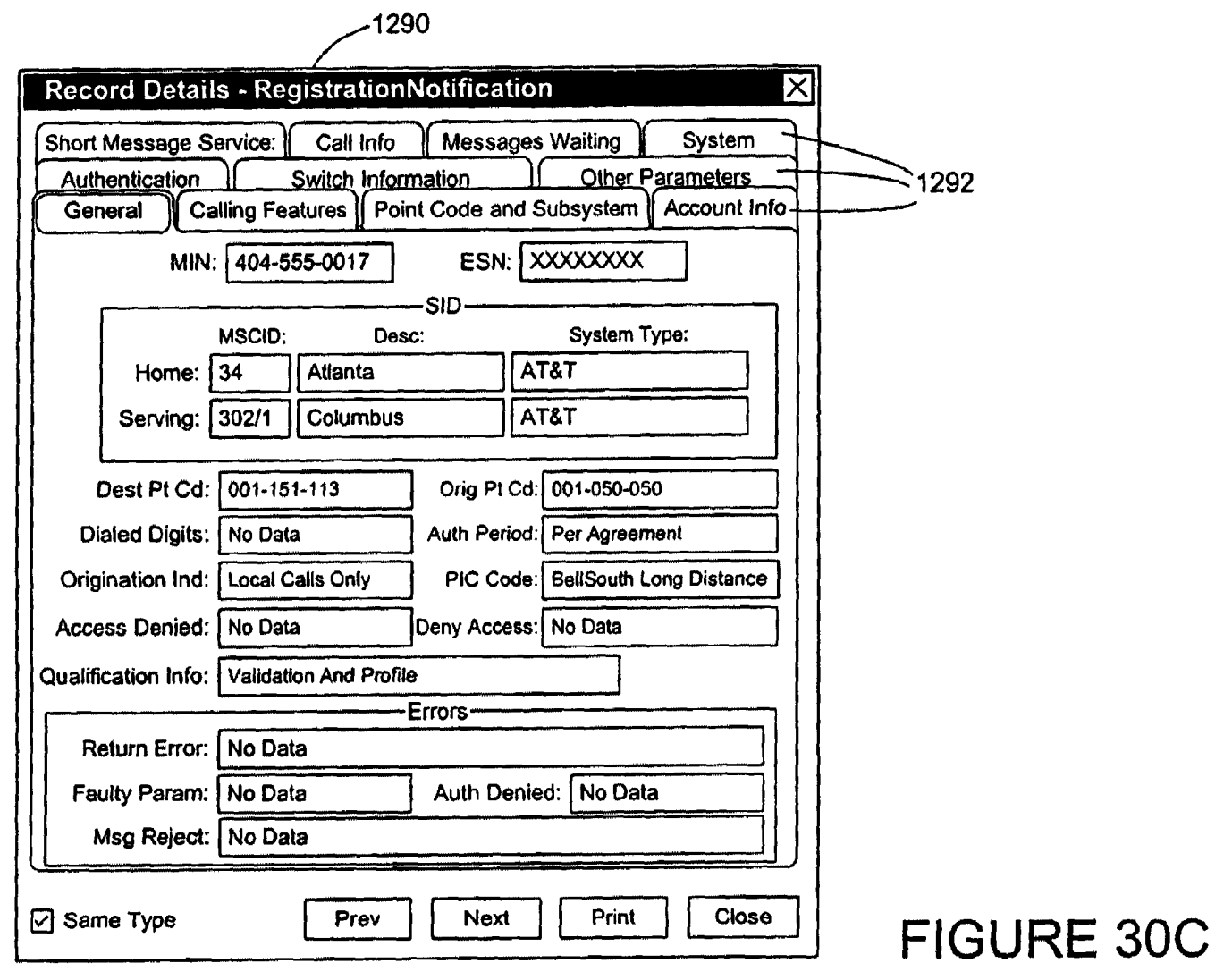

An example of the results of a MIN/ESN query is shown in FIGS. 30A to 30C. FIG. 30A shows results of a search in section 1270 of a query involving a particular MIN, which was entered into the MIN field 1282, and date, as entered in the date field 1286. Each row within the section 1270 is a separate message that contains that MIN and the columns in the section 1270 provide general information on each message. As discussed above with reference to FIG. 29B, a user may select a single record in which case the record will be shown in a tabular format.

An example of a record detail for a Registration Notification message is shown in FIG. 30B. When the user selects a single record from the results section 1270, the system 710 pulls all of the parameter data from one of the message tables 806 or the RegNot/QualReq table 720. With reference to FIG. 30B, the GUI 1200 displays the record in a format with a plurality of tabs 1292. In the example shown in FIG. 30B, the "General" tab is selected and many of the general parameters shown in 30A are also shown in this tab. To view some of the other parameters, the user simply clicks on one of the other tabs and information grouped under that tab will be displayed.

The user can also scroll through the messages in the results section 1270 with buttons 1295 to 1298. For instance, the user presses the "Prev" button 1295 to view the previous record, the "Next" button 1296 to view the next record, the "Print" button 1297 to print the record, and the "Close" button 1298 to close the display 1290 of that particular record. If the user is interested in only scrolling through messages of the same type, such as all Registration Notification messages, then the user selects field 1294.

By displaying the parameter data with tabs 1292, the data can be easily viewed by the user. The user need not scroll through a large amount of data to arrive at the data of interest but rather can quickly point to a tab 1292 to view all of the information that is desired. Also, the system 710 preferably provides a tab 1292 only if a parameter displayed in that tab 1292 contains data. For instance, FIG. 30B does not show any tab for "Authentication" since this record did not contain such information. In contrast, FIG. 30C does include a tab 1292 for "Authentication" since this record does contain such data.

Active Roamer Query

Figure 31A:
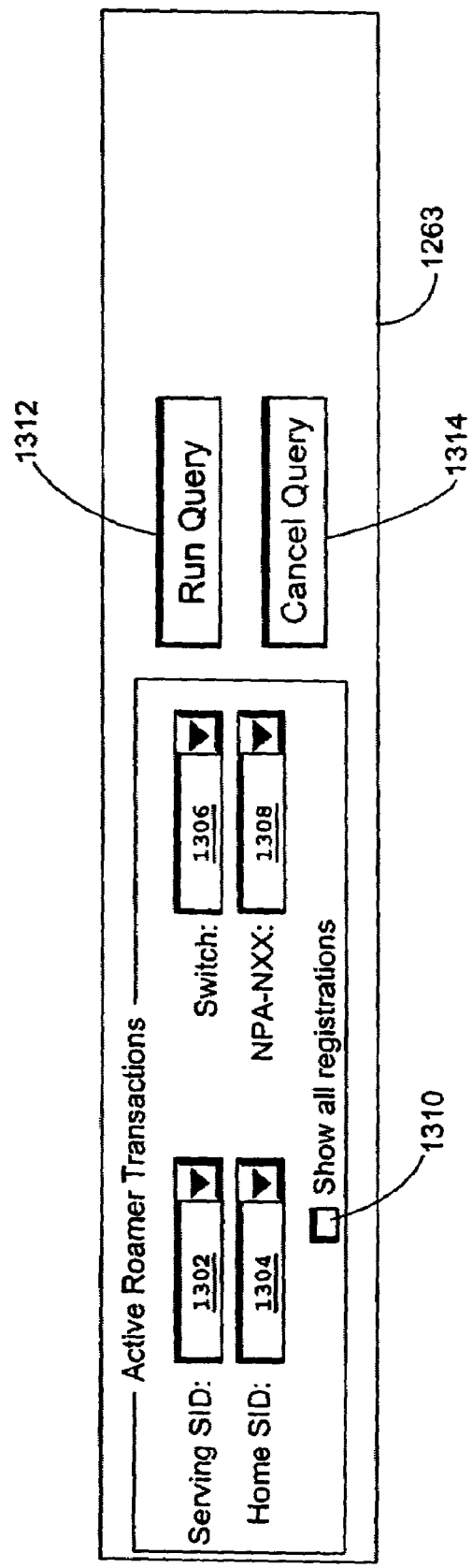

When the user selects the active roamer query icon 1242, the main menu 1240 displays an active roamer header, such as header 1263 shown in FIG. 31. The header 1263 includes a field 1302 for the serving SID, a field 1304 for the home SID, a field 1306 for the switch, and a field 1308 for the NPA-NXX. The user can structure a query by selecting any one of the fields 1302, 1304, 1306, or 1308 or by entering data into any combination of the fields 1302, 1304, 1306, or 1308. The system 710 then searches for all unique registration notification records that are registered in a serving market but which have not been canceled with a Registration Cancellation or an MSInactive message and that do not have an authorization denied or error code. The user may also select a field 1310 to show all registrations. With this field 1310 selected, all unique registrations, whether or not they have been canceled with a Registration Cancellation message, are shown. In this example, the search is performed only for the current day, although in other applications of the invention, day or range of dates may be entered by the user.

Figure 32A:
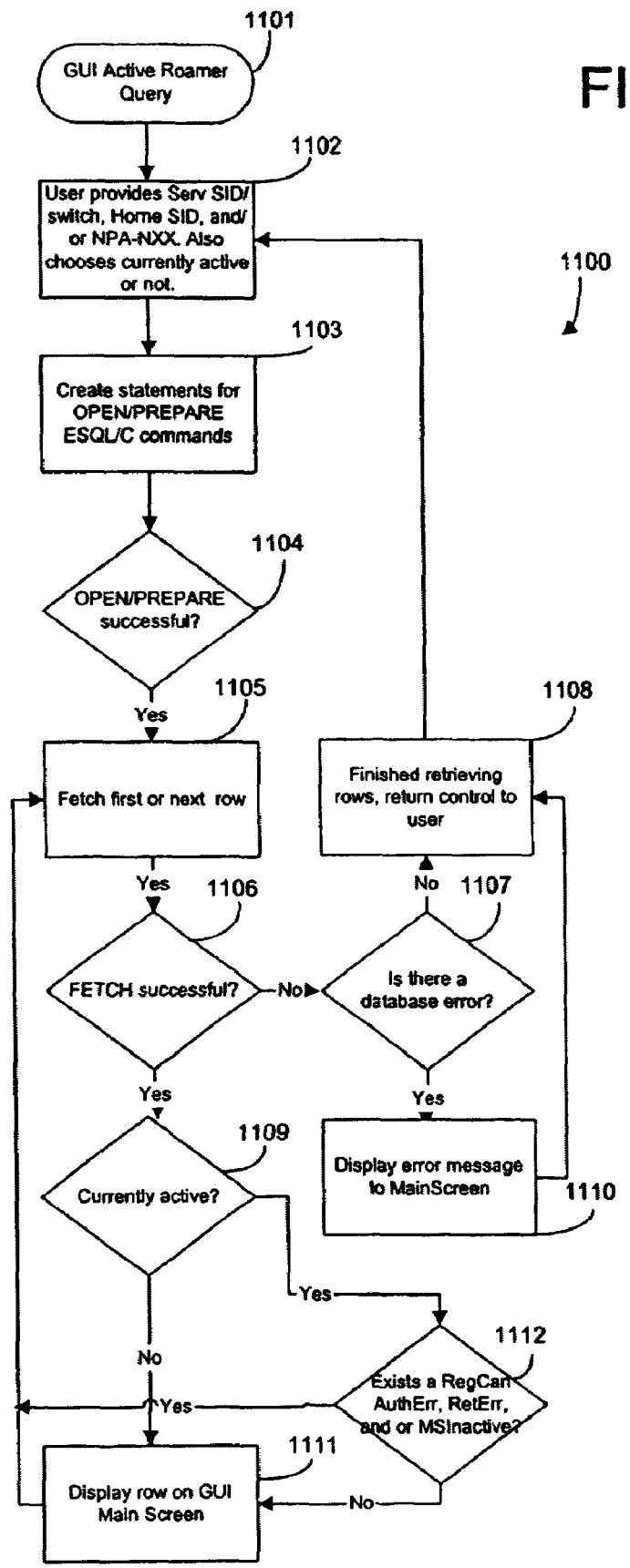
FIGS. 32A and 32B are flowcharts depicting processes of performing a roamer query.
Figure 32B:
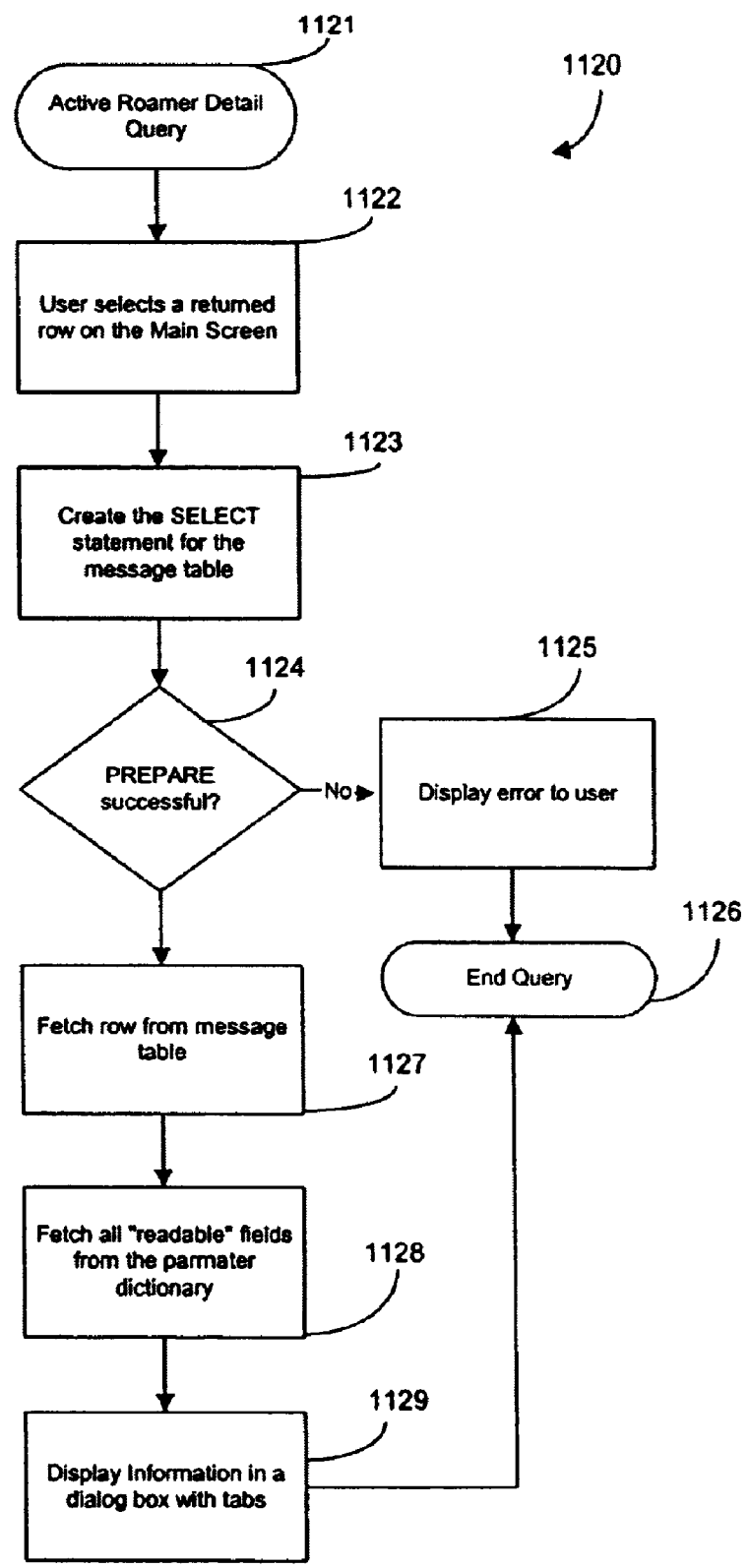

A process 1100 of performing an active roamer query will now be described with reference to FIGS. 32A and 32B. The active roamer query begins at 1101 and at 1102 the user enters the search parameters. The user, for instance, may provide the serving SID, switch, home SID, or NPA-NXX information and may also limit to currently registered or all registration messages. At 1103 the system 710 creates statements for OPEN/PREPARE ESQL/C commands and at 1104 determines whether the OPEN/PREPARE was successful. If it was successful, then at 1105 the first row is fetched and at 1106 the system 710 determines whether the FETCH was successful. If the FETCH was not successful, then the system 710 determines whether there was a database error at 1107 and, if there was, displays an error message to the user on the interface 760 at 1110. If there was no database error, then the system 710 at 1108 finishes retrieving rows and returns control to the user. If the FETCH was successful, then at 1109 the system 710 determines whether a registration cancellation, MSInactive, authorization denied, or error messages have been received at 1112. The current record is displayed at 1111 and the system 710 fetches the next row at 1105.

Figure 31B:
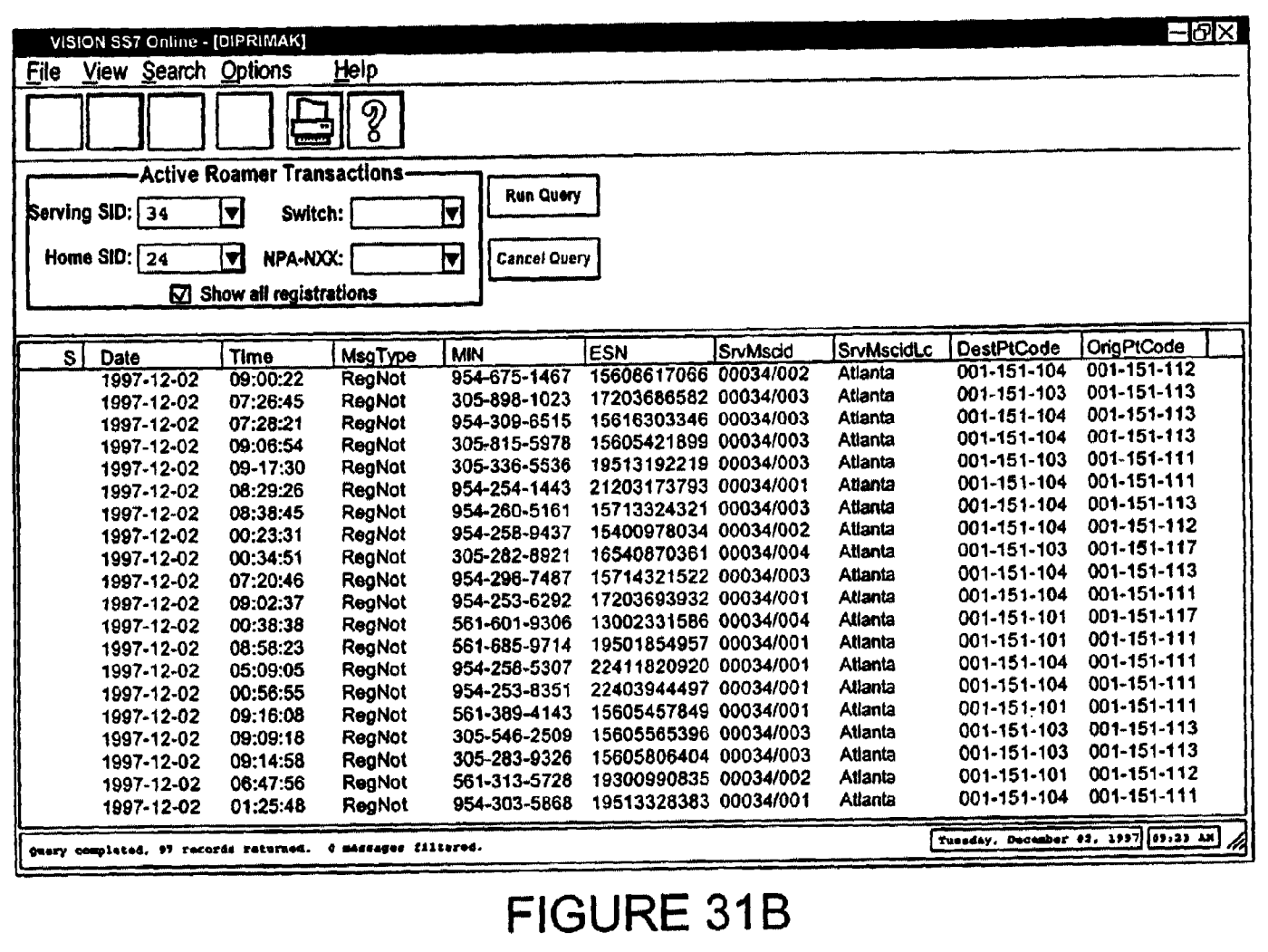

As with the search results from a MIN/ESN query, the results of the active roamer query will be displayed in the section 1270. An example of search results for an active roamer query is shown in FIG. 31B. In this example, the search was performed between serving SID 34 and home SID 24. Also, the search included all registrations. From the results of a search, the user may double click on any entry in order to receive all of the detailed information associated with that message.

A process 1120 by which the system 710 displays and retrieves this information for the user will now be described with reference to FIG. 32B. An active roamer detail query begins at 1121 and at 1122 the user selects a row from the main menu 1240. At 1123, the system 710 creates a SELECT statement for one of the message tables 806 or for the RegNot/QualReq table 720 and checks at 1124 whether the PREPARE was successful. If not, at 1125 the system 710 displays an error to the user and ends the query at 1126. If the PREPARE was successful, then at 1127 the system 710 fetches the record from the message table 806 or RegNot/QualReq table 720 and fetches all "readable" fields from the parameter dictionary at 1128. The system 710 then displays the information in a dialog box with tabs at 1129 and ends the query at 1126.

Switch-to-Switch Query

Figure 33A:
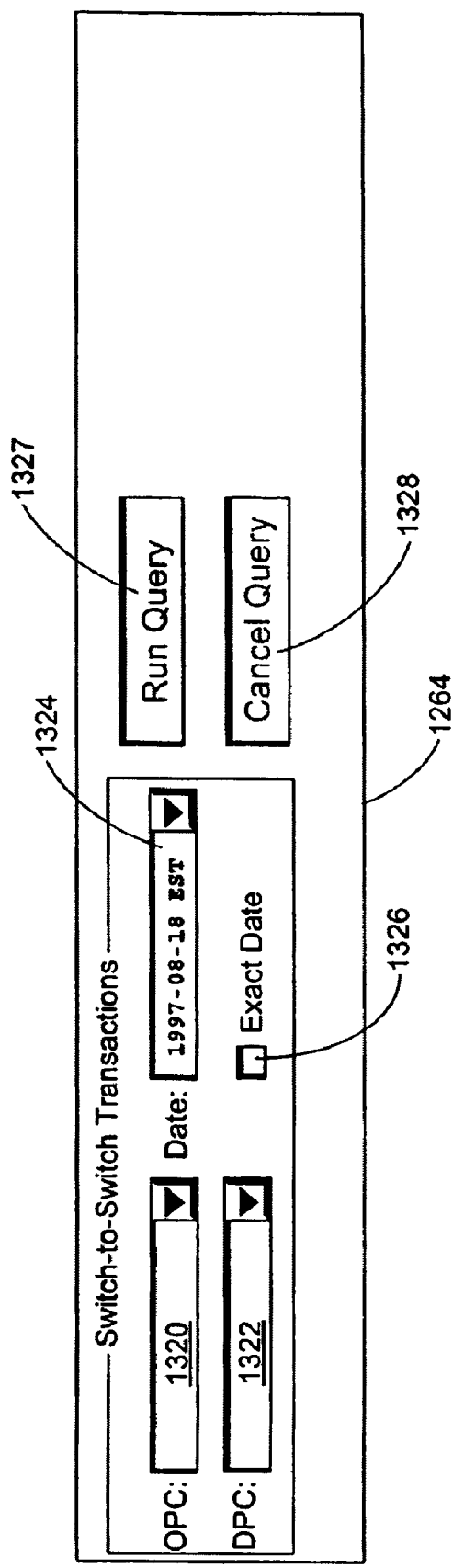

If the user selects the switch-to-switch icon 1243, then the header 1260 will display the switch-to-switch header, such as switch header 1264 as shown in FIG. 33A. The switch-to-switch query allows a user to search ANSI-41 messaging on one switch or between two switches. The header 1264 includes a field 1320 for the OPC, a field 1322 for the DPC, and a field 1324 for a date. The header 1264 also includes a field 1326 which allows a user to select either an exact date or a range of dates from the date indicated in field 1324 to the present date. The user selects a "Run Query" button 1327 to initiate a query and presses a "Cancel Query" button 1328 to end the query.

Figure 34A:
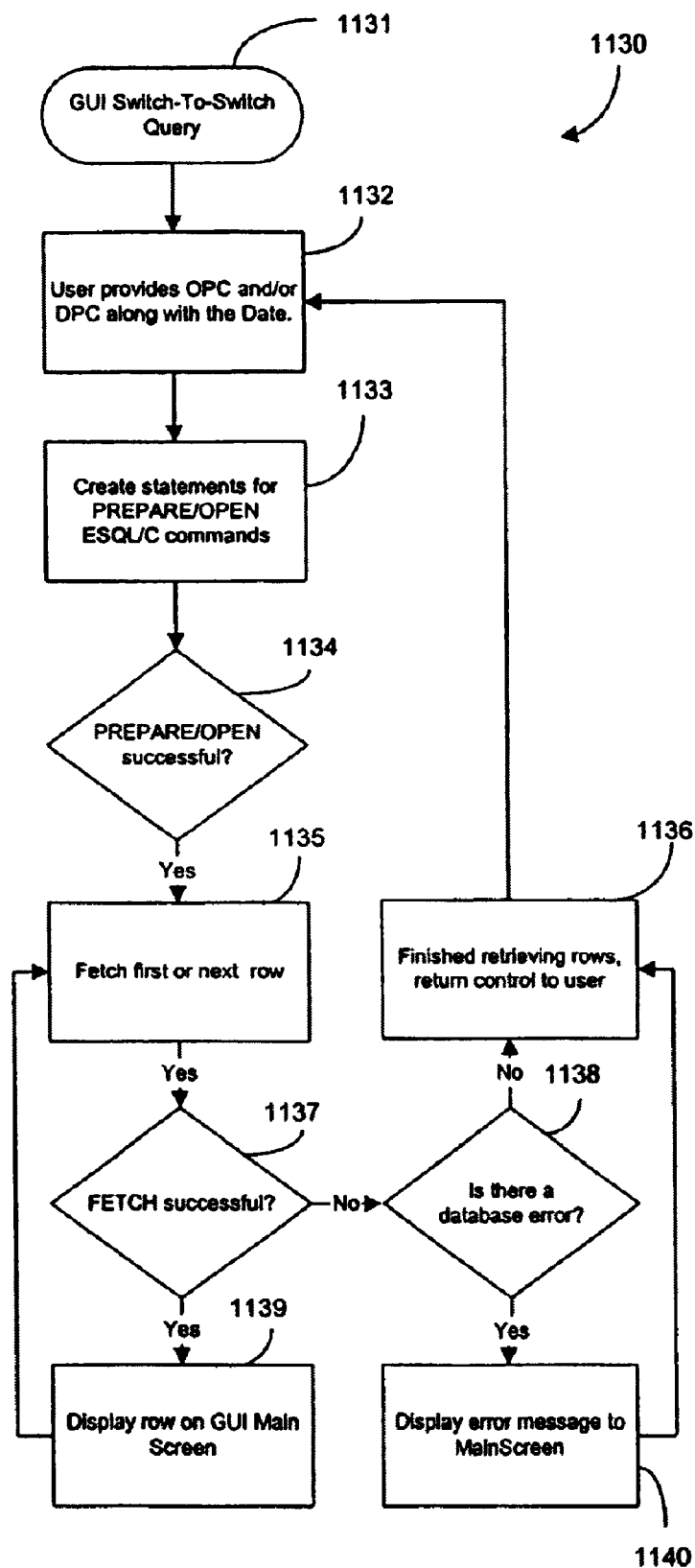
FIGS. 34A and 34B are flowcharts depicting processes of performing a switch-to-switch query.
Figure 34B:
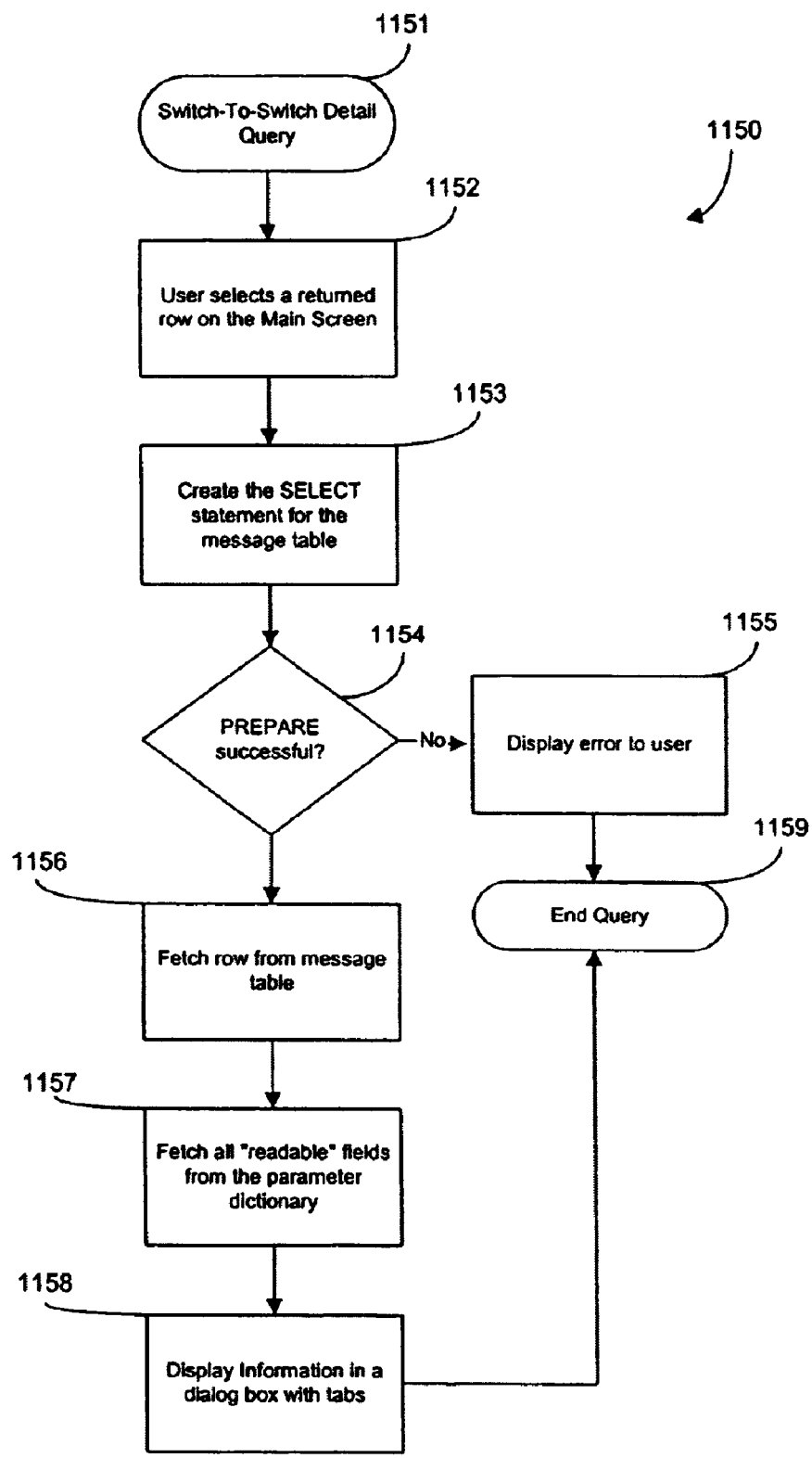

A process 1130 of performing a switch-to-switch query will now be described with reference to FIGS. 34A and 34B. A switch-to-switch query begins at 1131 and at 1132 the user provides the OPC and/or DPC along with a date. At 1133 the system 710 creates statements for PREPARE/OPEN ESQL/C commands and at 1134 determines whether the PREPARE/OPEN was successful. At 1135, the system 710 fetches the first row and at 1137 determines whether the FETCH was successful. If the FETCH was not successful, then at 1138 the system 710 checks whether there was a database error and, if there was, displays an error message to the interface 760 at 1140. If there was not a database error, then at 1136 the system 710 finishes retrieving the rows and returns control to the user. If the FETCH was successful, then at 1139 the system 710 displays the record on the main menu 1240 with the results section 1270. The system 710 then returns to FETCH the next row at 1135.

As with the MIN/ESN and active roamer queries, the user may double click on an entry in the results section 1270 to view a detailed record of all parameters in that message. An example of search results from a switch-to-switch query is shown in FIG. 33B. In this example, the search was performed between OPC 001-151-101 and DPC 001-151-126 from Dec. 2, 1997, to the present date, which was Dec. 2, 1997.

A process 1150 of performing a detailed switch-to-switch query begins at 1151 and at 1152 the user selects a record from the results section 1270. At 1153 the system 710 creates a SELECT statement for the corresponding message table 806 or RegNot/QualReq table 720 and at 1154 determines whether the PREPARE was successful. If it was not, then at 1155 the system 710 displays an error to the user and ends the query at 1159. If it was successful, then at 1156 the system 710 fetches all "readable" fields from the parameter dictionary at 1157 and displays the information in a dialog box with tabs at 1158.

Statistical Query

Figure 35A:
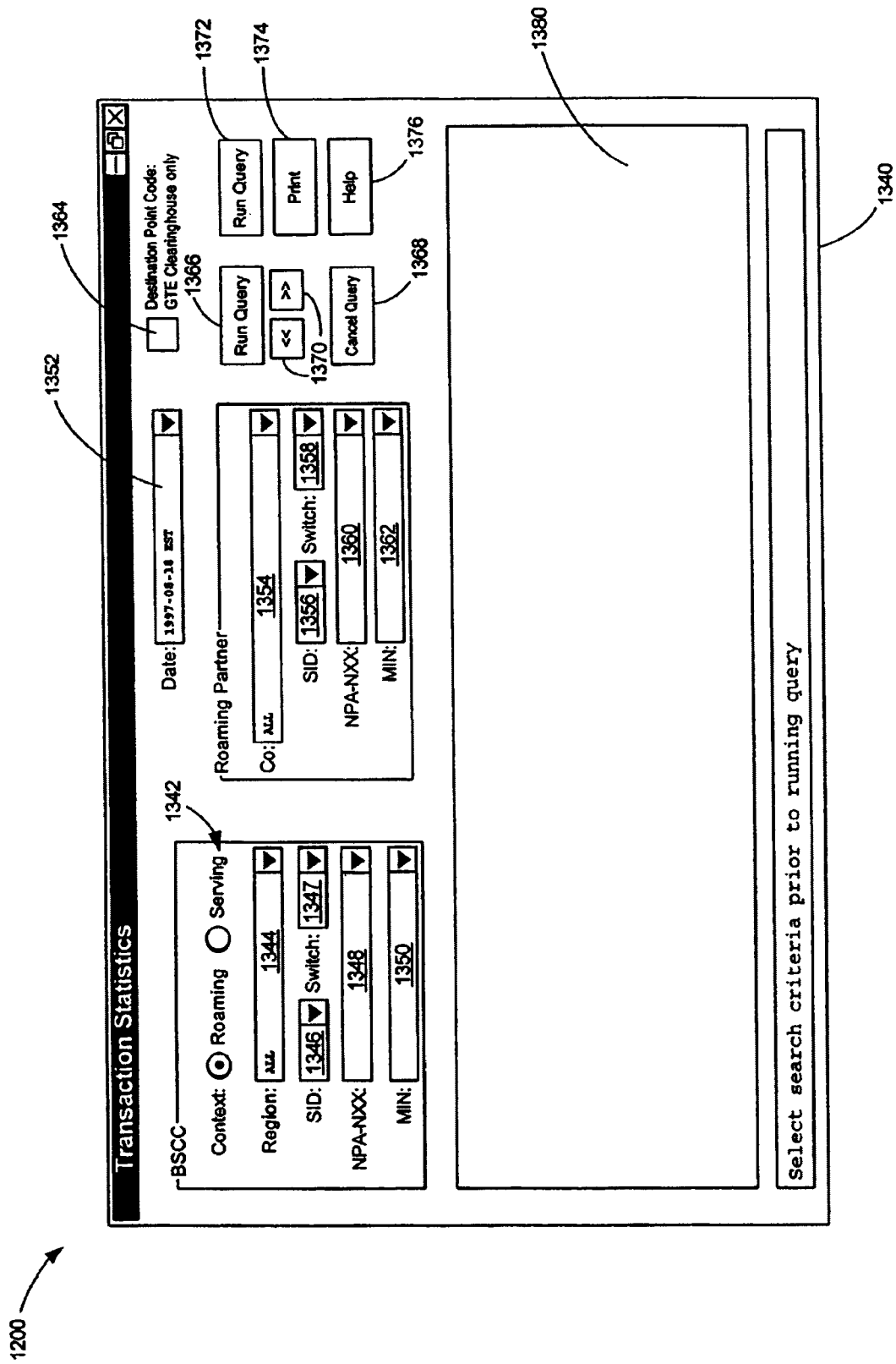

When the user selects the transaction statistics icon 1244, the GUI 1200 provides a transaction statistics window 1340. The transaction statistics queries provide information about registration notification and some qualification request messages between two cellular service providers. With reference to FIG. 35A, a transaction statistics window 1340 includes a section 1342 for selecting either information on "roaming" or information on "serving." The roaming information provides data on a service provider's own subscribers which are roaming in other networks whereas the serving information provides data on all customers within the home service providers network. In this example, the home network is shown as BellSouth Cellular Corporation ("BSCC"), although the invention may be used by any type of service provider.

The transaction statistics window 1340 also includes a field 1344 for a region within the home network, a field 1346 for a SID, a field 1347 for a switch, a field 1348 for the NPA-NXX, and a field 1350 for the MIN. On other service providers, the transaction statistics window 1340 includes a field 1354 for the company, a field 1356 for a SID, a field 1358 for a switch, a field 1360 for the NPA-NXX, and a field 1362 for the MIN. The transaction statistics window 1340 also includes a field 1364 for checking destination point codes only from the GTE Clearinghouse. When field 1364 is checked, the system 710 only shows messages sent to the GTE Clearinghouse destination switch. A "Run Query" button 1366 is used to initiate a query and a "Cancel Query" button 1368 is used to stop a query. A "Close" button 1372 allows the transaction statistics window 1340 to be closed, a "Print" button 1374 allows the results of a query to be printed, and a "Help" button 1376 provides on-line help. The results of a query are displayed in the results section 1380.

Figure 36:
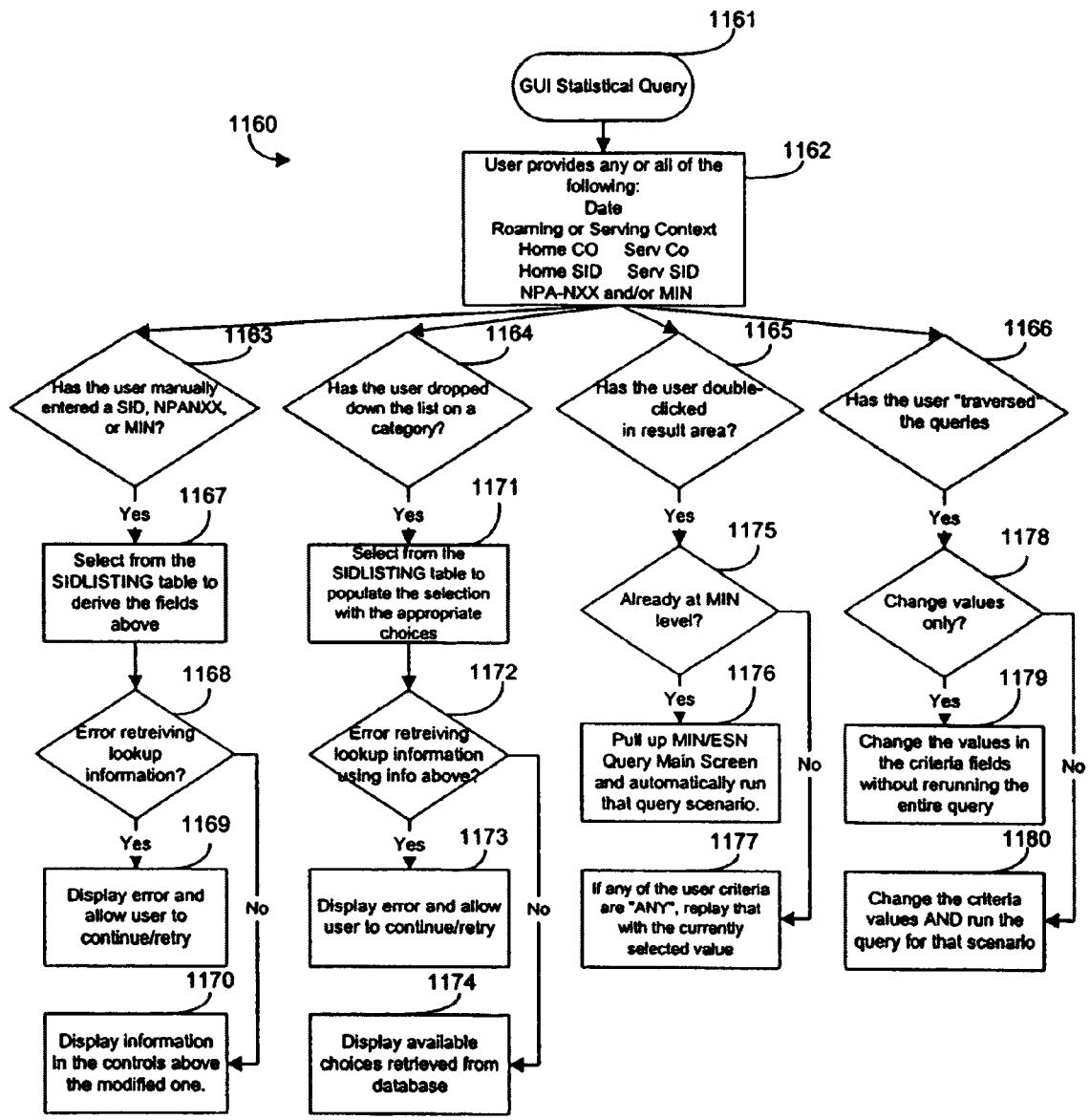
FIG. 36 is a flowchart depicting a process of performing a statistical query.
Figure 37:
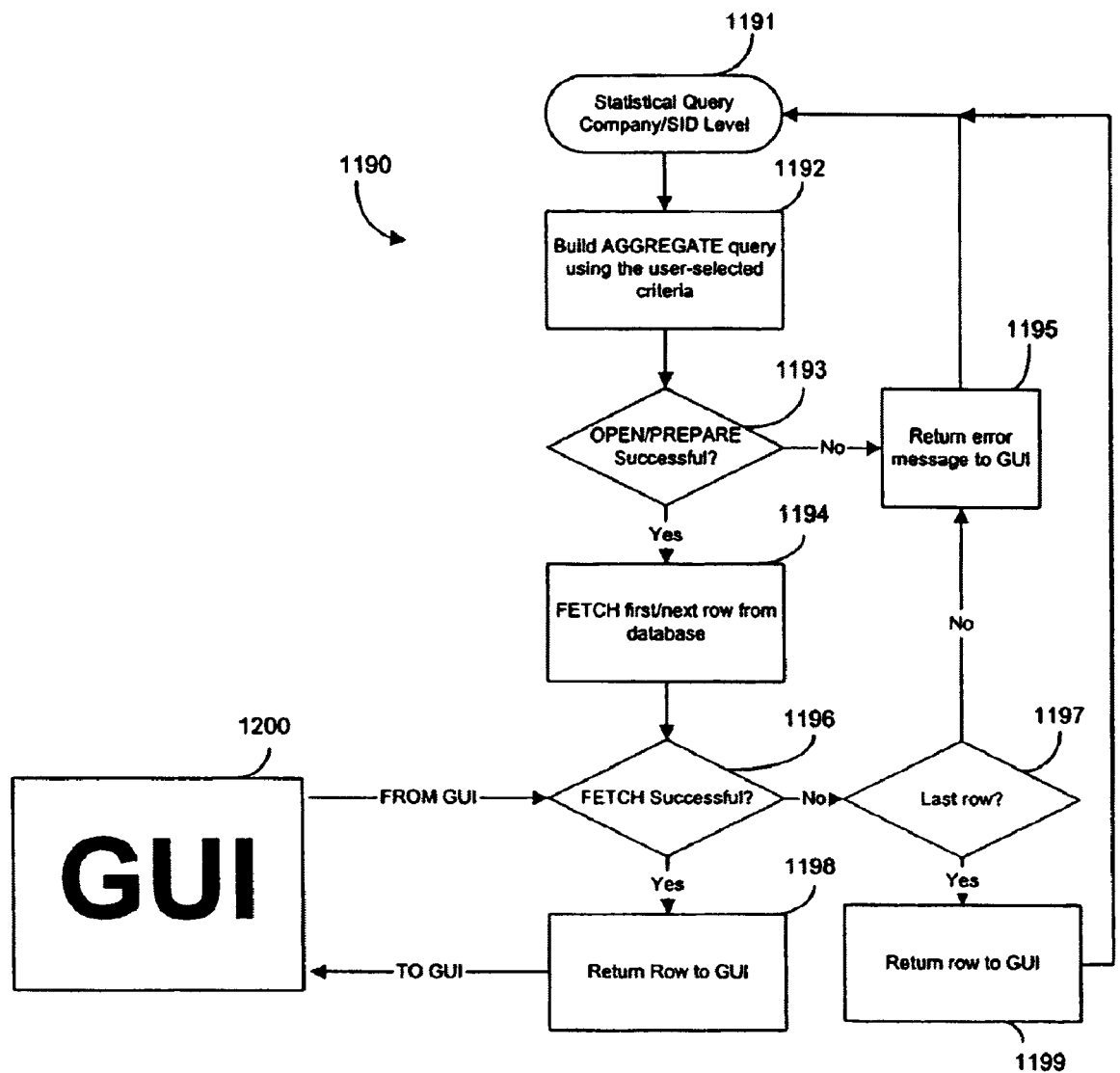
FIG. 37 is a flowchart depicting a process of performing a statistical query at a SID level.
Figure 38:
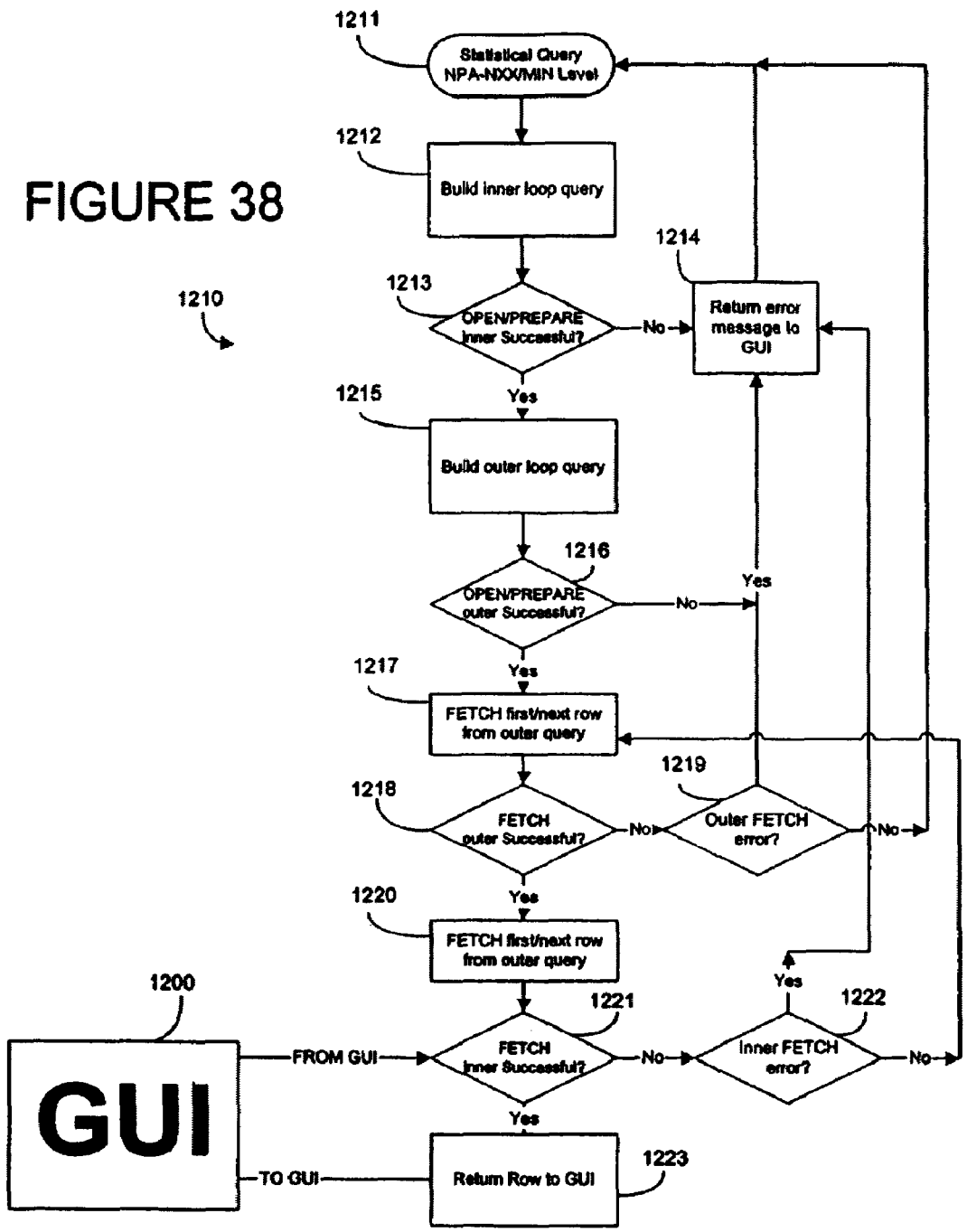
FIG. 38 is a flowchart depicting a process of performing a statistical query at an NPA-NXX/MIN level.

A process 1160 of performing a transaction statistics query will now be described with reference to FIGS. 36 to 38. A statistical query begins at 1161 and at 1162 the user provides information on the parameters for the query. The user may provide information on any one or any combination of the date, roaming or serving context, home company, serving company, home SID, serving SID, home switch, roaming switch, NPA-NXX, and MIN. The fields in the transaction statistics window 1340 are organized in an order from less specific to more specific. The user may search on a high level from a region to a company or may perform a detailed query on a specific MIN or NPA-NXX. These different levels of searching capability make it possible for the user to have a very broad or a very specific search, depending upon the needs of the user.

At 1163, the system 710 determines whether the user has manually entered a SID, NPA-NXX, or a MIN. If the user has, then at 1167 the system 710 populates the other fields by performing a look-up function in the sid_listing2 table 826. If there was an error in retrieving the look-up information, as determined at 1168, then the system 710 displays an error and allows the user to continue or retry the query at 1169. If there was no error, then at 1170 the system 710 displays the information in the fields above the one receiving information from a user. For instance, if the user enters a particular NPA-NXX, the system 710 performs a look-up in its sid_listing2 table 826 to determine what company or region serves that NPA-NXX and which SID is associated with that NPA-NXX. The system 710 then retrieves this information from the sid_listing2 table 826 and populate those fields with the data.

The user can also perform a look-up function and select an appropriate choice from a listing of available choices. For instance, at 1164 the system 710 determines whether the user has dropped down the list on a category, such as when the user selects the list for all companies in field 1354. At 1171, the system 710 performs a look-up function performs a look-up function in the sid_listing2 table 826 and populates the selection with the available choices. If an error occurs during the look-up, as determined at 1172, then an error is displayed and the user is allowed to continue or retry the query at 1173. If there was no error, then at 1174 the choices available to the user are displayed.

If the user double clicks in a result area, as determined at 1165, then the 710 determine whether the results are already at the MIN level. If the results are at the MIN level then at 1176 the system 710 pulls up the MIN/ESN query and automatically runs that query. If it is not at the MIN level, then at 1177 the system 710 performs a query with the currently selected value in the result area. For instance, if a query was first performed against all companies, the results section 1380 may contain records from a plurality of different companies. If the user then double clicks on a particular company within the results section 1380, the system 710 populates the field 1354 with the selected company, performs that query, and displays the results in the section 1380. Each time that a more detailed field is selected, the system 710 limits the query to the selected values and performs that query. If the MIN is selected in the results section 1380, however, the system 710 goes to the MIN/ESN query and performs that query with the selected MIN.

If the user has "traversed" the queries, as determined at 1166, then the system 710 next determines whether only the values have been changed at 1178. If only the values have been changed, then at 1179 the system 710 changes the values in the criteria fields without rerunning the entire query. On the other hand, when it is not just the values that are changed, the system 710 changes that criteria values and runs the query for that scenario at 1180.

A process 1190 of performing a company/SID level query will now be described with reference to FIG. 37. The process 1190 begins at 1191 and at 1192 the system 710 builds an AGGREGATE query using the user-selected criteria entered into the fields. At 1193 the system 710 performs an OPEN/PREPARE and determines whether it was successful. If not, the system 710 returns an error message to the GUI 1200 at 1195. If it was successful, then at 1194 the system 710 fetches the first row from the database and determines at 1196 whether the FETCH was successful. If it was successful, then at 1198 the system 710 returns the record to the GUI 1200. If the FETCH was unsuccessful, then at 1197 the system 710 determines whether it was the last row, and if it was, the system 710 returns the row to the GUI at 1199. If it was not the last row, then at 1195 the system 710 returns an error message to the GUI 1200.

A process 1210 of performing a statistical query at the NPA-NXX/MIN level will now be described with reference to FIG. 38. The process 1210 begins at 1211 and at 1212 the system 710 builds an "inner" loop query. The process 1210 involves both the use of "inner" and "outer" loops. The "inner" and "outer" loops are generic for the types of nested queries performed by the process 1210. For instance, a query for all NPA-NXXs roaming a particular serving company requires an outer loop for all NPA-NXXs but also an "inner" loop for all SIDs in that company. The registration notification messages do not contain the serving company information whereby the system 710 must perform a loop on just the SIDs.

At 1213 the system 710 performs a PREPARE for the inner loop and determines whether it was successful. If it was not, then at 1214 the system 710 returns an error message to the GUI 1200. If it was successful, then at 1215 the system 710 builds an outer loop query and at 1216 performs a PREPARE/OPEN and determines whether it was successful. If it was not, then the system 710 returns an error message to the GUI 1200 at 1214. If it was successful, then at 1217 the system 710 fetches the first row from the outer query and determines at 1218 whether the FETCH was successful. If it was not, the system 710 next determines whether it was an outer FETCH error at 1219 and returns an error message to the GUI 1200 at 1214 if it was an outer FETCH error.

If the outer FETCH was successful, then the process 1210 involves going through the inner loop based on the record fetched with the outer loop. With reference to FIG. 38, at 1220 the system 710 prepares an OPEN and FETCH for the first or next row from the outer query and determines at 1221 whether the inner FETCH was successful. If it was not, then at 1222 the system 710 determines whether it was an inner error and if it was, returns an error to the GUI 1200 at 1214. If the inner FETCH was successful, then at 1223 the fetched row which satisfies both the inner and outer loops is returned to the GUI 1200.

Figure 35C:
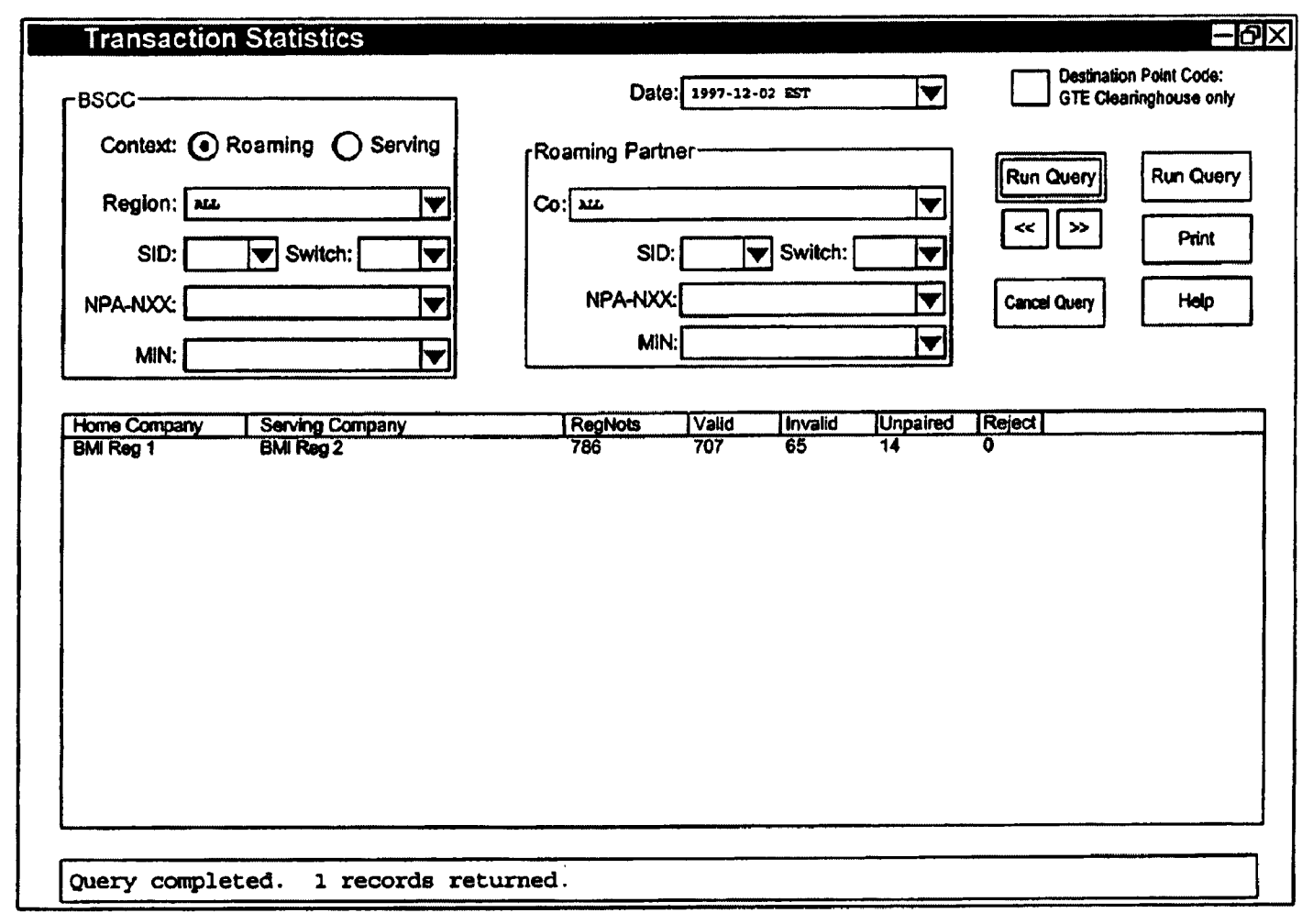
Figure 35D:
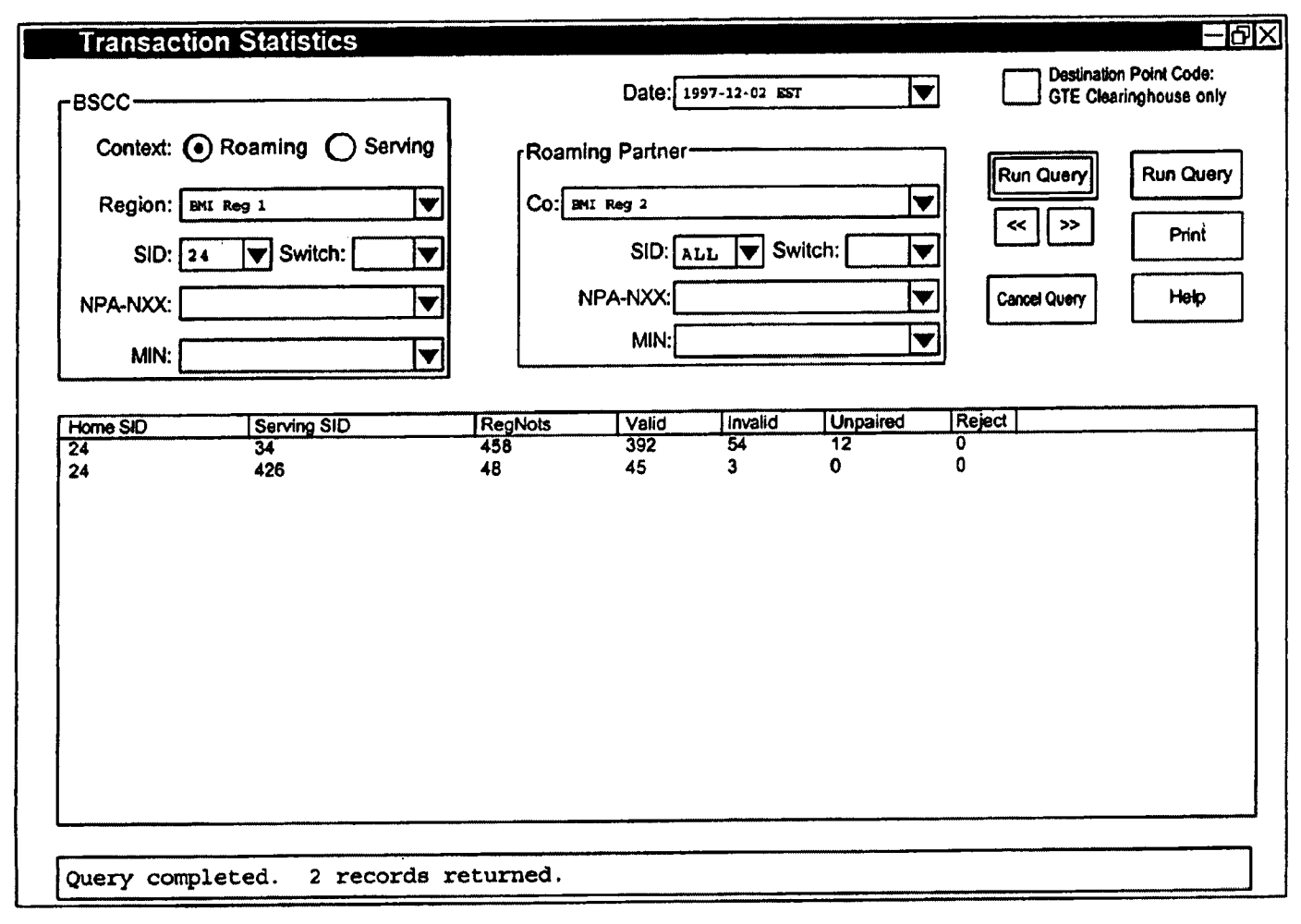
Figure 35E:
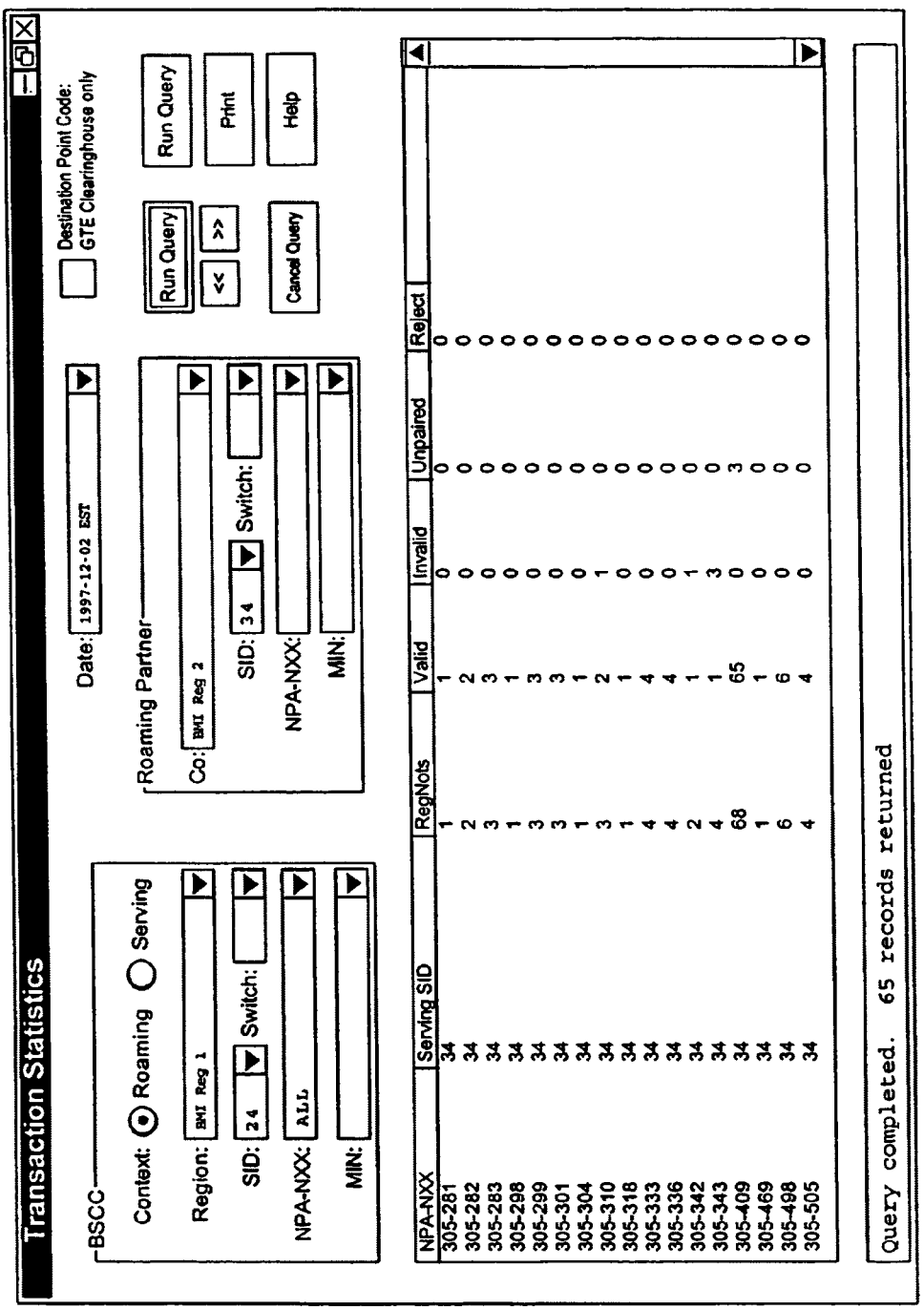
Figure 35F:
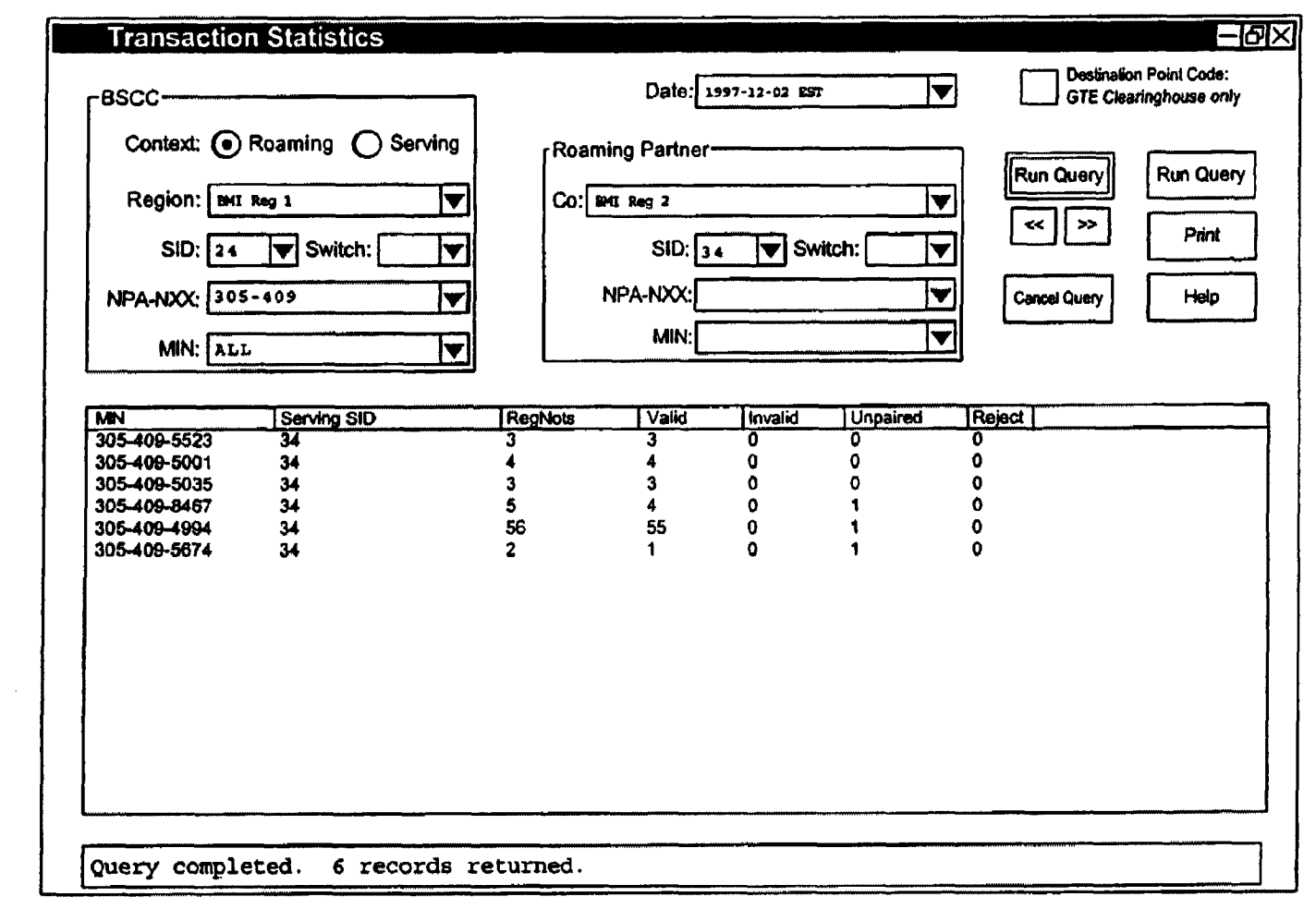

Some examples of transaction statistics queries are shown in FIGS. 35B to 35F. In the example shown in FIG. 35B, a query was performed on all subscribers roaming in all foreign markets. The column under "Home Company" lists all of the various regions within the BSCC and the column under "Serving Company" lists all of the companies serving BSCC subscribers. The results of this query also indicate all RegNots messages, and status of each message, such as whether it was valid, invalid, unpaired, or a reject. A user can drill down from the results shown in FIG. 35B and focus in all roaming subscribers of BellSouth Mobility Incorporated (BMI) in Region 1 which are roaming in BMI Region 2. The results of such a query are shown in FIG. 35C. The query may be even more limited, such as the query shown in 35D by restricting the query from home SID 24. An even more restricted search is shown in FIG. 35E in which the serving SID is limited to a particular value. As shown in FIG. 35F, the user can even drill down further by limiting the query to a particular NPA-NXX. Through the transaction statistics query, the user can therefore structure the query to a level of detail that is desired.

The entries in the results section of a transaction statistic query are preferably color coded. The reject records are preferably displayed as a red row in the results section to highlight these records to the viewer. Additionally, the unpaired records are preferably displayed in blue to separate these records from all other records.

Sample Records

Figure 39A:
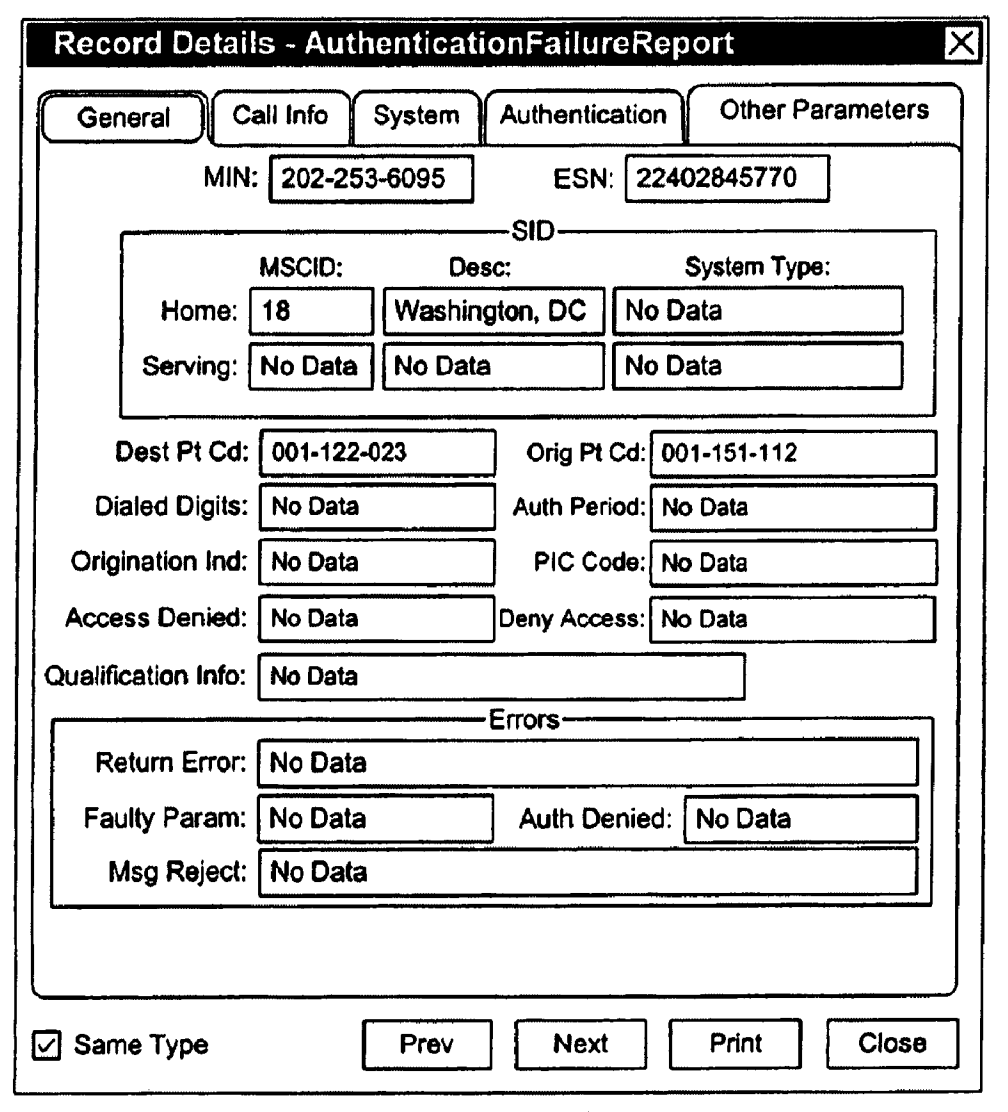
Figure 39B:
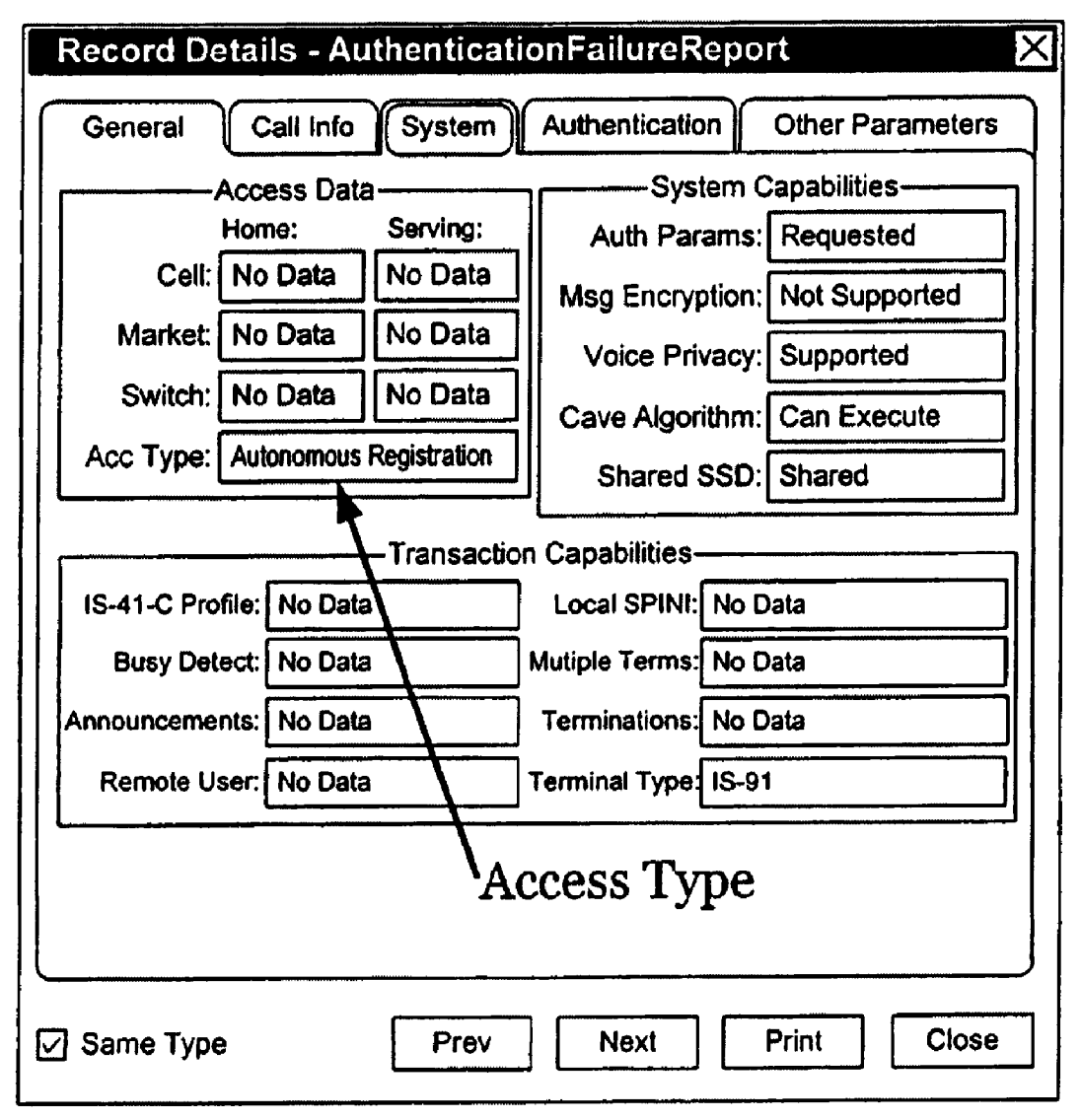
Figure 39C:
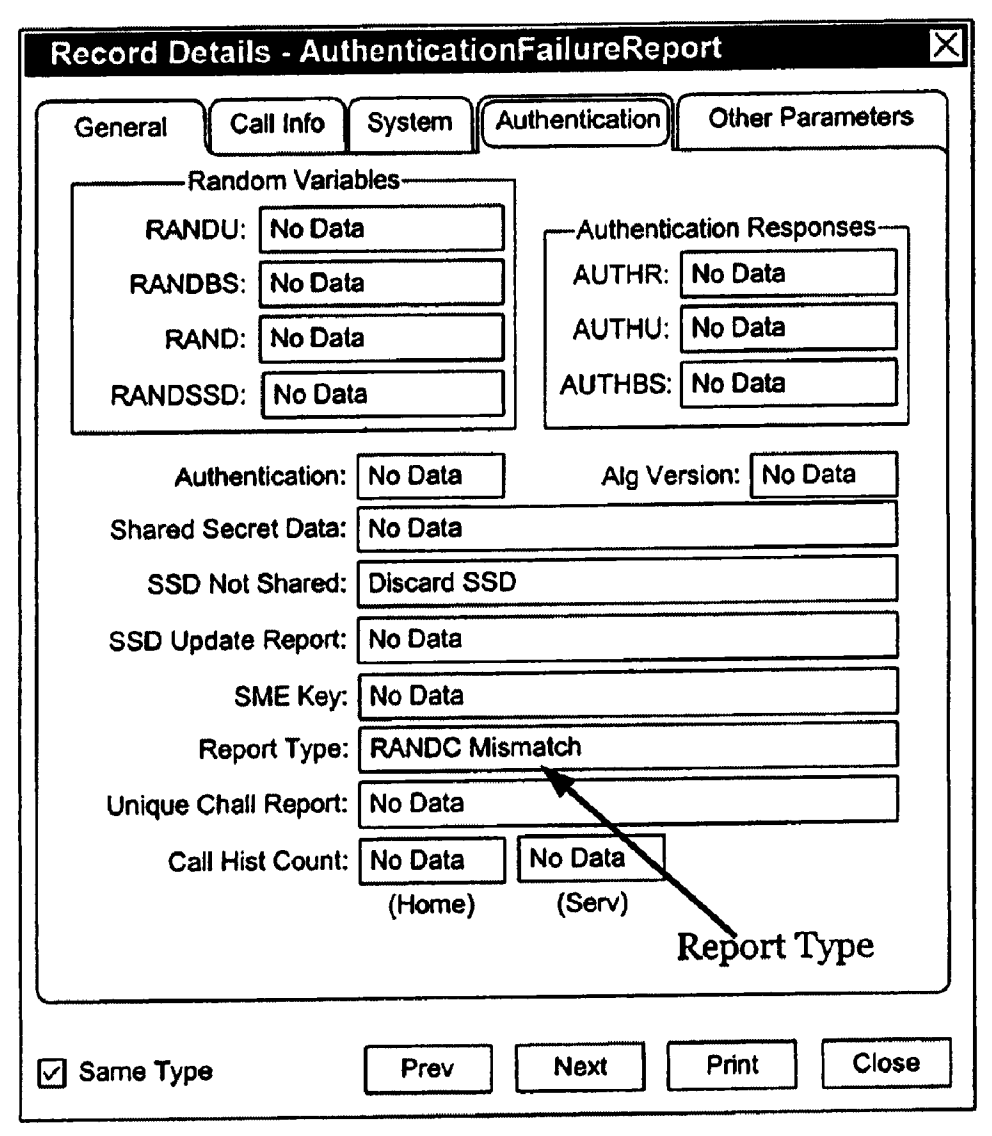

As discussed above, each message is displayed in a tabular format with each tab containing a set of parameters commonly grouped together. Some examples of various records are shown in FIGS. 39 through 41. The invention, of course, is not limited to these particular messages or even to this particular grouping of parameters but instead encompasses all message types. An example of the record details for an Authentication Failure Report is shown in FIGS. 39A to 39C. When the "General" tab is selected, the parameters of general interest are displayed to the user in the GUI shown in 39A. If the user selects the "System" tab, then the parameters disclosed in FIG. 39B may be displayed. Additionally, the user may select the "Authentication" tab to receive the authentication data shown in FIG. 39C. In the example shown in FIG. 39C, the Authentication Failure Report message indicates a report type of an RANDC mismatch.

Customer service, technical support, or engineering support can rely on the data within a record detail to quickly and easily identify a problem that a particular customer may be encountering. The system 710 provides a quick and easy method of identifying the source of a problem and does not require the service provide to put any type of "sniffer" at a switch. Moreover, the messages are stored on a daily basis and are kept for preferably one week whereby personnel can query to obtain information on past events.

Figure 40A:
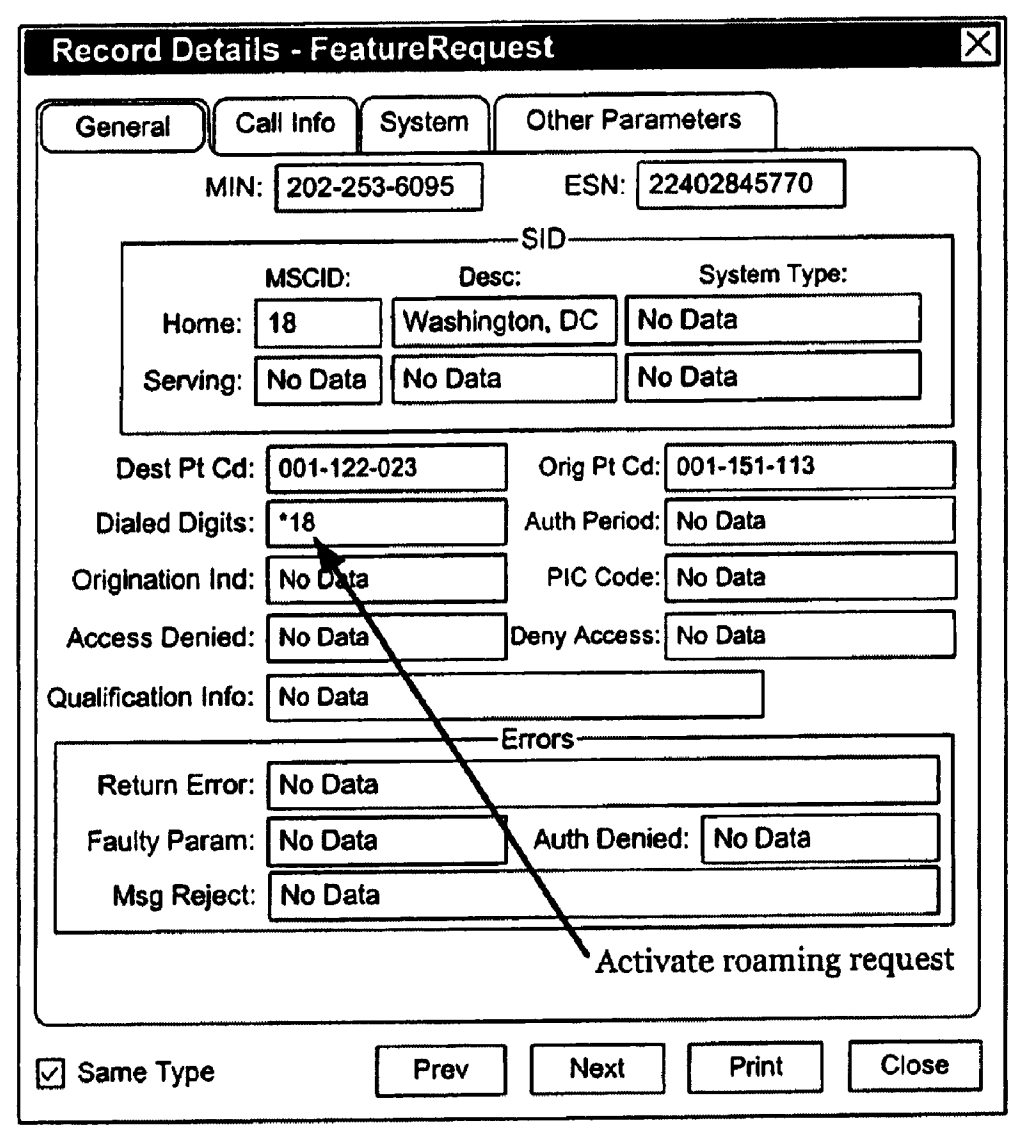
Figure 40B:
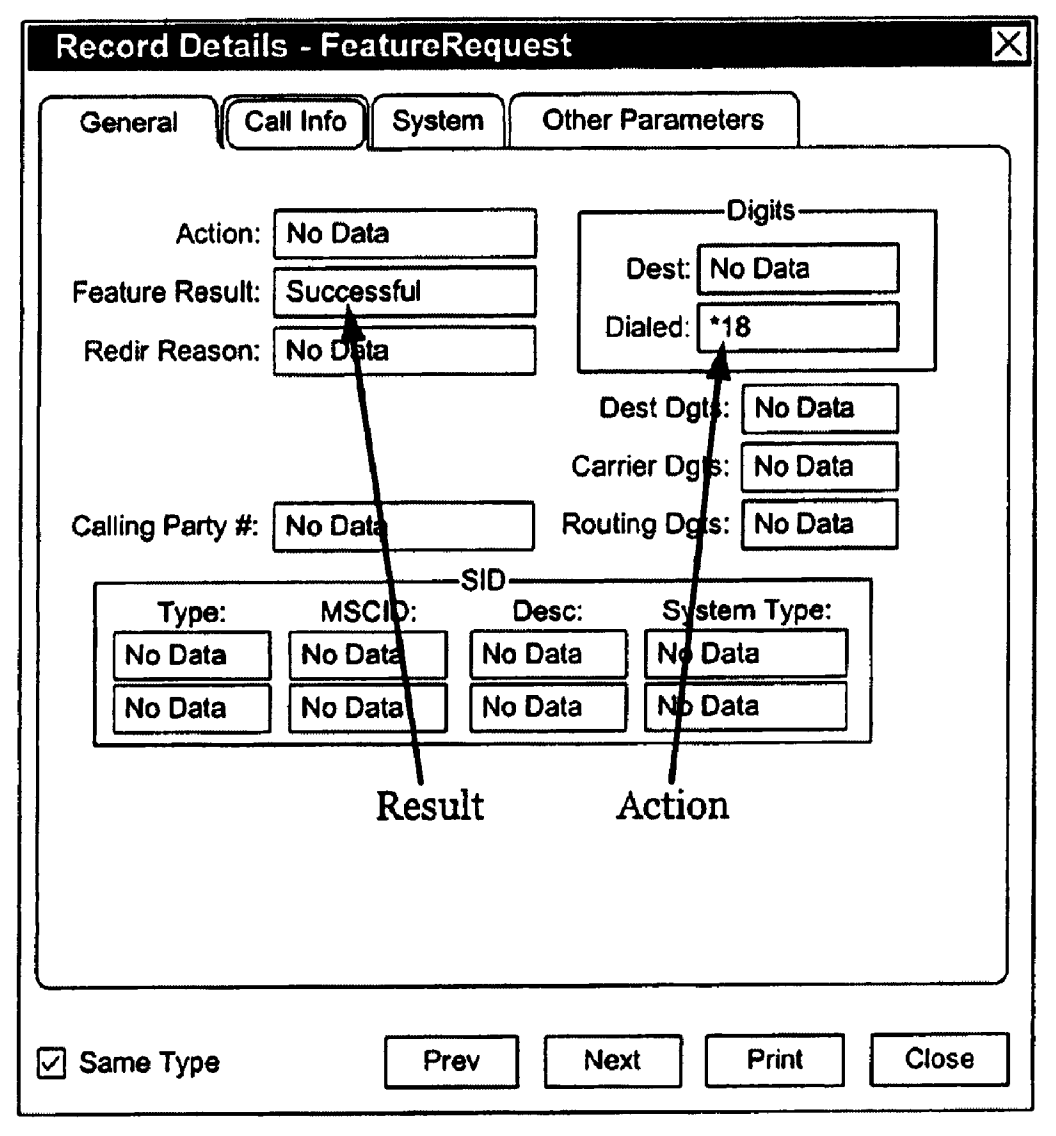

Another example of a record detail is shown in FIGS. 40A and 40B. In this example, the message is a Feature Request message and shows the "General" parameters in FIG. 40A. As shown in the "Dialed Digits" field, the digits of "*18" were entered in order to activate a roaming request. As shown in FIG. 40B, the "Call Info" tab reveals that the "Feature Result" was "Successful."

The data contained within the system 710 and available to the user can be used for a multitude of purposes. Customer service, for instance, can determine that a particular user was able to activate a roaming request feature request and that it was successfully received.

Figure 41B:
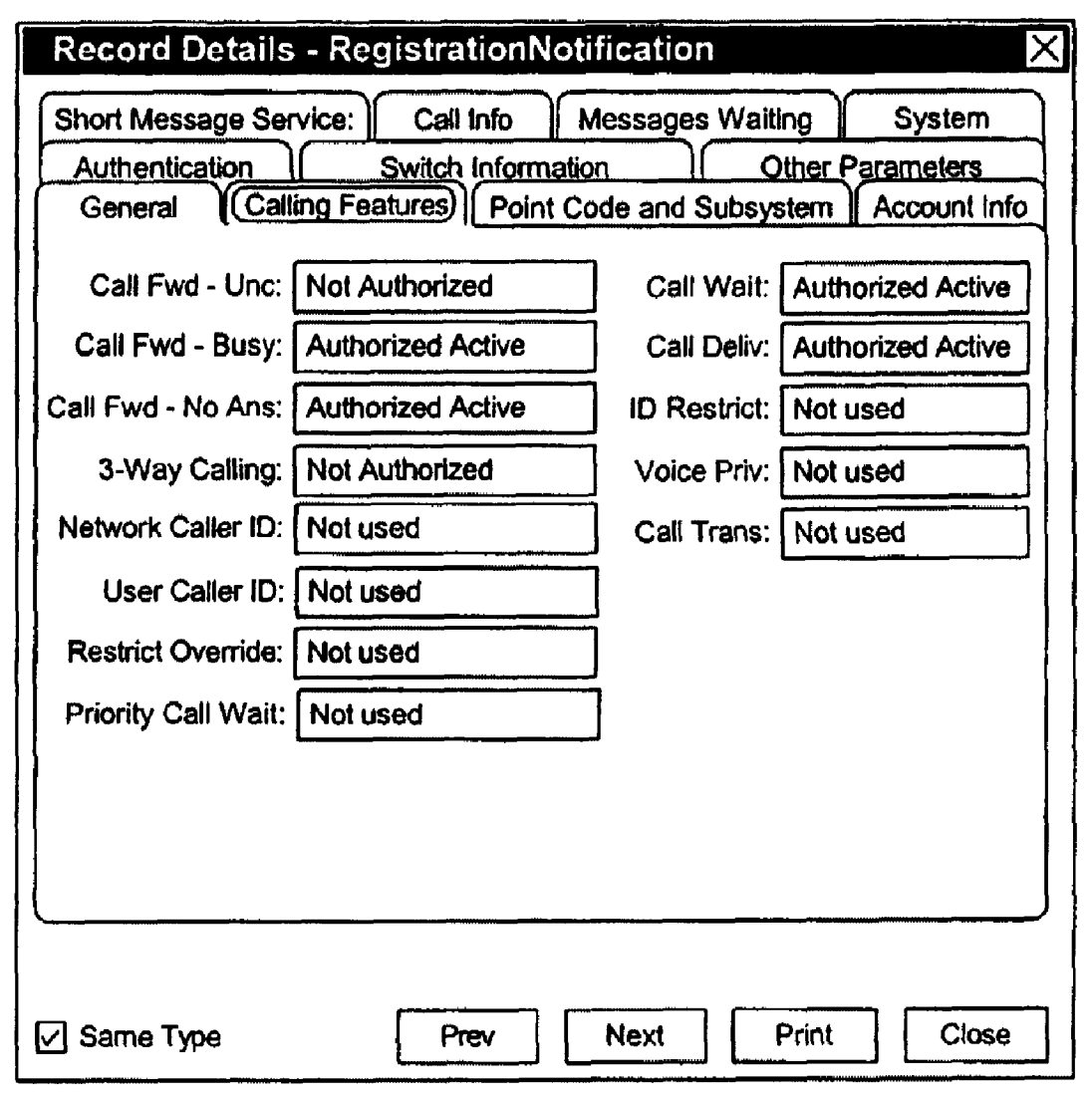

An example of the record details for a Registration Notification message is shown in FIGS. 41A and 41B. The "General" parameters of the Registration Notification message are shown in FIG. 41A and includes such things as the MIN, ESN, home SID, serving SID, and the OPC and DPC. The "Calling Features" tab displays parameters indicating which features a particular user may have available. As shown in the example depicted in FIG. 41B, the calling features include such features as call waiting, call delivery, three-way calling, call forwarding, and priority call waiting. By viewing the record details, the features available to a particular subscriber can be easily ascertained, which can be extremely useful. For instance, customer support can quickly determine whether a subscriber who is having trouble with three-way calling is authorized for such a feature. The service provider therefore would not waste time and effort in ensuring proper operation of the service provider's network and the subscriber's phone.

Preferences

Figure 42A:
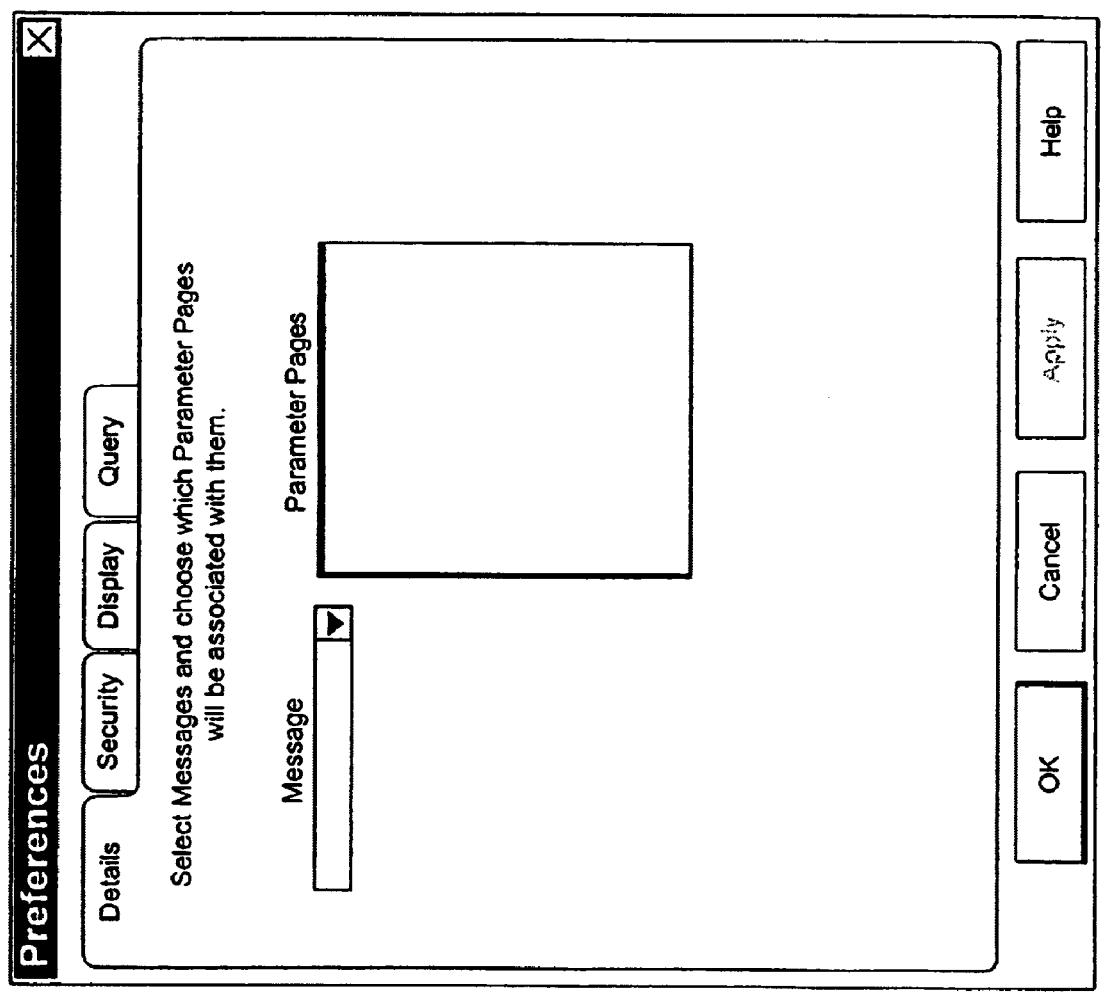
FIGS. 42A to 42D are GUIs showing preferences that may be set by a user.
Figure 42B:
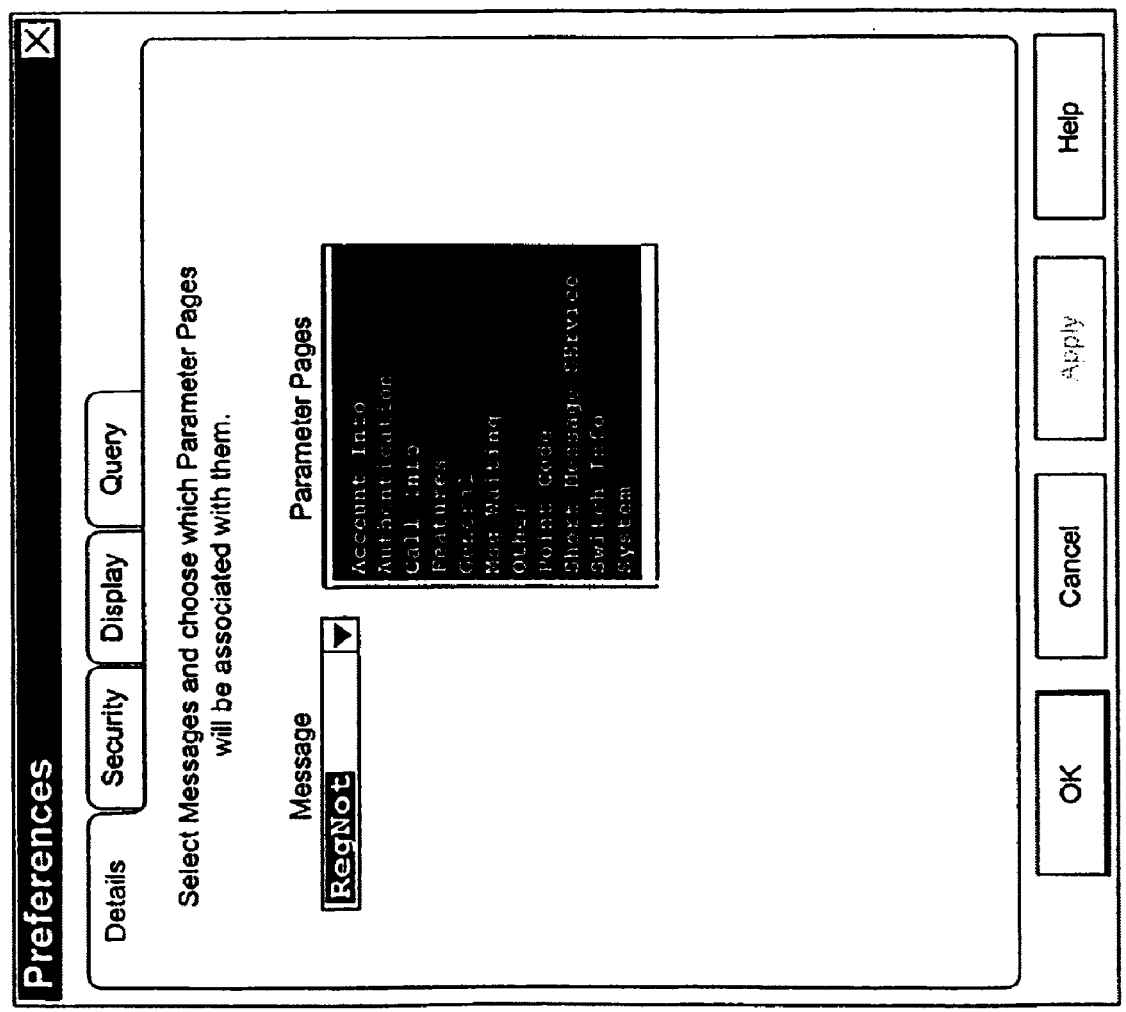
Figure 42C:
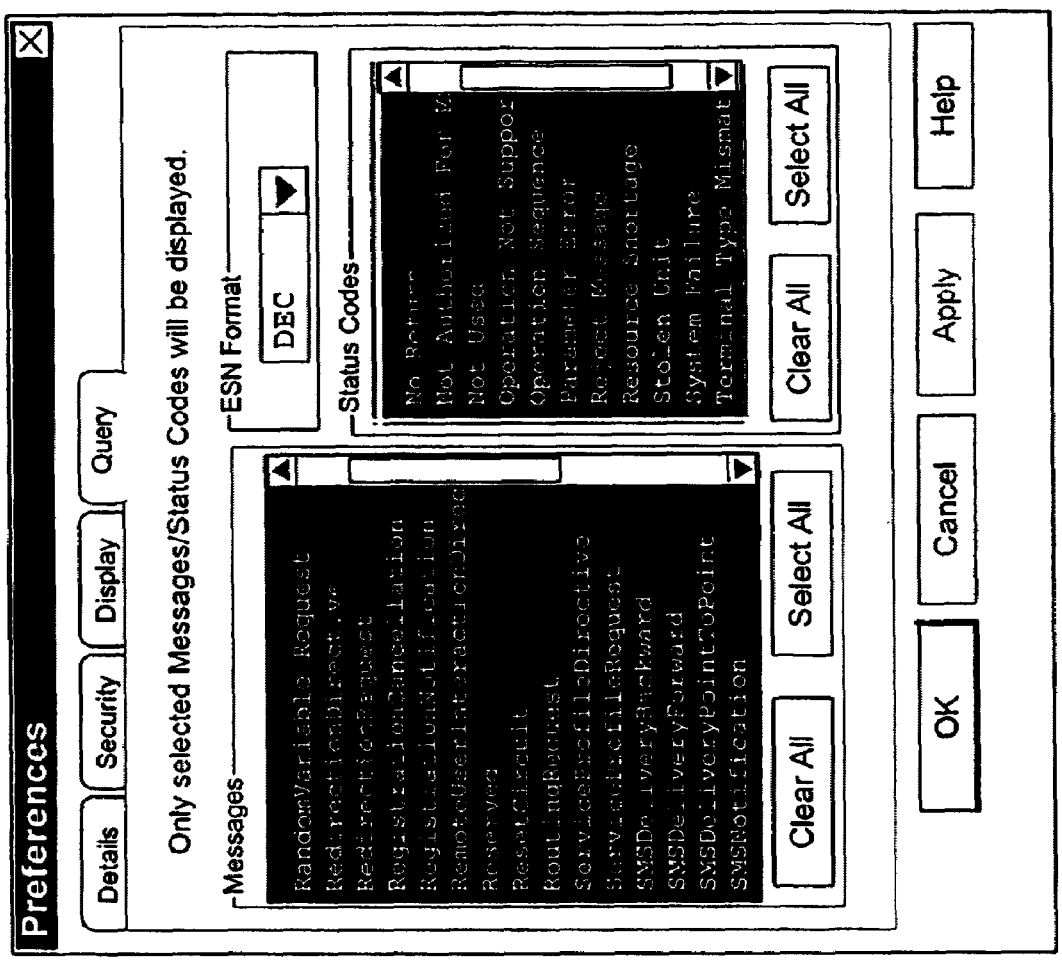

The system 710 also allows a user to customize the system 710 for that particular user. For instance, as shown in FIG. 42A, a user may select messages and chose which parameter pages will be associated with them. A user therefore may be able to customize the system 710 so that only the "General" parameters are displayed or any other tab 1292 or set of tabs 1292. In an example shown in FIG. 42B, the message of a Registration Notification is selected and its associated parameter pages are listed. The user can then select which one of these parameter pages should be displayed during use of the system 710. The user can customize the system 710 even further by selecting only certain messages or status codes. With reference to FIG. 42C, the user can select only certain messages and can also select only certain status codes. The system 710 will thereafter show only the selected messages to the user and only the selected status codes.

As a further option available to the user, the user can select the format for displaying the ESN. The user, for instance, can select the decimal format "DEC" shown in FIG. 42C or may select to view the ESN in a HEX format.

Figure 42D:
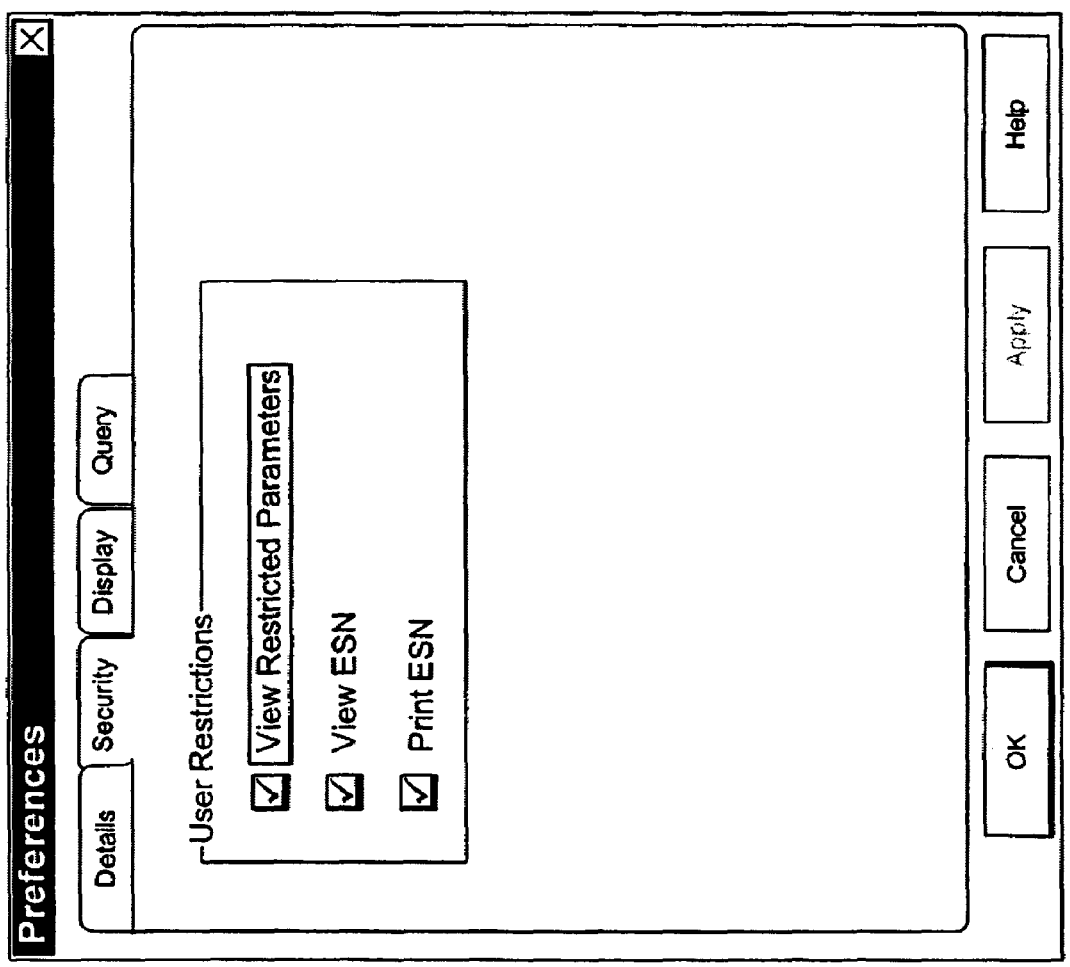

With reference to FIG. 42D, the user also has the ability to customize the security of the system 710. The user can, for instance, place user restrictions on the parameters that are viewed, whether the ESN can be viewed, or whether the ESN can be printed. Consequently, some users may restricted from viewing parameters. With regard to the ESN, some users may be able to view the ESN on the screen but may be unable to print the ESN.

Database

In the preferred embodiment, the space on the databases is conserved by coding information. For instance, rather than identifying a message as a "Registration Notification," the message is stored as a message ID number of "13." The system 710 then performs a look-up into a message dictionary table which correlates the message ID number to the message name. Thus, when displaying information on message "13," the system 710 reads the ID of "13" from the message table, performs a look-up into the message dictionary table, and displays the message as a "registration notification." As discussed above, other information concerning the message is also stored in a coded or abbreviated manner. The home company, SID, and switch, for instance, are all determined by a look-up function with the sid_listing2 table and are not stored in one of the message tables 806.

The system 710 also provides the user with a greater amount of control over a query. The system 710, for instance, does not wait until all results from a query are obtained before displaying them on the screen. Instead, each row or record is displayed after it has been successfully fetched. The user therefore is able to view the records as they are being retrieved and is not forced to wait a significant amount of time before the complete set of results is displayed. The system 710 also provides the user with an opportunity to cancel the query after it has been initiated. This ability to cancel a query is advantageous since some queries may require a significant amount of processing time before all of the results can be displayed. Consequently, if a user accidentally enters the wrong query, the user can cancel this query in progress and need not wait for the query to be completed.

The system 710 also holds the results of one query while a second query is being performed. After a user performs any one of a MIN/ESN query, active roamer query, or switch-to-switch query, the results of the search are displayed in the results section. The user can then perform a different one of the MIN/ESN query, active roamer query, or switch-to-switch query and the results are once again be displayed in the results section. The results from the first query, however, are not lost but instead a user can recall these results into the results section by once again selecting the icon for the first type of query. The user can then toggle between the two search results with the results being shown in the same results section of the display. In other words, the system 710 does not open a new window but instead maintains the data for the separate queries within the same window.

On-line Help

The system 710 has a standards file for use with on-line help. A customer can right-click on an entry and obtain a definition for a particular entry. This information is obtained directly from the standard itself, such as from ANSI-41 and is therefore an accurate definition of the entry.

Updating Information

The system 710 is able to monitor the SS7 network 701 and upgrade itself when changes to the network 710 occur. The system 710, as discussed above, includes the sid_listing2 table 826 that correlates certain parameters to company and SID information. When the system 710 detects a new OPC or DPC within a SID, this entry is added to the sid_listing2 table 826. The system 710 also monitors and logs any new companies or SIDs. By monitoring these log files and error files, the system 710 can be upgrade with the most current information.

The forgoing description of the preferred embodiments of the invention has been presented only for the purpose of illustration and description and is not intended to be exhaustive or to limit the invention to the precise forms disclosed. Many modifications and variations are possible in light of the above teaching.

For example, the invention has been described with ANSI-41 messaging in an SS7 network 701. The invention is not limited to any particular revision of ANSI-41 but encompasses all data signaling that occurs over the SS7 network 701. Furthermore, the invention may be suited to data signaling within other types of communications networks. Some examples of these other types of communications networks include frame relay and ATM networks.

The invention moreover is not limited to these specific queries but instead encompasses other queries. Since the system 710 stores the messages and parameters associated with these messages, the system 710 can return results on any message type of any parameter contained within a message. Thus, for example, some queries may be directed solely to billing parameters associated with one or more of the parameters.

Other queries may be useful in testing and developing new technologies that employ a SS7 network 701. For example, in the development of Cellemetry ®, which includes the transmission of data over the control channels in a cellular network, the system 710 could be useful in ensuring proper transmission of the data and in monitoring the data. Queries could be structured to focus in on only those messages or even parameters of interest, such as only registration messages or feature request messages.

The embodiments were chosen and described in order to explain the principles of the invention and their practical application so as to enable others skilled in the art to utilize the invention and various embodiments and with various modifications as are suited to the particular use contemplated.

What is claimed is:

1. A system for use with a communications network carrying at least signaling information, the system for use in monitoring the signaling information and comprising:
   a catcher for receiving messages and for storing the messages in a file with a database;
   a plurality of message tables; and
   a parser for receiving the messages from the catcher and for storing the messages in the plurality of message tables with messages of different types being stored in different message tables;
   wherein the parser additionally separates each message into its constituent parameters and stores the parameters into fields in its respective message table,
   wherein the messages form part of the data signaling information in the communications network and being captured from the communications network, and
   wherein the messages include initiating messages and return messages sent in response to the initiating messages, each initiating and its corresponding return message forming a message set; and wherein the messages received by the parser are messages provided by the catcher.

2. The system of claim 1, wherein the communications network comprises a wireless communications network.

3. The system of claim 1, wherein the catcher receives messages that comprise data signaling between switches in the communications network.

4. The system of claim 1, wherein the catcher is for receiving messages that comprise ANSI-41 messages and the communications network comprises an SS7 network.

5. The system of claim 1, wherein the catcher stores all registration messages in a first file, all reject messages in a second file, and all other messages in a third file.

6. The system of claim 1, further including a plurality of daily files and wherein the catcher stores the messages for each day in a separate one of the daily files.

7. The system of claim 1, further comprising an update statistics object for receiving the messages stored in the file and for maintaining statistics in a statistics file.

8. The system of claim 7, wherein the update statistics object receives all registration related messages.

9. The system of claim 7, wherein the update statistics object determines whether the message is valid or invalid.

10. The system of claim 7, wherein the update statistics object determines whether the message is a reject.

11. The system of claim 1, further including a customer object for receiving the messages and for maintaining current information on each customer.

12. The system of claim 11, wherein the customer object comprises a MIN object for maintaining current information on each MIN encountered in the data signaling.

13. The system of claim 12, wherein the MIN object maintains current registration information on each MIN.

14. The system of claim 1, further comprising a user interface for querying the parser for roaming information on a particular individual.

15. The system of claim 1, further comprising a user interface for querying the parser for information on roamers within a serving market.

16. The system of claim 1, further comprising a user interface for querying the parser for information on messaging at one switch.

17. The system of claim 1, further comprising a user interface for querying the parser for information on messaging between two switches.

18. The system of claim 1, further comprising a user interface for querying the parser for information on customers roaming in a foreign network.

19. The system of claim 1, further comprising a user interface for querying the parser for information on all customers within a home network.

20. The system of claim 1, further comprising a user interface for querying the parser for information on statistics on the messages.

21. The system of claim 20, wherein the statistics indicate whether a message is valid, invalid, unpaired, or a reject.

22. The system of claim 1, further comprising a data capture device for obtaining the messages from the communications network and for transmitting the messages to the catcher.

23. The system of claim 22, wherein the data capture device receives the messages from at least one STP.

24. The system of claim 22, wherein the data capture device comprises a link capture device for receiving the messages from an SS7 link.

25. The system of claim 1, wherein the messages are stored by the catcher over a first interval of time.

26. The system of claim 1, wherein the messages are stored by the catcher on a periodic basis.

27. The system of claim 26, wherein the periodic basis is a daily basis.

28. A system for monitoring wireless telecommunications system messages traveling through a wireless telecommunications network, comprising:
  a data capture device coupled to the wireless telecommunications network for receiving wireless telecommunications messages;
  the wireless telecommunications messages forming pairs of messages with each pair of messages including an initiating message and a corresponding return message; and
  a message processor for:
    storing in a memory location, wireless telecommunications messages that comprise initiating messages;
    collating each return message with its corresponding initiating message by searching the memory location for a previously stored initiating message within the wireless telecommunications messages which is related to the return message;
    forming collated messages from each return message and previously stored initiating message; and
    providing access to the collated messages to an end-user.

29. A method for generating wireless telecommunications system data for use by a wireless telecommunications service provider, comprising;
  receiving wireless telecommunications messages traveling over a wireless telecommunications network;
  the wireless telecommunications messages forming pairs of messages with each pair of messages including an initiating message and a corresponding return message;
  storing initiating messages within the wireless telecommunications messages in a memory location;
  for each received return message within the wireless telecommunications messages:
  searching the memory location for a previously stored initiating message related to the received message; and
  if any initiating message located in the search is related to the return message, collating the return message with the initiating message to form collated messages; and
  providing the collated messages to an end-user.

30. A method of furnishing wireless telecommunications data, comprising:
  obtaining telecommunications signals from a wireless telecommunications network, the signals containing messages pertaining to wireless telecommunications;
  identifying messages pertaining to wireless telecommunications present in the signals;
  selecting identified messages belonging to a preselected set of message types of interest;
  parsing the identified messages into their constituent message parameters;
  storing the identified messages along with their constituent message parameters into message tables; and
  providing at least one of: a) a stored message and b) a constituent message parameter to the administrative instrumentality.

31. A method of generating wireless telecommunications data, comprising:
  monitoring a plurality of links within a wireless telecommunications network carrying wireless telecommunications messages;
  capturing messages transmitted on each of the plurality of links within the wireless telecommunications network;
  providing to a message processor captured messages belonging to a preselected set of message types; and
  processing through the message processor the captured messages to create a database containing paired sets of messages, each paired set describing a particular wireless telecommunication transaction.

32. A method of generating wireless telecommunications data, comprising:
  monitoring a plurality of links within a wireless telecommunications network carrying wireless telecommunications messages;

capturing messages transmitted on each of the plurality of links within the wireless telecommunications network;

providing to a message processor captured messages belonging to a preselected set of message types with each set containing an invoke message and a corresponding return message; and processing through the message processor the captured messages to create a database containing expired invoke messages.

33. A system for capturing desired message data that passes, according to a preselected signaling system and protocol, through a wireless telecommunications system, the system comprising:

means for monitoring the wireless telecommunications system;

means for selecting, from the monitored system, messages corresponding to a preselected set of message types;

a processor coupled to the monitoring means and programmed to collate selected messages with one another to produce data records associated with the wireless telecommunications system; and means for providing data records associated with the wireless telecommunications to an administrative instrumentality.

\* \* \* \* \*